United States Patent
Baier et al.

(10) Patent No.: US 7,899,777 B2
(45) Date of Patent: Mar. 1, 2011

(54) WEB-BASED VISUALIZATION MASH-UPS FOR INDUSTRIAL AUTOMATION

(75) Inventors: John Joseph Baier, Mentor, OH (US); Clifton Harold Bromley, Westminster (CA); Mark Hobbs, Hartford, WI (US); Teunis Hendrik Schouten, Langley (CA); Douglas James Reichard, Fairview Park, OH (US); Kevin George Gordon, Vancouver (CA); Taryl Jon Jasper, South Euclid, OH (US); Robert Joseph McGreevy, Oswego, IL (US); Bruce Gordan Fuller, Alberta (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 660 days.

(21) Appl. No.: 11/863,111

(22) Filed: Sep. 27, 2007

(65) Prior Publication Data

US 2009/0089225 A1    Apr. 2, 2009

(51) Int. Cl.
*G06N 5/00* (2006.01)
(52) U.S. Cl. .................................... 706/60; 706/45
(58) Field of Classification Search .............. 706/60, 706/45
See application file for complete search history.

(56) References Cited

U.S. PATENT DOCUMENTS

| | | | |
|---|---|---|---|
| 5,838,588 | A | 11/1998 | Santoso et al. |
| 6,053,951 | A | 4/2000 | McDonald et al. |
| 6,904,387 | B2 | 6/2005 | Melzer |
| 6,985,779 | B2 | 1/2006 | Hsiung et al. |
| 7,162,387 | B2 | 1/2007 | Johnson et al. |
| 7,230,611 | B2 | 6/2007 | Brischoff |
| 2006/0241792 | A1 | 10/2006 | Pretlove et al. |
| 2007/0088526 | A1 | 4/2007 | Friedrich et al. |
| 2007/0260982 | A1 | 11/2007 | Wayland et al. |
| 2008/0022217 | A1 | 1/2008 | Aspen |

OTHER PUBLICATIONS

Murthy et al, Mash-o-matic, Proceedings of the 2006 ACM symposium on Document engineering, 2006, pp. 205-214.*

* cited by examiner

*Primary Examiner*—Wilbert L Starks, Jr.
(74) *Attorney, Agent, or Firm*—Turocy & Watson LLP; William R. Walbrun; John M. Miller

(57) ABSTRACT

A visualization system that generates visual mash-ups for industrial automation includes a mash-up component that combines output from a subset of disparate sources into a common interface. The disparate sources include at least one of equipment, computers, or devices within an industrial automation environment. A visualization component generates and displays a mash-up visualization that includes information associated with the common interface.

19 Claims, 63 Drawing Sheets

WEB-BASED VISUALIZATION MASH-UPS FOR INDUSTRIAL AUTOMATION

TECHNICAL FIELD

The subject invention relates generally to industrial control systems, and more particularly to various automated interfaces that interact with industrial control systems based in part on detected factors such as a user's role, identity, location, and so forth.

BACKGROUND

Industrial controllers are special-purpose computers utilized for controlling industrial processes, manufacturing equipment, and other factory automation, such as data collection or networked systems. At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. Differences in PLCs are typically dependent on the number of Input/Output (I/O) they can process, amount of memory, number and type of instructions, and speed of the PLC central processing unit (CPU).

One area that has grown in recent years is the need for humans to interact with industrial control systems in the course of business operations. This includes employment of human machine interfaces (HMI) to facilitate operations with such systems, where the HMI can be provided as a graphical user interface in one form. Traditional HMI/automation control systems are generally limited in their ability to make users aware of situations that require their attention or of information that may be of interest to them relative to their current tasks. Where such mechanisms do exist, they tend to be either overly intrusive (e.g., interrupting the user's current activity by "popping up" an alarm display on top of whatever they were currently looking at) or not informative enough (e.g., indicating that something requires the user's attention but not providing information about what). Often times, the user must navigate to another display (e.g., a "detail screen", "alarm summary" or "help screen") to determine the nature of the information or even to determine whether such information exists. As can be appreciated, navigation and dealing with pop-ups is time consuming and costly.

In other conventional HMI/automation control systems, information that is presented to users must be preconfigured by a control system designer and must be explicitly requested the user. For example, when an alarm condition occurs and the user wants additional information to help them diagnose/resolve the issue, they must explicitly ask the system to provide it. For this to occur, several conditions should be true: (1) when the control system was designed, the designer must have thought to make that specific information available to that user/role and for that specific situation; (2) the user must know that such information exists; and (3) the user must ask the system to fetch and display that information.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Various interface applications are provided to facilitate more efficient interactions with industrial automation systems. In one aspect, systems and methods are provided to mitigate navigation issues with human machine interfaces (HMI) and/or pop-up problems associated with such interfaces. By exploiting situation-specific data or "information of interest", e.g., based on factors such as the user's identity, role, location (logical or physical), current task, current view, and so forth, an HMI can be provided to superimpose such situation-specific information upon the user's current view of the automation control system ("base presentation") in a manner that communicates the essence of information as well as its importance/priority/urgency without completely dominating the user's attention or interrupting their current interaction with the system. In this manner, problems dealing with excessive navigation or obtrusive displays can be mitigated.

In another aspect, systems and methods are provided for mitigating pre-configuration interface issues by automatically providing users with relevant, situation-specific information. This includes automatically locating information that may be of interest/use in a user's current situation by matching attributes such as the user's identity, role, location (logical or physical), current activity, similar previous (historical) situations/activities, and so forth with other data such as device/equipment locations, device/equipment status, user/role/situation-specific reports, user-documentation, training manuals, and so forth. Thus, the user is automatically provided a rich set of information related to their current task/situation without generally requiring that person/situation/information mappings be predefined by control system designers.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
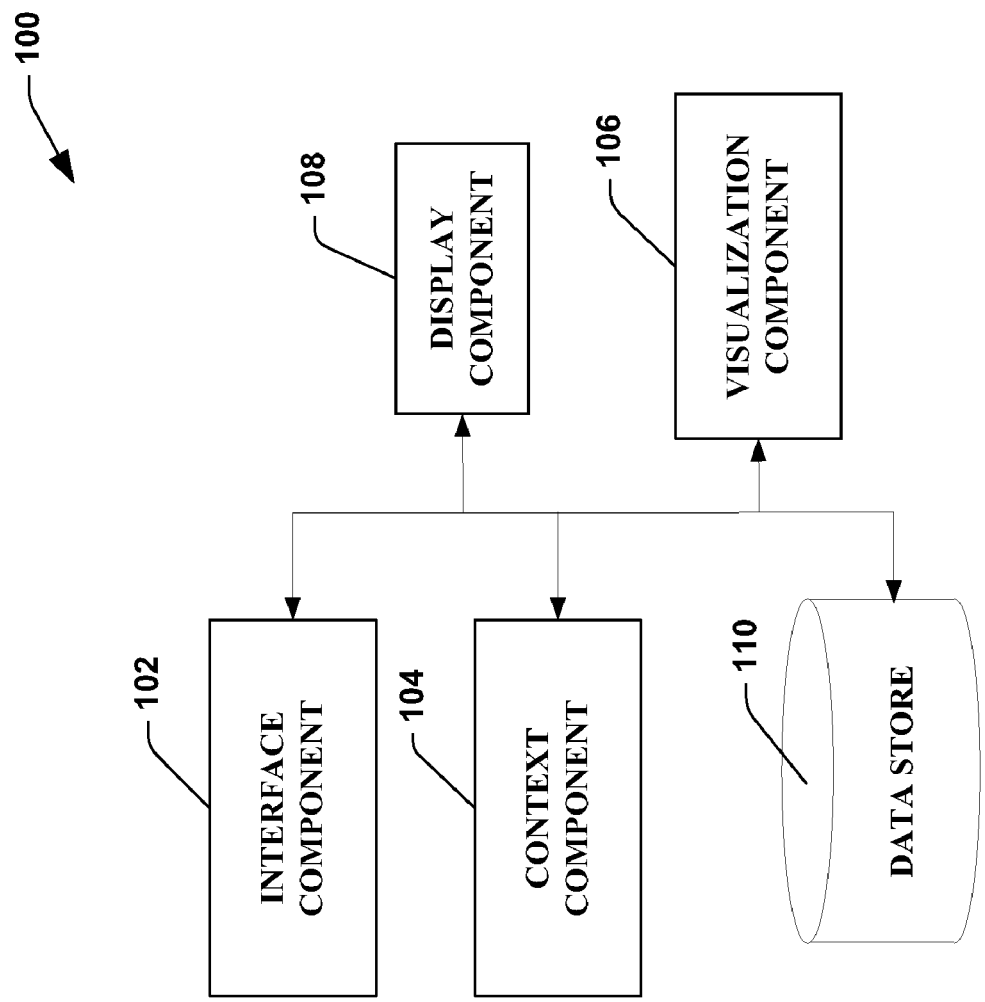
FIG. 1 illustrates a visualization system for generating customized visualizations in an industrial automation environment.

Systems and methods are provided that enable various interface applications that more efficiently communicate data to users in an industrial control system. In one aspect, an industrial automation system is provided. The system includes a base presentation component to display one or more elements of an industrial control environment. Various display items can be dynamically superimposed on the base presentation component to provide industrial control information to a user. In another aspect of the industrial automation system, a location component is provided to identify a physical or a virtual location for a user in an industrial control environment. This can include a context component to determine at least one attribute for the user in view of the physical or virtual location. A presentation component then provides information to the user based in part on the physical or virtual location and the determined attribute.

It is noted that as used in this application, terms such as "component," "display," "interface," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

As used herein, the term to "infer" or "inference" refer generally to the process of reasoning about or inferring states of the system, environment, user, and/or intent from a set of observations as captured via events and/or data. Captured data and events can include user data, device data, environment data, data from sensors, sensor data, application data, implicit and explicit data, etc. Inference can be employed to identify a specific context or action, or can generate a probability distribution over states, for example. The inference can be probabilistic, that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is to be appreciated that a variety of artificial intelligence (AI) tools and system can be employed in connection with embodiments described and claimed herein. For example, adaptive user interface (UI) machine learning and reasoning (MLR) can be employed to infer on behalf of an entity (e.g., user, group of users, device, system, business, . . . ). More particularly, a MLR component can learn by monitoring context, decisions being made, and user feedback. The MLR component can take as input aggregate learned rules (from other users), context of a most recent decision, rules involved in the most recent decision and decision reached, any explicit user feedback, any implicit feedback that can be estimated, and current set of learned rules. From these inputs, the MLR component can produce (and/or update) a new set of learned rules 1204.

In addition to establishing the learned rules, the MLR component can facilitate automating one or more novel features in accordance with the innovation described herein. For example, carious embodiments (e.g., in connection with establishing learned rules) can employ various MLR-based schemes for carrying out various aspects thereof. A process for determining implicit feedback can be facilitated via an automatic classifier system and process. A classifier is a function that maps an input attribute vector, $x=(x1, x2, x3, x4, xn)$, to a confidence that the input belongs to a class, that is, $f(x)=confidence(class)$. Such classification can employ a probabilistic, statistical and/or decision theoretic-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. By defining and applying a kernel function to the input data, the SVM can learn a non-linear hypersurface. Other directed and undirected model classification approaches include, e.g., decision trees, neural networks, fuzzy logic models, naïve Bayes, Bayesian networks and other probabilistic classification models providing different patterns of independence can be employed.

As will be readily appreciated from the subject specification, the innovation can employ classifiers that are explicitly trained (e.g., via a generic training data) as well as implicitly trained (e.g., via observing user behavior, receiving extrinsic information). For example, the parameters on an SVM are estimated via a learning or training phase. Thus, the classifier(s) can be used to automatically learn and perform a number of functions, including but not limited to determining according to a predetermined criteria how/if implicit feedback should be employed in the way of a rule.

It is noted that the interfaces described herein can include a Graphical User Interface (GUI) to interact with the various components for providing industrial control information to users. This can include substantially any type of application that sends, retrieves, processes, and/or manipulates factory input data, receives, displays, formats, and/or communicates output data, and/or facilitates operation of the enterprise. For example, such interfaces can also be associated with an engine, editor tool or web browser although other type applications can be utilized. The GUI can include a display having one or more display objects (not shown) including such aspects as configurable icons, buttons, sliders, input boxes, selection options, menus, tabs and so forth having multiple configurable dimensions, shapes, colors, text, data and sounds to facilitate operations with the interfaces. In addition, the GUI can also include a plurality of other inputs or controls for adjusting and configuring one or more aspects. This can include receiving user commands from a mouse, keyboard, speech input, web site, remote web service and/or other device such as a camera or video input to affect or modify operations of the GUI.

It is also noted that the term PLC or controller as used herein can include functionality that can be shared across multiple components, systems, and or networks. One or more PLCs or controllers can communicate and cooperate with various network devices across a network. This can include substantially any type of control, communications module, computer, I/O device, Human Machine Interface (HMI)) that communicate via the network which includes control, automation, and/or public networks. The PLC can also communicate to and control various other devices such as Input/Output modules including Analog, Digital, Programmed/Intelligent I/O modules, other programmable controllers, communications modules, and the like. The network (not shown) can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Dynamically Generating Visualizations in Industrial Automation Environment as a Function of Context and State Information Referring initially to FIG. 1, a visualization system 100 for generating a customized visualization in an industrial automation environment is depicted. It should be appreciated that generating visualizations in an industrial automation environment is very different from doing so in a general purpose computing environment. For example, down-time and latency tolerance levels between such environments are vastly different. Individuals tolerate at a fair frequency lock-ups, delayed images, etc. in a general purpose computing environment; however, even several seconds of down-time in an industrial automation environment can lead to substantial loss in revenue as well as create hazardous conditions within a factory. Consequently, market forces have dictated that HMI systems within an industrial automation environment remain light-weight, fast, not computationally expensive, and thus robust. Counter to conventional wisdom in the industrial automation domain, innovations described herein provide for highly complex and sophisticated HMI systems that mitigate down-time, are robust, and facilitate maximizing an operator experience within an industrial automation environment.

It is contemplated that visualization system 100 can form at least part of a human machine interface (HMI), but is not limited thereto. For example, the visualization system 100 can be employed to facilitate viewing and interaction with data related to automation control systems, devices, and/or associated equipment (collectively referred to herein as an automation device(s)) forming part of a production environment. Visualization system 100 includes interface component 102, context component 104, visualization component 106, display component 108, and data store 110.

The interaction component 102 receives input concerning displayed objects and information. Interaction component 102 can receive input from a user, where user input can correspond to object identification, selection and/or interaction therewith. Various identification mechanisms can be employed. For example, user input can be based on positioning and/or clicking of a mouse, stylus, or trackball, and/or depression of keys on a keyboard or keypad with respect to displayed information. Furthermore, the display device may be by a touch screen device such that identification can be made based on touching a graphical object. Other input devices are also contemplated including but not limited to gesture detection mechanisms (e.g., pointing, gazing . . . ) and voice recognition.

In addition to object or information selection, input can correspond to entry or modification of data. Such input can affect the display and/or automation devices. For instance, a user could alter the display format, color or the like. Additionally or alternatively, a user could modify automation device parameters. By way of example and not limitation, a conveyor motor speed could be increased, decreased or halted. It should be noted that input need not come solely from a user, it can also be provided by automation devices. For example, warnings, alarms, and maintenance schedule information, among other things, can be provided with respect to displayed devices.

Context component 104 can detect, infer or determine context information regarding an entity. Such information can include but is not limited to an entity's identity, role, location (logical or physical), current activity, similar or previous interactions with automation devices, context data pertaining to automation devices including control systems, devices and associated equipment. Device context data can include but is not limited to logical/physical locations and operating status (e.g., on/off, healthy/faulty . . . ). The context component 104 can provide the determined, inferred, detected or otherwise acquired context data to visualization component 106, which can employ such data in connection with deciding on which base presentations and or items to display as well as respective format and position.

By way of example, as an entity employs visualization system 100 (physically or virtually), the system 100 can determine and track their identity, their roles and responsibilities, their areas or regions of interest/responsibility and their activities. Similarly, the system can maintain information about devices/equipment that make up the automation control system, information such as logical/physical locations, operating status and the types of information that are of interest to different persons/roles. The system is then able to create mappings/linkages between these two sets of information and thus identify information germane to a user's current location and activities, among other things.

Display component 108 can render a display to and/or receive data from a display device or component such as a monitor, television, computer, mobile device, web browser or the like. In particular, automation devices and information or data concerning automation devices can be presented graphically in an easily comprehensible manner. The data can be presented as one or more of alphanumeric characters, graphics, animations, audio and video. Furthermore, the data can be static or updated dynamically to provide information in real-time as changes or events occur. Still further yet, one can interact with the interface 100 via the interface component 102.

The display component 110 is also communicatively coupled to visualization component 106, which can generate, receive, retrieve or otherwise obtain a graphical representation of a production environment including one or more objects representing, inter alia, devices, information pertaining to devices (e.g., gages, thermometers . . . ) and the presentation itself. In accordance with one aspect, a base presentation provided by visualization component 106 can form all or part of a complete display rendered by the display component 108. In addition to the base presentation, one or more items can form part of the display.

An item is a graphical element or object that is superimposed on at least part of the base presentation or outside the boundaries of the base presentation. The item can provide information of interest and can correspond to an icon, a thumbnail, a dialog box, a tool tip, and a widget, among other things. The items can be transparent, translucent, or opaque be of various sizes, color, brightness, and so forth as well as be animated for example fading in and out. Icons items can be utilized to communicate the type of information being presented. Thumbnails can be employed to present an overview of information or essential content. Thumbnails as well as other items can be a miniature but legible representation of information being presented and can be static or dynamically updating. Effects such as fade in and out can be used to add or remove superimposed information without overly distracting a user's attention. In addition, items can gradually become larger/smaller, brighter/dimmer, more/less opaque or change color or position to attract more or less of a user's attention, thereby indicating increasing or decreasing importance of the information provided thereby. The positions of the items can also be used to convey one or more of locations of equipment relative to a user's current location or view, the position or index of a current task within a sequence of tasks, the ability to navigate forward or back to a previously visited presentation or view and the like. The user can also execute some measure of control over the use/meaning of these various presentation techniques, for example via interface component 102.

If desired, a user can choose, via a variety of selection methods or mechanisms (e.g., clicking, hovering, pointing . . . ), to direct their attention to one or more items. In this case the selected information, or item providing such information, can become prominent within the presentation, allowing the user to view and interact with it in full detail. In some cases, the information may change from static to active/dynamically updating upon selection. When the focus of the presentation changes in such a manner, different information may become more/less interesting or may no longer be of interest at all. Thus, both the base presentation and the set of one or more items providing interesting information can be updated when a user selects a new view.

Data store 110 can be any suitable data storage device (e.g., random access memory, read only memory, hard disk, flash memory, optical memory), relational database, media, system, or combination thereof. The data store 110 can store information, programs, AI systems and the like in connection with the visualization system 100 carrying out functionalities described herein. For example, expert systems, expert rules, trained classifiers, entity profiles, neural networks, look-up tables, etc. can be stored in data store 100.

Figure 2:
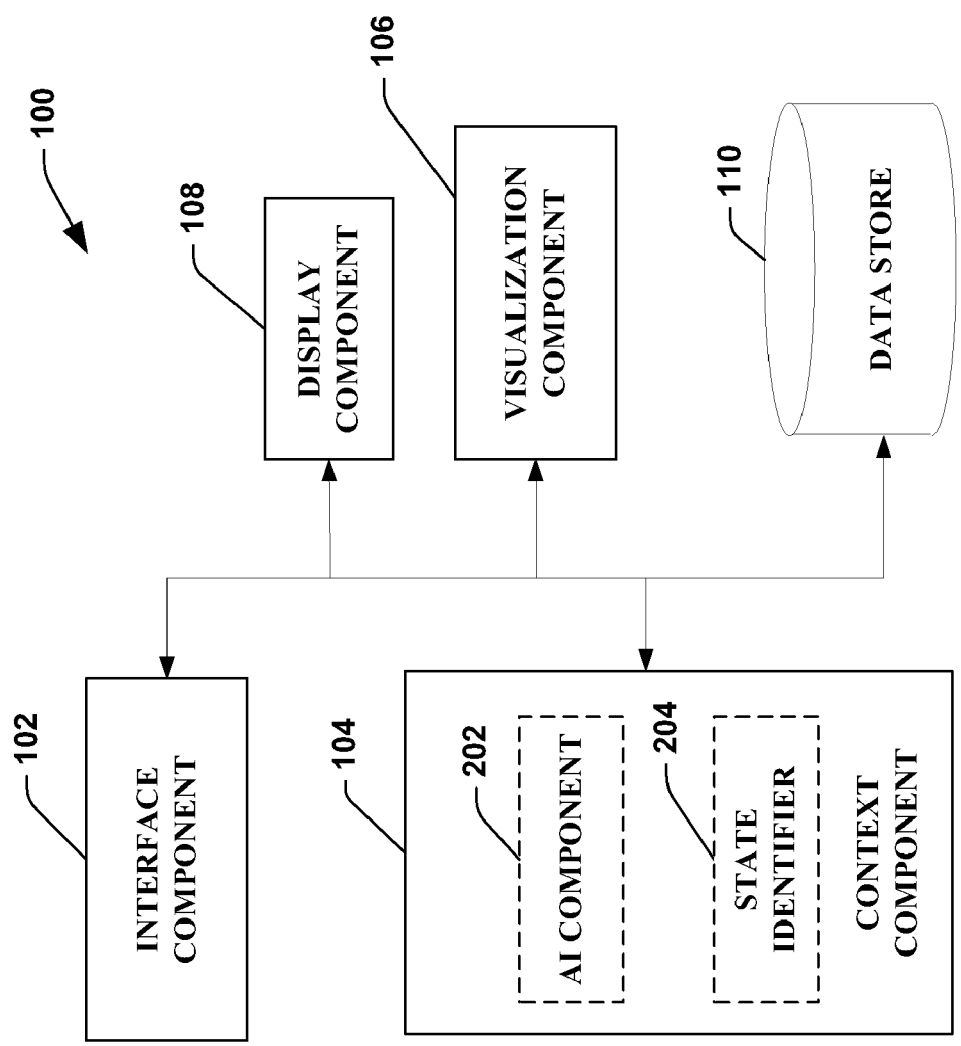
FIG. 2 illustrates one particular embodiment of a visualization system.

FIG. 2 illustrates one particular embodiment of visualization system 100. Context component 104 includes an AI component 202 and a state identification component (state identifier) 204. The AI component 202 can employ principles of artificial intelligence to facilitate automatically performing various aspects (e.g., transitioning communications session, analyzing resources, extrinsic information, user state, and preferences, risk assessment, entity preferences, optimized decision making, . . . ) as described herein. AI component 202 can optionally include an inference component that can further enhance automated aspects of the AI component utilizing in part inference based schemes to facilitate inferring intended actions to be performed at a given time and state. The AI-based aspects of the invention can be effected via any suitable machine-learning based technique and/or statistical-based techniques and/or probabilistic-based techniques. For example, the use of expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. are contemplated and are intended to fall within the scope of the hereto appended claims.

State identifier 204 can identify or determine available resources (e.g., service providers, hardware, software, devices, systems, networks, etc.). State information (e.g., work performed, tasks, goals, priorities, context, communications, requirements of communications, location, current used resources, available resources, preferences, anticipated upcoming change in entity state, resources, change in environment, etc.) is determined or inferred. Given the determined or inferred state and identified available resources, a determination is made regarding whether or not to transition a visualization session from the current set of resources to another set of resources. This determination can include a utility-based analysis that factors cost of making a transition (e.g., loss of fidelity, loss of information, user annoyance, interrupting a session, disrupting work-flow, increasing down-time, creating a hazard, contributing to confusion, entity has not fully processed current set of information and requires more time, etc.) against the potential benefit (e.g., better quality of service, user satisfaction, saving money, making available enhanced functionalities associated with a new set of resources, optimization of work-flow, . . . ). This determination can also include a cost-benefit analysis. The cost can be measured by such factors as the power consumption, computational or bandwidth costs, lost revenues or product, under-utilized resources, operator frustration . . . . The benefit can be measured by such factors as the quality of the service, the data rate, the latency, etc. The decision can be made based on a probabilistic-based analysis where the transition is initiated if a confidence level is high, and not initiated if the confidence level if low. As discussed above, AI-based techniques (including machine-learning systems) can be employed in connection with such determination or inference. Alternatively, a more simple rule-based process can be employed where if certain conditions are satisfied the transition will occur, and if not the transition will not be initiated. The transition making determination can be automated, semi-automated, or manual.

Figure 3:
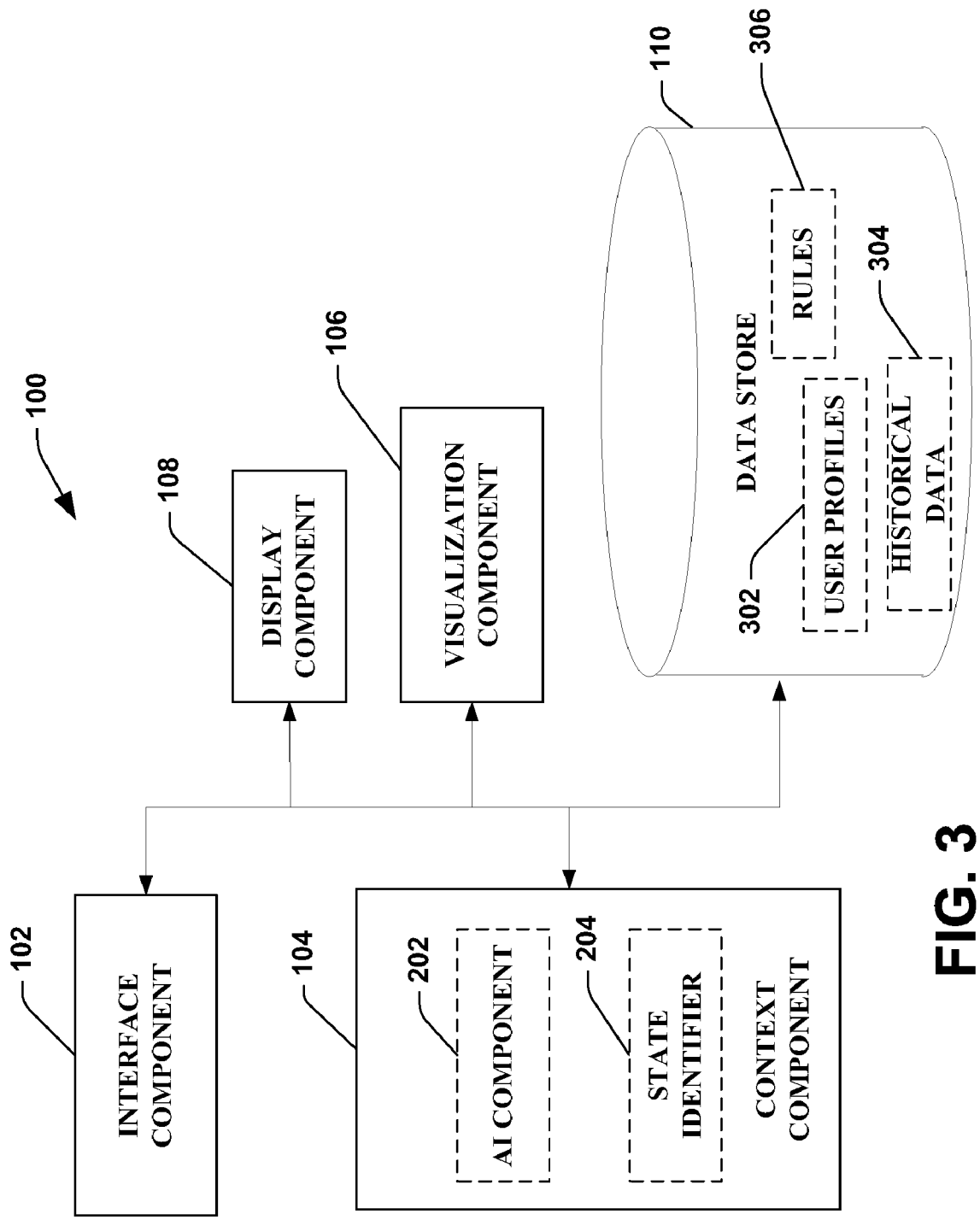
FIG. 3 illustrates an embodiment where a data store stores information and programs that facilitate generating rich visualizations in accordance with aspects described herein.

FIG. 3 illustrates an embodiment where data store 110 stores information and programs that facilitate generating rich visualizations in accordance with aspects described herein. Data store 110 can include historical data, for example relating to previous visualizations utilized given certain context/state. Use of such historical data (which can include cached web pages, cookies, and the like) can facilitate quickly conveying relevant visualizations germane to a set of current conditions that coincide with historical conditions. Likewise, historical data can be used in connection with filtering out poor or non-relevant visualizations given historical use and known outcomes associated with such visualizations. It is to be appreciated that trained (explicitly or implicitly) machine learning systems (MLS) can be stored in the data store 110 to facilitate converging on desired or proper visualizations given a set of conditions.

Profiles (e.g., user profiles, device profiles, templates, event profiles, alarm profiles, business profiles, etc.) 302 can also be saved in the data store 302 and employed in connection with customizing a visualization session in accordance with roles, preferences, access rights, goals, conditions, etc. Rules (e.g., policies, rules, expert rules, expert systems, look-up tables, neural networks, etc.) can be employed to carry-out a set of pre-defined actions given a set of information.

The visualization system 100 can dynamically tailor a visualization experience to optimize operator interaction in an industrial automation environment. For example, given a set of conditions (e.g., a subset of any of the following: alarms, location, type of machinery, state of system, environmental conditions, user, user role, user access, user state, cognitive load of the user, capacity of user to consume information, preferences, goals, intent, costs, benefits, etc.), the system 100 can automatically tune a visualization to be optimized, given the set of conditions, to meet the user's needs and facilitate achieving goals or requirements.

Figure 4:
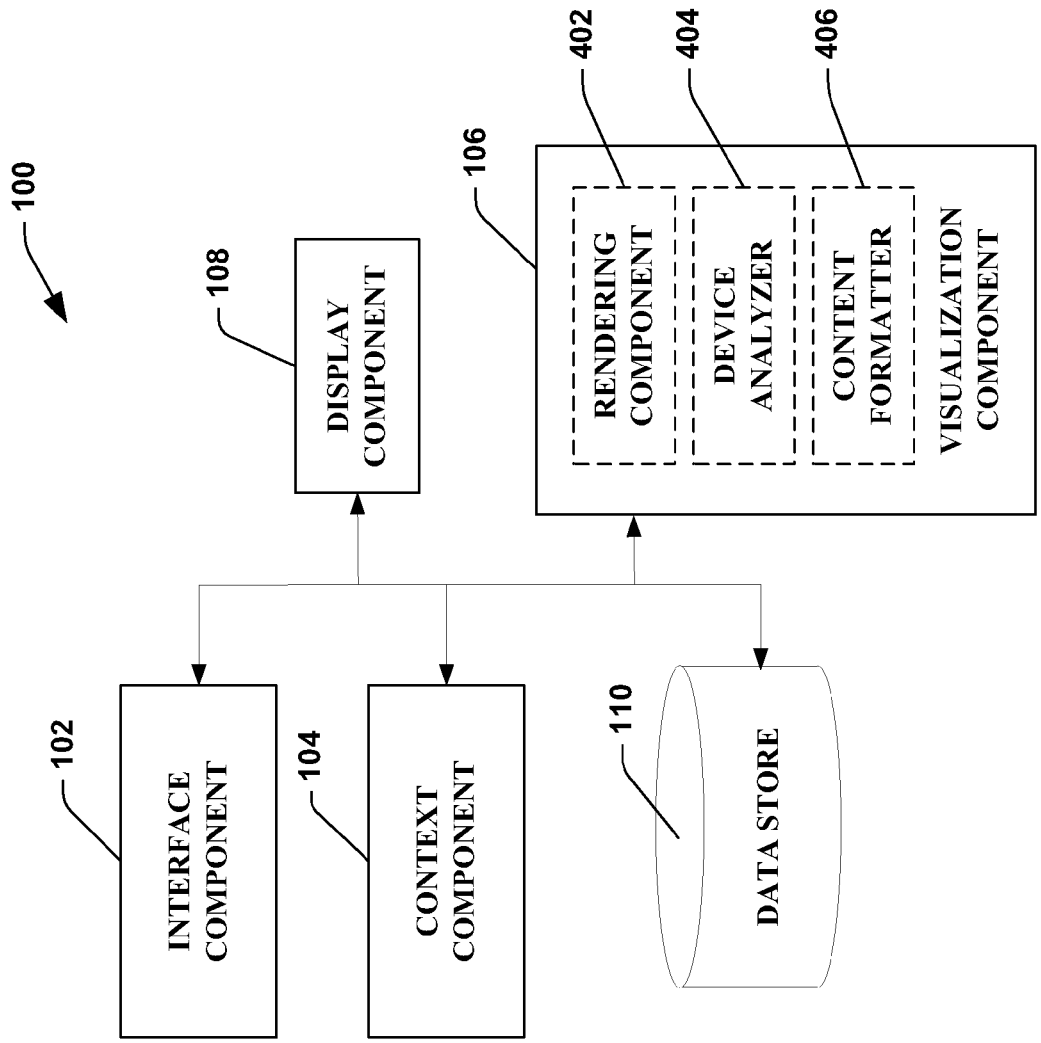
FIG. 4 illustrates an embodiment of a visualization component.

FIG. 4 illustrates another embodiment where visualization component 106 includes rendering component 402, device analyzer 404, and content formatter 406. As a function of conditions noted supra, and other factors, the visualization component 106 can reformat data in connection with customizing a visualization. Device analyzer can determine or infer capabilities of a device or system intended to render the visualization, and as a function of such capabilities the visualization can be selectively tailored. It is to be appreciated that environment or use conditions associated with the rendering device can also be a factor that is considered. For example, the visualization can be tailored as a function of lighting conditions, or even vision capabilities of an operator. Moreover, nature of the content to be displayed or device rendering capabilities (e.g., screen real estate, screen resolution, etc.) can be factored. Content formatter 406 can modify color, size, etc. of content displayed as well as prune content or resolution to optimize conveyance of information to an entity in a glanceable manner (e.g., perceiving information at a glance, utilizing pre-attentive processing to display information, facilitating a user to perceive information and not significantly impact cognitive load).

Accordingly, system 100 provides for a rich customized visualization in an industrial automation environment that can be a function, for example, of a subset of the following factors: entity context, work context, information content, entity goals, system optimization, work-flow optimization, rendering device capabilities, cognitive load of entity, processing capabilities, bandwidth, available resources, lack of resources, utility-based analysis, inference, entity preferences, entity roles, security, screen real estate, priority of information, relevance of information, content filtering, context filter, ambient conditions, machine or process prognostics information, machine or process diagnostics information, revenue generation, potential or actual system or device downtime, scheduling, entity capacity to understand information, entity limitations on understanding information, alerts, emergencies, security, authentication, etc.

Figure 5:
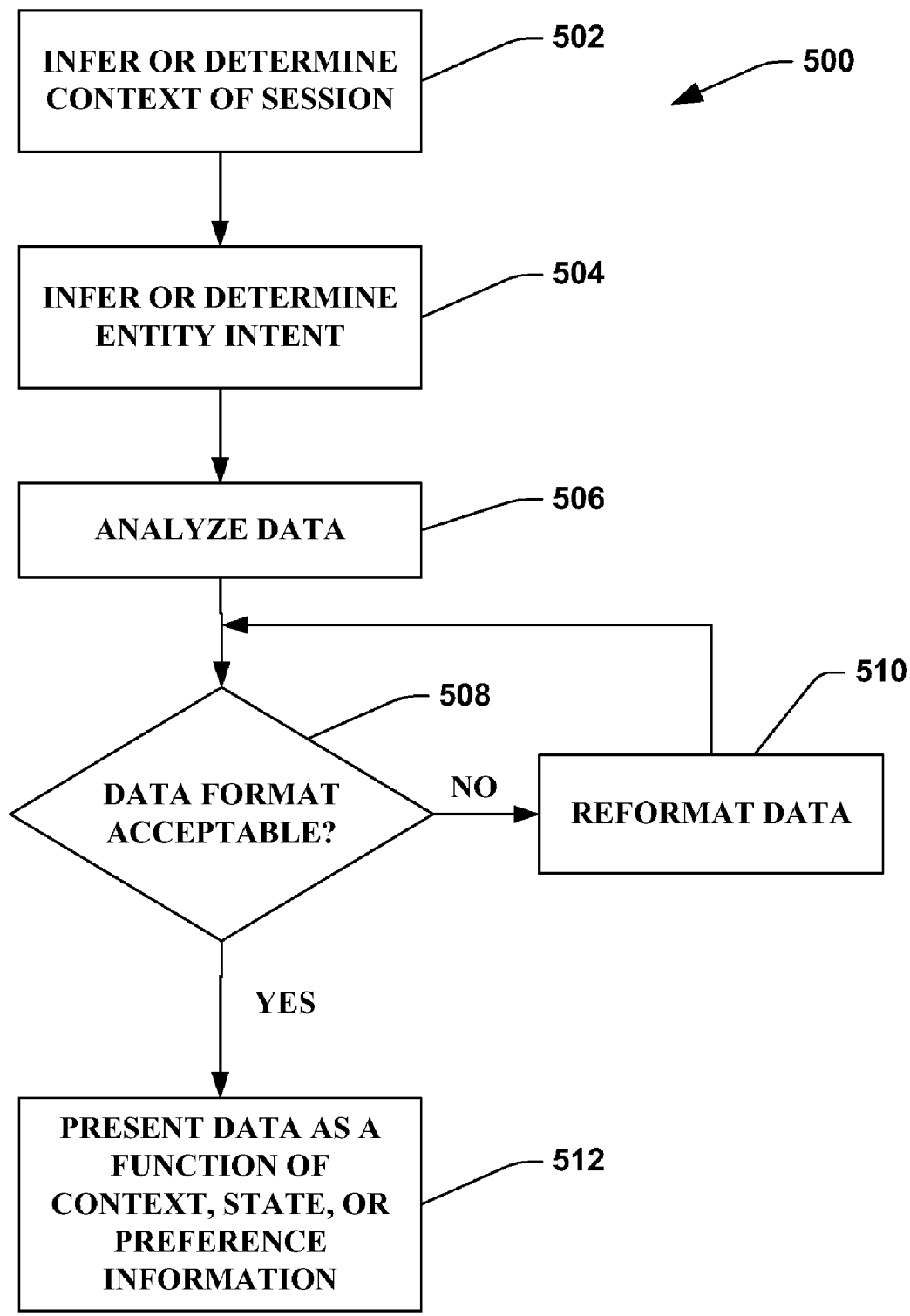
FIG. 5 illustrates a methodology for presenting customized visualization of information.

FIG. 5 illustrates a methodology 500 for presenting customized visualization of information. While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

The method 500 can identify the information of interest to one or more user without prompting or requesting such interest information from the user(s). The inference can be based, for example, on identity, role, location, and/or on text in a production facility by matching the user's location, context, and/or role with the location and/or status of device/equipment/system being monitored.

At 502 context of an information session is inferred or determined. The inference or determination can be a based on content of information, context of a sending entity or recipient entity, extrinsic information, etc. Learning context of the session substantially facilitates generating a visualization that is meaningful to the goals of the entity or session. At 504 entity intent is inferred or determined. A variety of information sources or types can be employed in connection with this act. For example, roles of the entity, access rights, prior interactions, what the entity is currently doing, entity preferences, historical data, entity declaration of intent, . . . can be employed in connection with inferring or determining intent of the entity. At 506 data associated with acts 502 and 504 are analyzed. A variety of analytical techniques (e.g., probabilistic, statistical, rules-based, utility-based analysis, look-up table . . . ) can be employed in connection with analyzing the data in connection with generating a relevant and meaningful visualization in accordance with embodiments described herein. For example, confidence levels can be calculated in connection with inferred context or intent, and if the confidence level meets a particular threshold (e.g., >80% confidence) automated action can be taken based on the inference. In addition or alternatively, for example, a utility-based analysis can be performed that factors the cost of taking an incorrect action in view of the benefits associated with the action being correct. If the benefits exceed the costs, an action may be taken. At 508, a determination is made as to whether or not the data is in an acceptable format. If not the data is reformatted at 510. If yes, the information is presented to the user as a rich, customized visualization that is a function of context, state, or preferences.

Figure 6:
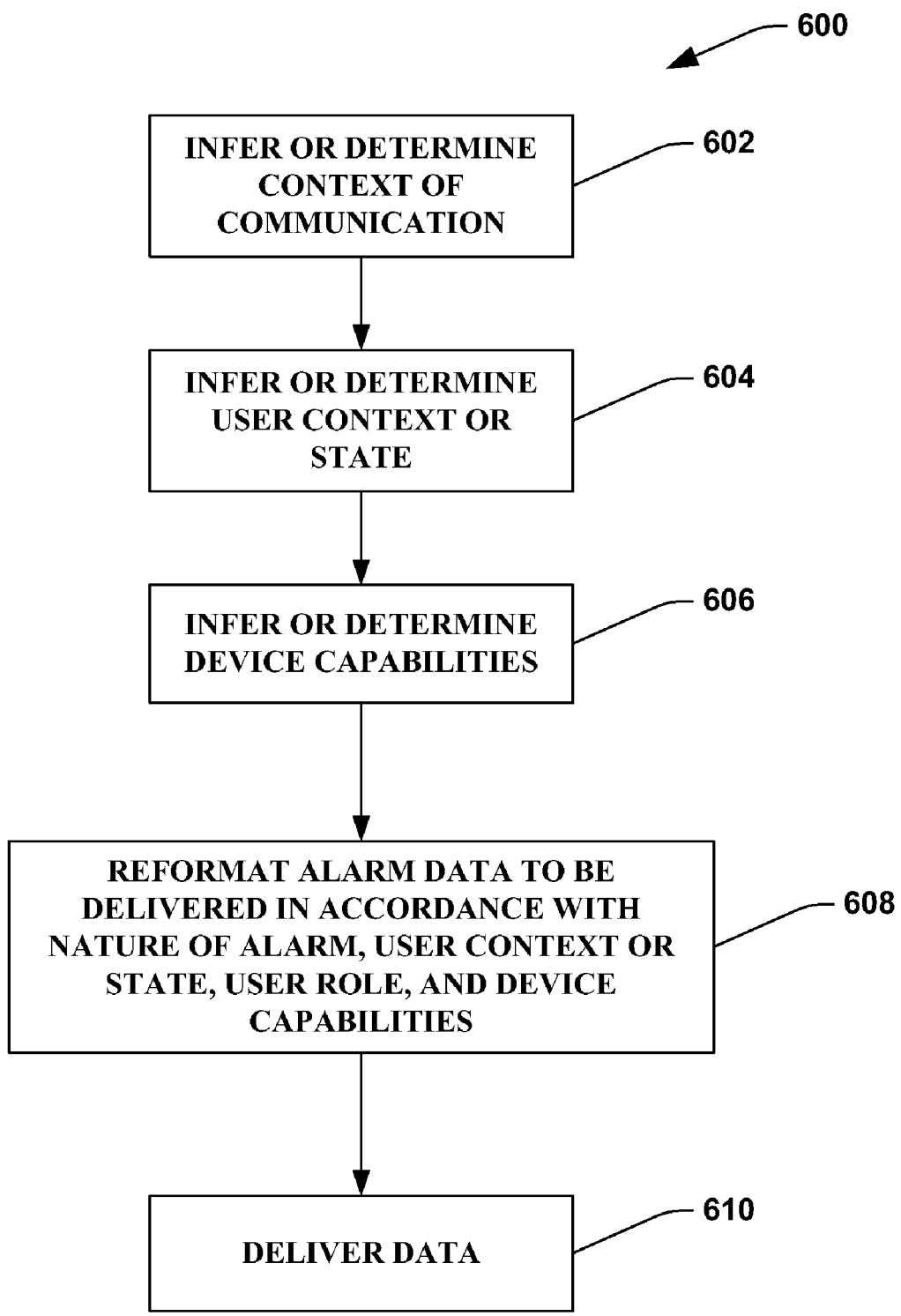
FIG. 6 illustrates one particular embodiment in connection with a methodology for generating visualizations associated with alarms.

FIG. 6 illustrates one particular embodiment in connection with a methodology 600 for generating visualizations associated with alarms. At 602, context associated with a communication (e.g., message, session, alarm, event) is inferred or determined. For example, content associated with the communication can be analyzed (e.g., via key words, MLS techniques, classifiers, inflection of voice, priority settings, to facilitate inferring or determining context associated with a communication. At 604, user context or state if inferred or determined. At 606, device capabilities are inferred or determined. At 608, alarm data is reformatted so that it can be delivered in accordance with nature of the alarm, user context or state, user role, cognitive capability, and device capability. Once the data is re-formatted to optimize delivery and consumption thereof, the formatted data is delivered to the rendering device.

Thus, alarm data is analyzed and re-formatted so as to facilitate optimizing delivery of the alarm information to a user and particular device being employed. For example, if the user is at a remote location with a lot of ambient noise, and only a cell phone is available, the alarm would be delivered as a text message rather than relying on audible broadcast (given the excessive ambient noise which could hamper a user fully interpreting an audio delivery of the alarm information). Moreover, given limited screen real estate associated with the cell phone, the alarm information may be truncated so as to focus on most relevant language (e.g., alarm, location, when, where, status). On the other hand, if the user was in an office in front of a multi-screen computer system with a broadband connection, the alarm information may be provided as text, audio, images, video, chat sessions, etc. since there are more resources to utilize to convey the information as well as provide for the user to react to the alarm information.

Figure 7:
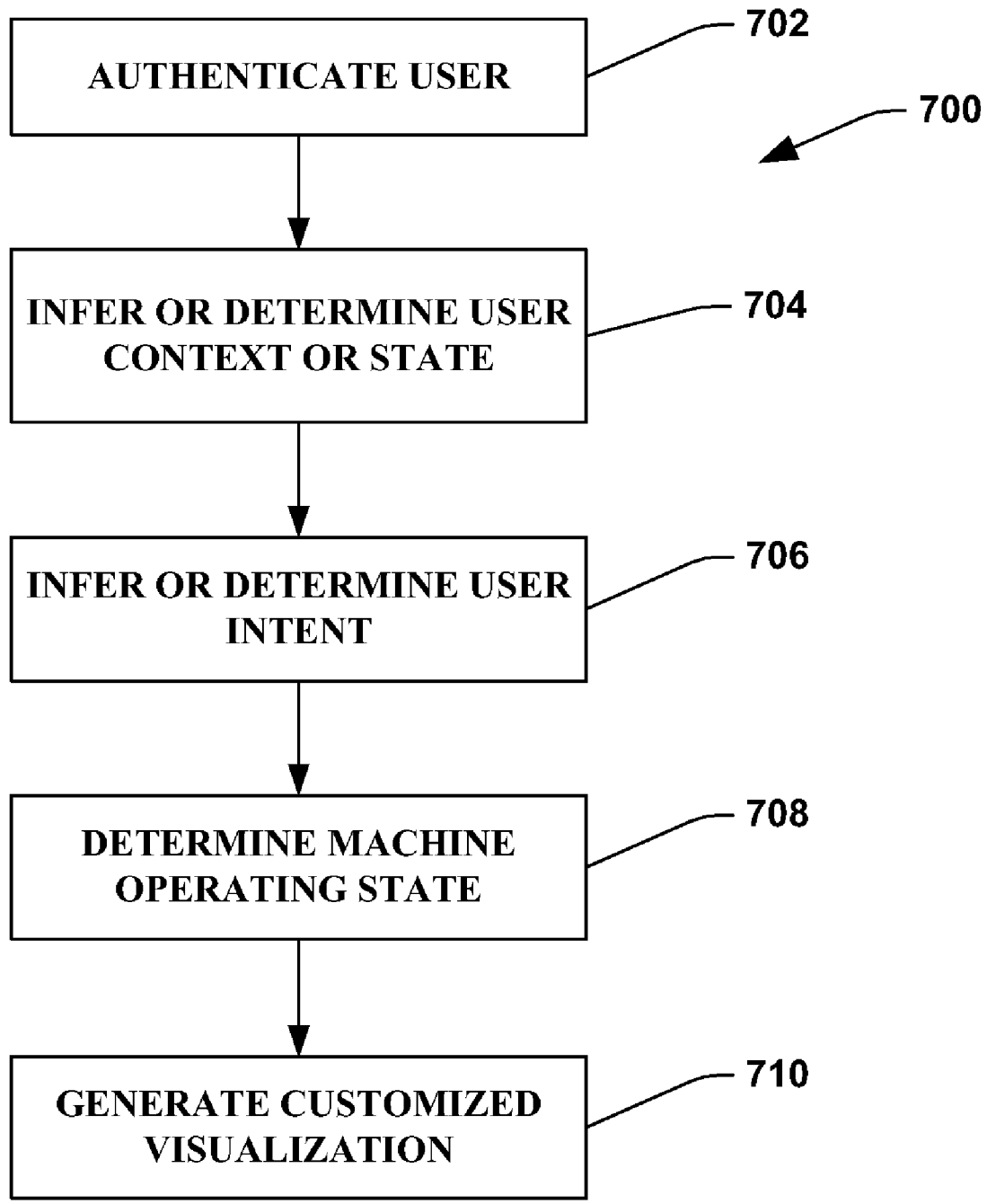
FIG. 7 illustrates an embodiment of a methodology that relates to customizing a visualization associated with operation of or interaction with a machine.

FIG. 7 illustrates an embodiment of a methodology 700 that relates to customizing a visualization associated with operation of or interaction with a machine. At 702, a user is authenticated with the machine. Any suitable scheme for authenticating the user (e.g., password, biometrics, RFID, voice recognition, pattern recognition, retinal scan, . . . ) can be employed to satisfactorily identify an individual seeking access to the machine. The authenticating act can also set access rights and privileges associated with interaction with the machine. At 704, user context or state is inferred or determined. At 706, user intent or goals is inferred or determined. At 708, machine operating state is determined. Based on acts 702-708, a customized visualization is generated to facilitate the user achieving his/her intended goal.

The methodology allows for a user, upon authentication to the machine, to have a rich, customized visualization generated that facilitates achieving his/her goals. For example, different visualizations would be presented as a function of task at hand, operator role, operator preferences, context of the operation, state of the machine, access rights, strengths or weaknesses of the operator, operator cognitive load, extrinsic factors, complexity of task, duration of task, upcoming tasks, past tasks, etc.

Web-Based Visualization Mash-Ups for Industrial Automation

Figure 8:
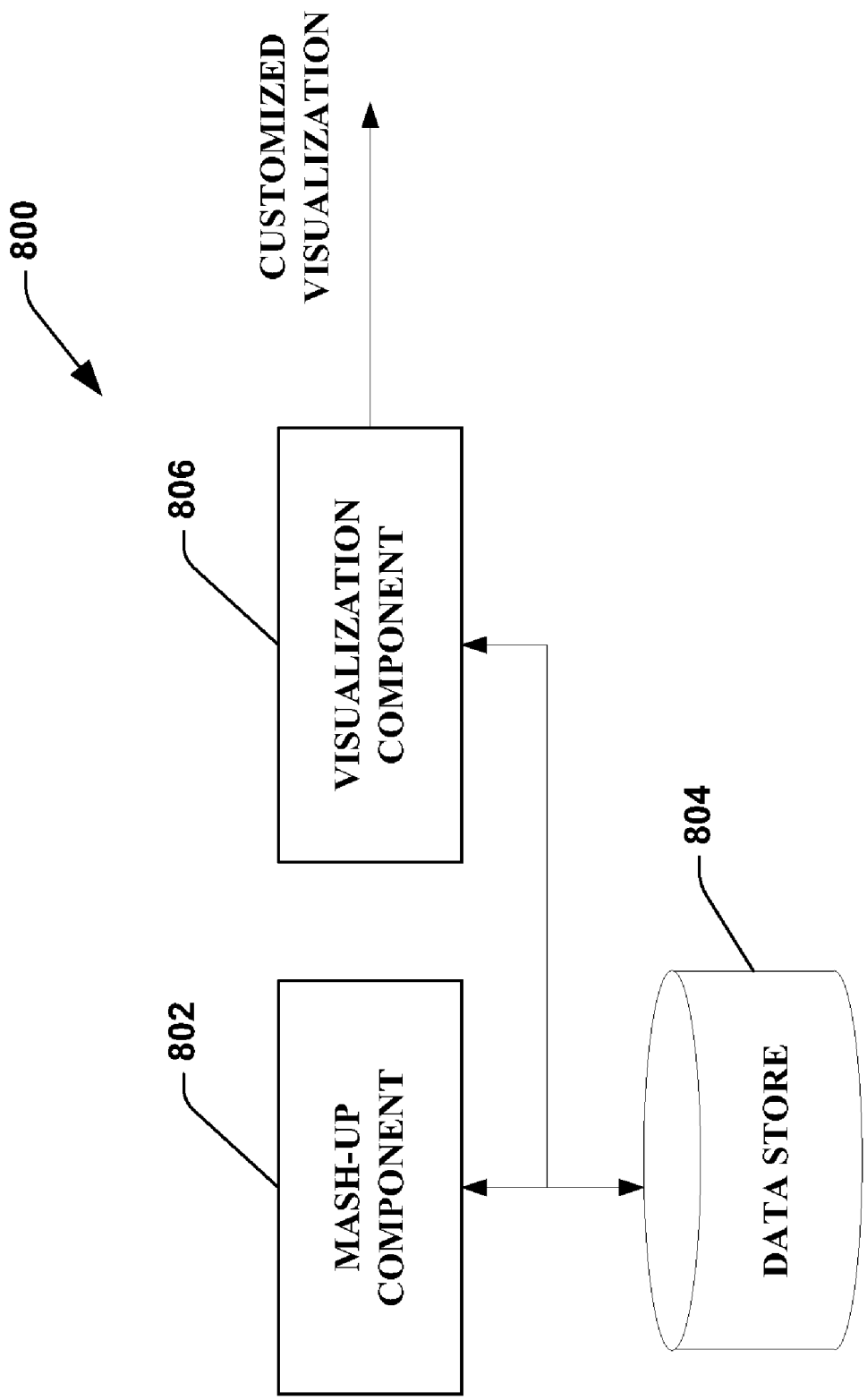
FIG. 8 illustrates an embodiment of a system that generates customized visualizations as a function of mash-ups of display objects.

FIG. 8 illustrates an embodiment of a system 800 that generates customized visualizations as a function of mash-ups of display objects (e.g., web pages, windows, portals, video, images, text boxes, pop-ups, alerts, etc.). Through use of mash-ups (e.g., a collection of information from different sources), a rich customized visualization can be generated that allows a user to leverage information, from a variety of sources, through a common integrated interface. The system 800 includes a mash-up component 802 that provides for a user to associate a plurality of different sources and combine output from such sources into a common interface. For example, a user can designate a variety of sources to use (e.g., alarm services, network health, workflow applications, real-time video feeds, prognostic data, diagnostic data, real-time machine operation data, remote web services, analytical tools, search engines, network or device health monitors, instructional sources, communication sources . . . ) in connection with generating a highly glanceable interface that facilitates the user receiving substantially all desired information through a common interface that is designed to optimize consumption of the information in accordance with the user's needs, context, preferences, capabilities, etc.

Data store 804 can store information such as source address, filters, classifiers, preferences, profiles, design layout information, rules, historical data, and other information that can facilitate generation and execution of the mash-up. Visualization component 806 generates a mash-up visualization that includes information from the multiple sources.

Figure 9:
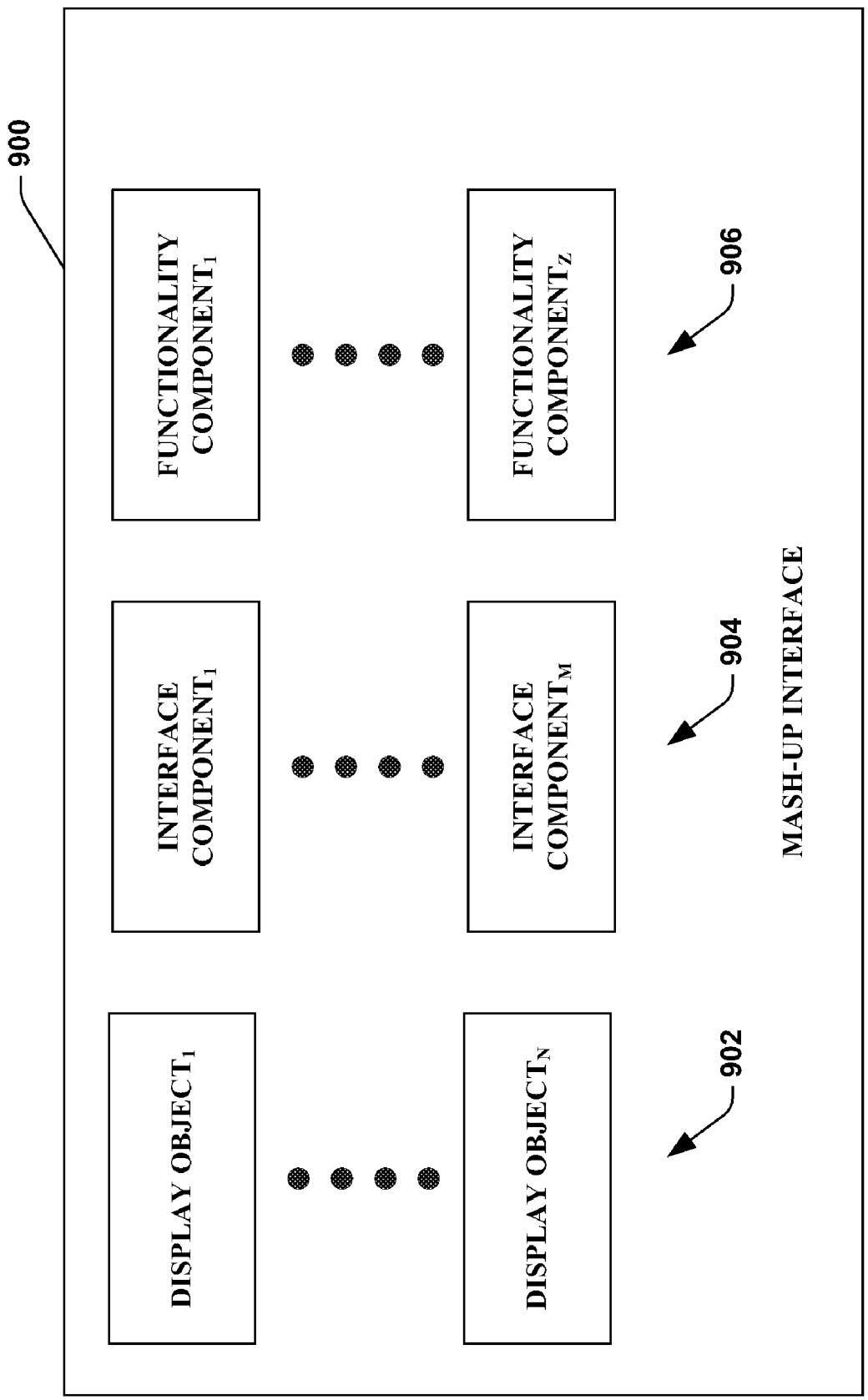
FIG. 9 is a schematic illustration of an embodiment of a mash-up interface.

FIG. 9 is a schematic illustration of an embodiment of a mash-up interface 900. The interface includes P number of display objects, M number of interface components, and Z number of functionality components (P, M, and Z are respectively integer values). The display objects 902 can display a variety of visualizations (e.g., text, video, images, web pages, etc.). The interface components 904 provide for a user to interact with systems, sources, devices, and the like. For example, the interface components can include interfaces for receiving user inputs (e.g., key strokes, text, audio, visual commands, voice, pen inputs, . . . ). The functionality components 906 can be any of a variety of functional blocks that can carry out various functionalities. It is to be appreciated that the display objects, interface components, and functionality components can optionally be combined, or provide overlapping features/functionalities of one another. Users can designate sets of these components 902, 904, 906 to employ together as part of a common interface.

Figure 10:
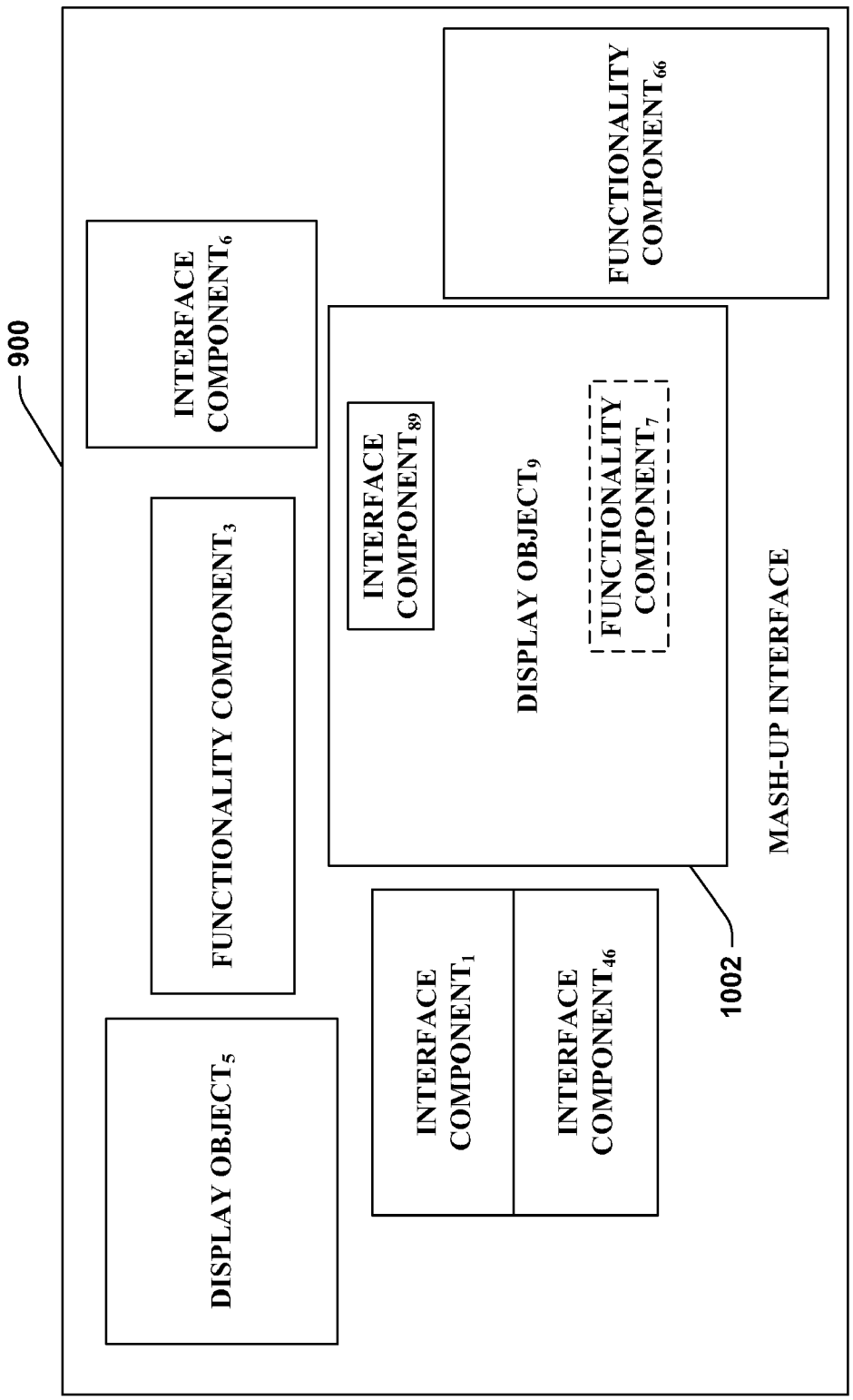
FIG. 10 depicts a schematic representation of a mash-up interface in accordance with an aspect.

FIG. 10 depicts a schematic representation of mash-up interface 900. As can be seen, size of display objects, interface components, and functionality components can be selectively set, or dynamically adjusted to optimize an interface given a set of conditions. Moreover, display objects, functionality components and interface components can be sub-mashed 1002 to provide aggregated functionalities associated with the respectively combined elements.

Figure 11:
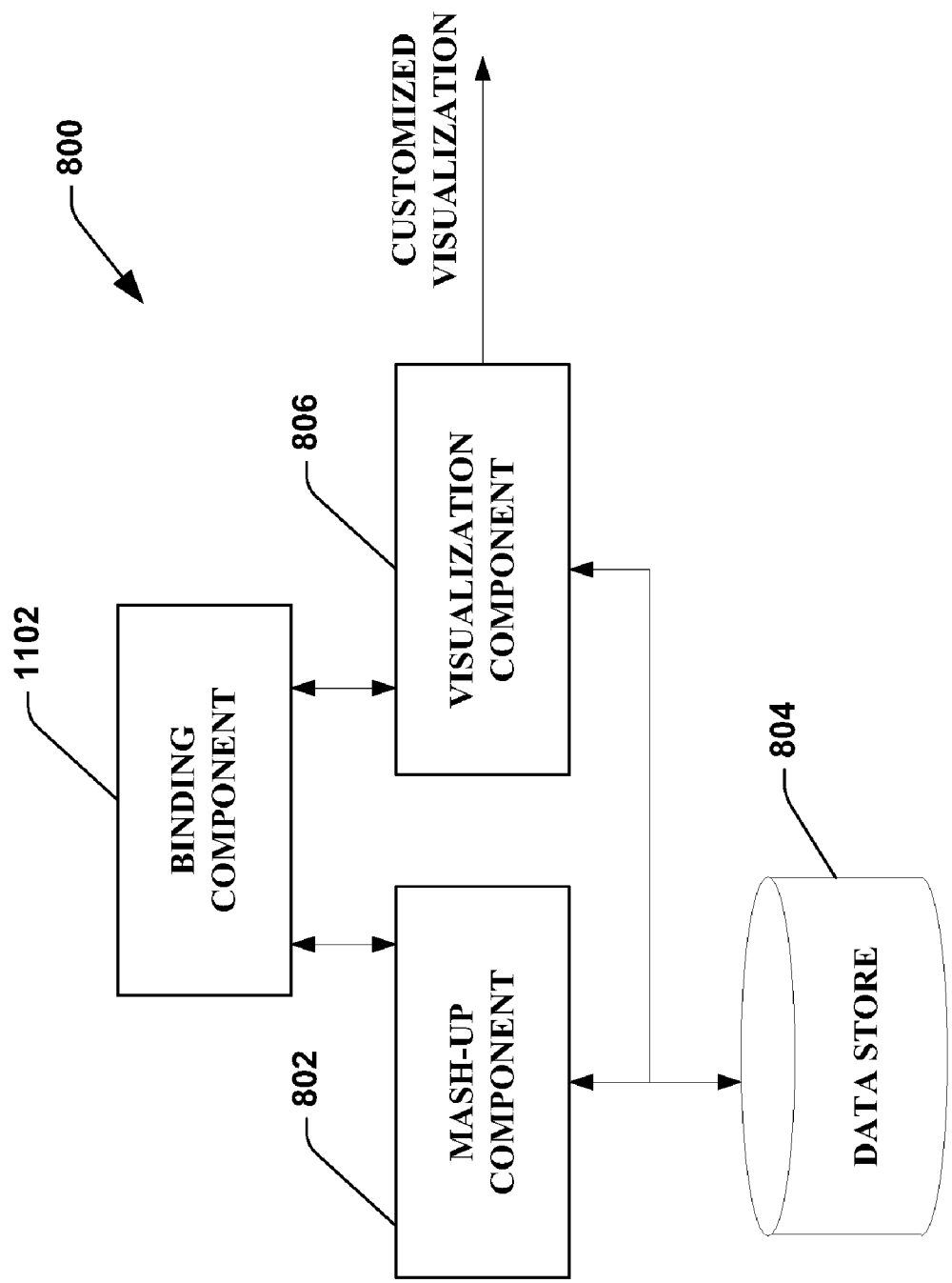
FIG. 11 illustrates an embodiment of a system that includes a binding component.

FIG. 11 illustrates an embodiment of system 800 that includes a binding component. The binding component 1102 provides for binding information from different sources so that an aggregate of information from the various sources appears as if it is coming from a single source. Binding component 1102 can be employed to bind program variables to data from outside sources. For instance, data corresponding to an automated device's temperature stored either in automated device memory or in centralized data storage 120 can be bound to a temperature variable 320 in the interactive program. Binding data in this manner enables real-time updates and display of changing data. Functions can also be bound to manipulate received data to produce rich descriptions of automated device status, performance, and health as well as provide the means to create, update, monitor, transmit and extract data from a plurality of sources including storage devices, and automated device(s). For example, functions can be employed to monitor a device's temperature and power, compare those values to acceptable values (e.g., provided by a manufacturer via a web service or determined by the function itself), and produce an alert indicating the health status of a device (e.g., excellent, good, poor, dangerous . . . ). Furthermore, it should be appreciated that more complex functions can be tied in using binding component 1102 to facilitate improved execution time and real-time display. For instance, complex device diagnostic/prognostic analysis utilizing artificial intelligence techniques such as Bayesian networks and the like can be executed by a server (not shown) associated with a data store (e.g., upon clicking a button in the interface), the result of such analysis being linked to one or more interactive program variables, which can then be used to display the result.

Figure 12:
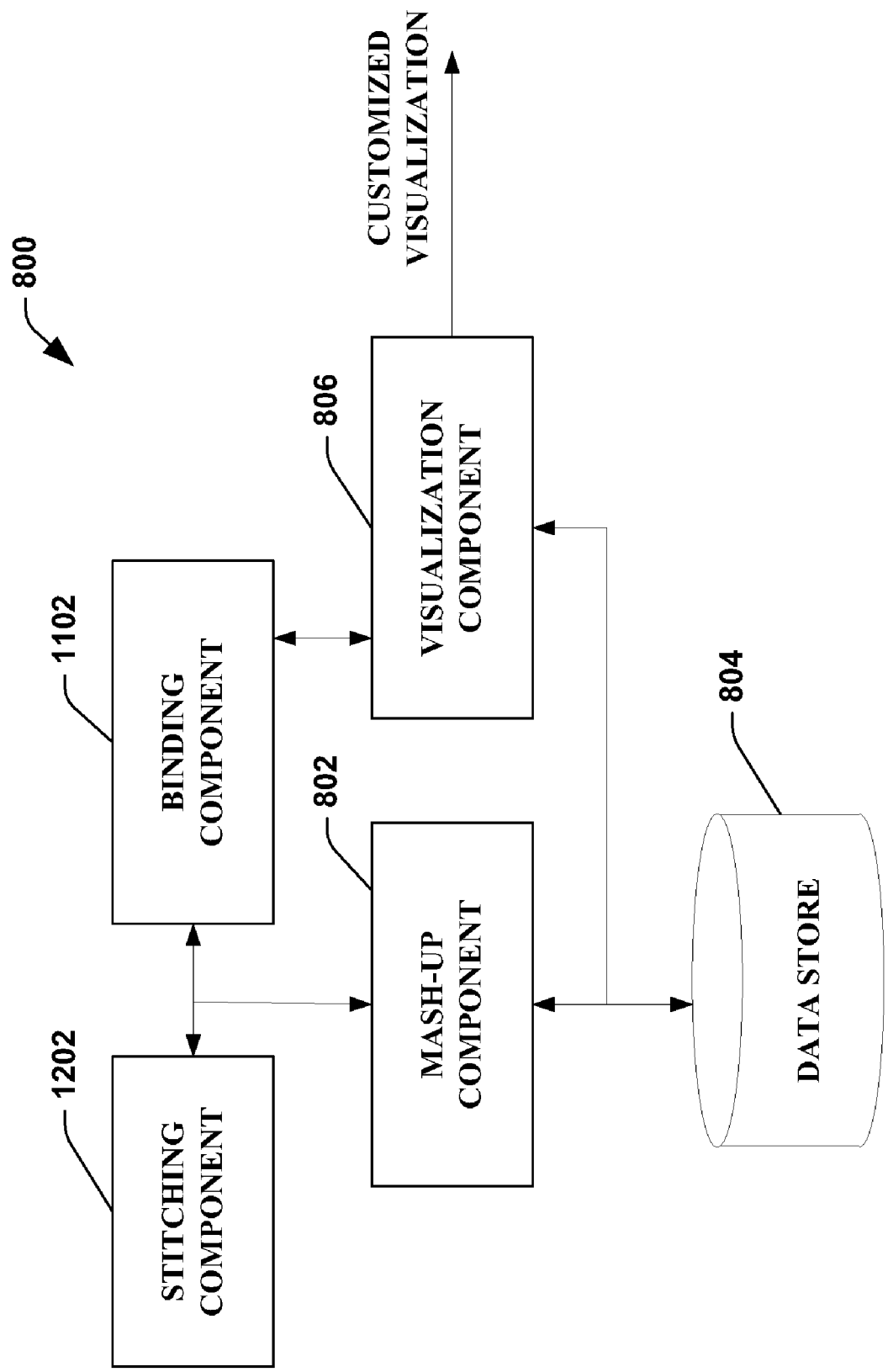
FIG. 12 illustrates an embodiment of a system that includes a stitching component.

FIG. 12 illustrates an embodiment of system 800 that includes a stitching component 1202. The stitching component 1202 provides for stitching data from different sources so that an aggregate of information from the various sources appears as if it is coming from a single source. Moreover, certain images or views can be super-imposed, overlaid, or integrated with other images or views. The stitching component can dynamically combine multiple images to produce a panorama or larger image. In one particular aspect, the stitching component interpolates a final image where component images are not in precise alignment. The stitching component 1202 can analyze, for example, translation and rotation between any two sequencing images (e.g., Lucas Kanade method, or the like). The images are stabilized so that every two images differentiate from each other only in their horizontal component. A panorama image is then stitched from the images. The stitching can be done by combining strips from each image. In one embodiment, base images are taken from a same point in space—they are then arranged into a typically spherical projection by matching edges of the images to each other. Often adjoining areas of the component images are matched for color, contrast and brightness to avoid the stitched parts being easily noticeable due to otherwise easily visible variations between the images.

Figure 13:
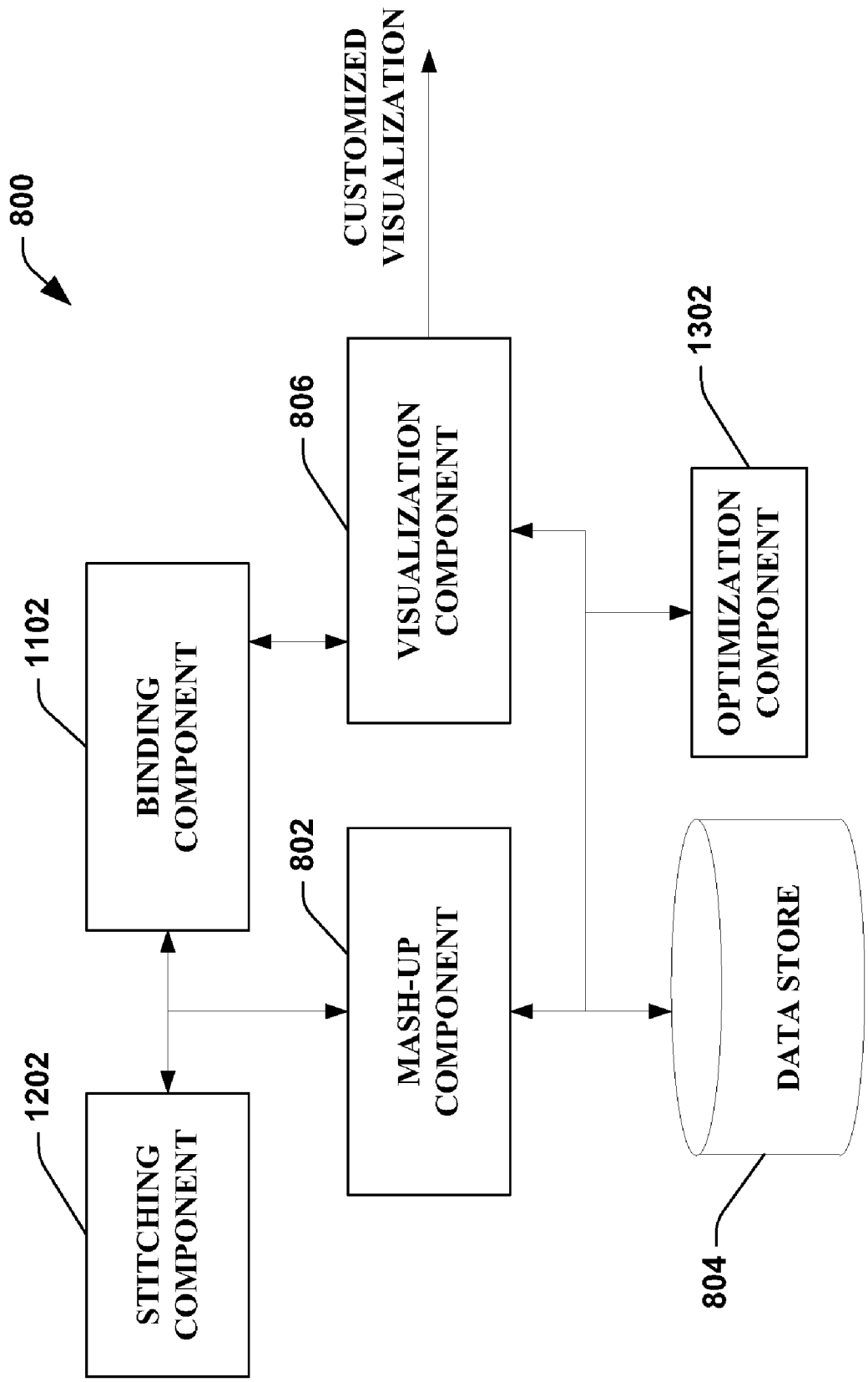
FIG. 13 illustrates an embodiment of a system that includes an optimization component.

FIG. 13 illustrates an embodiment of system 800 that includes an optimization component 1302. The optimization component 1302 facilitates arrangement of items or objects within the mash-up to optimize the mash-up in connection with desired goals or uses. For example, if certain display objects are utilizing a significant amount of bandwidth and slowing down overall system resources, the optimization component can modify frequency of refresh, or filter non-relevant data, resize display objects, turn-off display objects, etc. Moreover, the optimization component can dynamically reposition, re-size, re-orient, display objects as a function of determined or inferred user preferences, needs, priorities, or goals, for example. AI based techniques can be employed to explicitly or implicitly train the optimization component to automated actions in accordance with particular events, states, conditions, extrinsic information, on-going actions, etc.

In view of exemplary aspects described herein, methodologies that can be implemented in accordance with the disclosed subject matter are discussed. While, for purposes of simplicity, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement respective methodologies. It is to be appreciated that the functionality associated with various blocks may be implemented by software, hardware, a combination thereof or any other suitable means (e.g., device, system, process component). Additionally, it should be further appreciated that some methodologies disclosed hereinafter and throughout this specification are capable of being stored on an article of manufacture to facilitate transporting and transferring such methodologies to various devices. Those skilled in the art will appreciate and understand that a methodology can alternatively be represented as a series of interrelated states or events such as for example in a state diagram.

Figure 14:
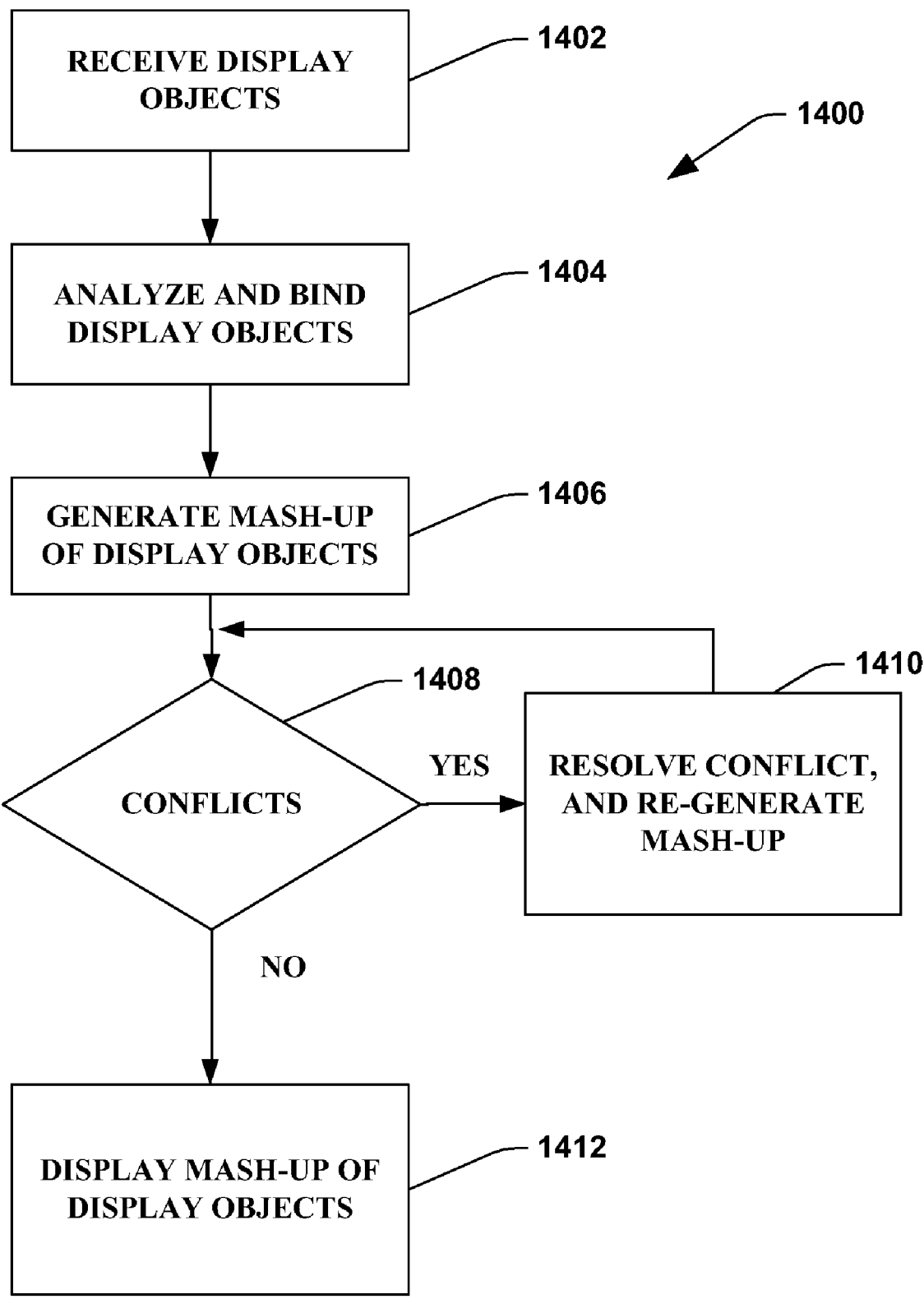
FIG. 14 illustrates an embodiment of a methodology in connection with displaying mash-ups.

FIG. 14 illustrates an embodiment of a methodology in connection with displaying mash-ups. At 1402 display objects are received. The display objects can, for example, be identified or selected by a user as objects of interest, the objects can be part of search results, part of a template of objects sent from a $3^{rd}$ party, etc. At 1404, the respective display objects are analyzed and bound. Attributes of the display objects are determined (e.g., data rate, resolution requirements, types, formatting, sources, underlying code, compatibility issues, and other factors that might influence being bound or integrated with other display objects as part of a mash-up). At 1406, a mash-up of a set of display objects is generated. The mash-up can be ad hoc, configured as a function of determined or inferred user preferences, needs, based on administrative settings, security settings, roles, states, etc.

For example, a user may be asked to furnish a user name and password. Authentication can also be accomplished by receiving a smart card to identify the user, or biometric authentication can be employed. Biometric authentication utilizes physical characteristic unique to individuals. For example, biometric authentication can include but is not limited to identifying a user via fingerprint, palm geometry, retina, facial features (e.g., 2-D, 3-D . . . ), signature, typing pattern (e.g., speed, rhythm . . . ), and/or voice recognition, among others. Identity of a user can be provided, and the user can be matched with particular credentials based on the individual user, group membership, or a position (e.g., administrator, manager . . . ). The credentials can specify type, class and/or category of information that a user can obtain, or alternatively is prohibited from receiving.

At 1408, a determination is made regarding whether or not conflicts exist with the mash-up (e.g., circular references, data or code incompatibility, system resource/capability mismatch, inconsistency with corporate protocols, ethics, security, . . . ). If a conflict exists, at 1410 the conflict is resolved and the mash-up is regenerated. If no conflict exists, at 1412 the generated mash-up is displayed and made available for use.

Figure 15:
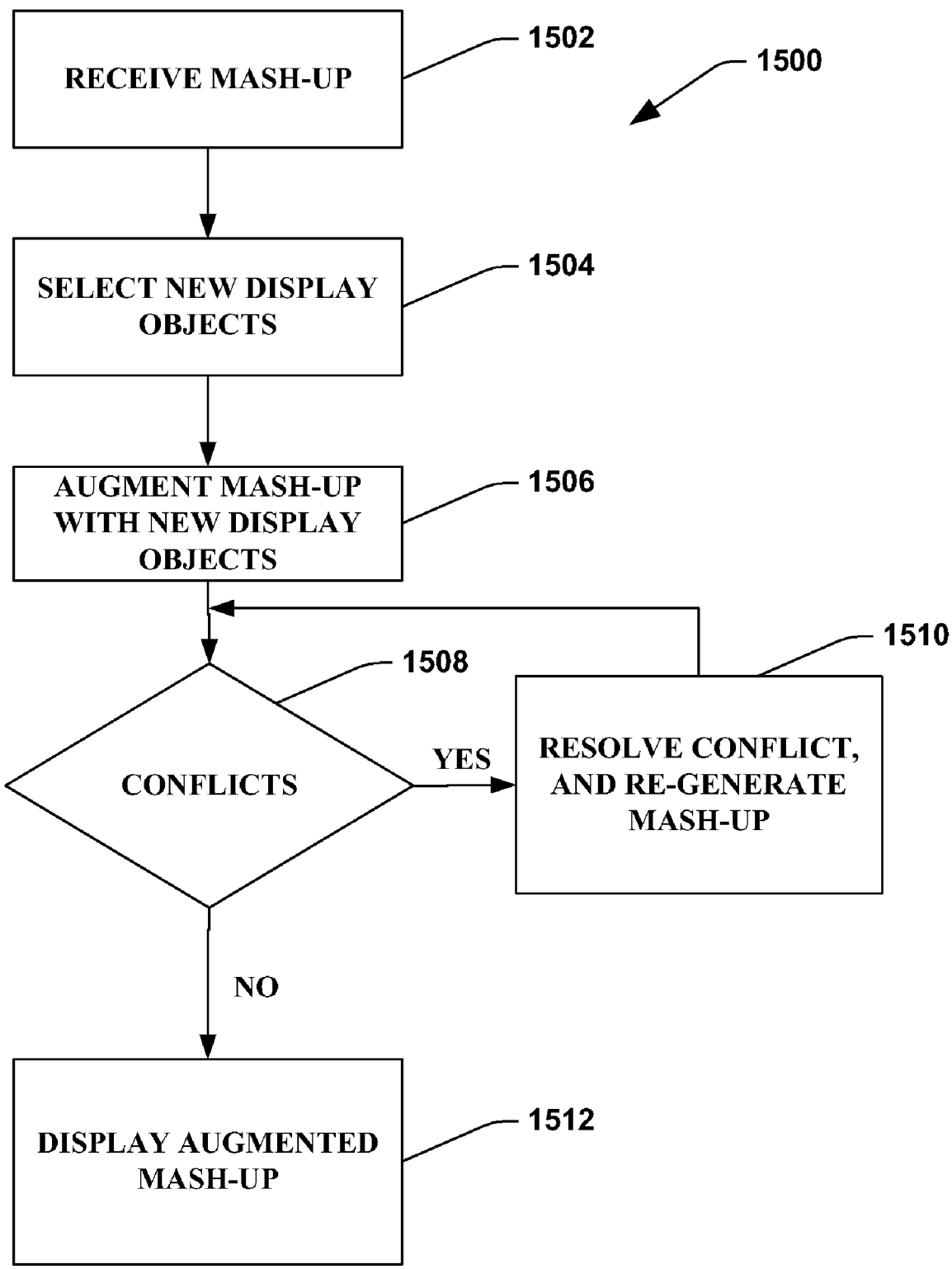
FIG. 15 illustrates a methodology in connection with augmenting an existing mash-up.

FIG. 15 illustrates a methodology in connection with augmenting an existing mash-up. At 1502, a mash-up is received or accessed. At 1504, a new set of display objects are identified, provided, selected, or retrieved. At 1506, the new set of display objects is integrated with the existing mash-up. At 1508, a determination is made as to whether or not a conflict is created by adding the new set of display objects. If yes, the conflict is resolved and the mash-up is regenerated at 1510. If no conflict exists, the augmented mash-up is displayed and made available for use at 1512.

It is to be appreciated that the new display objects may be part of another mash-up, and at 1506, the new mash-up can be integrated with an existing mash-up. Accordingly, at 1502 the new set of display objects can be received from a $3^{rd}$ party (e.g., e-mail, file sharing, etc). Security measures can be implemented that prevent certain display objects from executing if a recipient does not have proper credentials. Likewise, limited access rights may be granted by an author of a mash-up. Access rights can be granted, for example, based on an expiration period.

Figure 16:
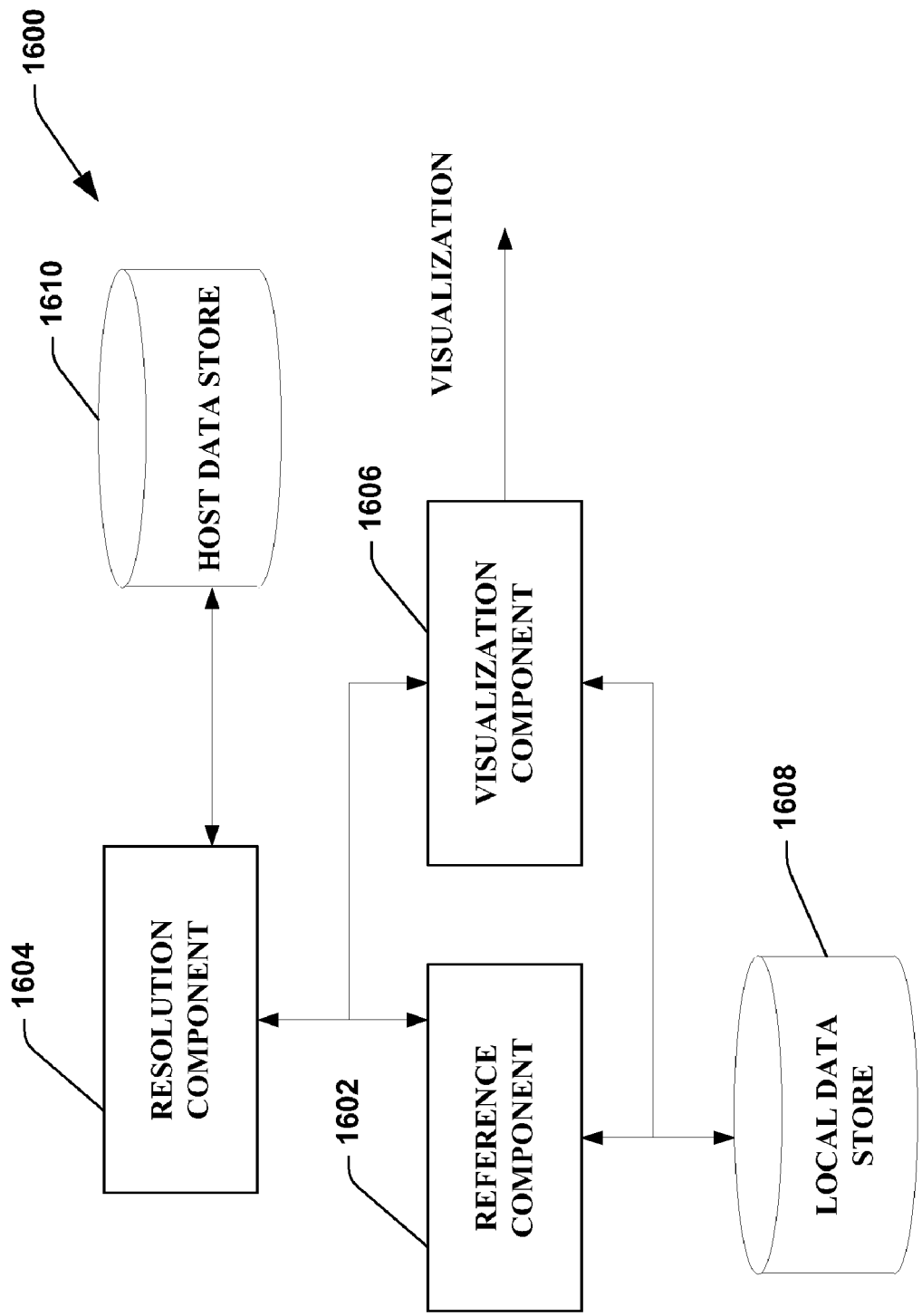
FIG. 16 illustrates an embodiment of a system that regulates resolution as a function of zooming in or out of a display area, or panning across a display area.

Visualization System(s) and Methods) for Preserving or Augmenting Resolution and Data Associated with Zooming or Panning in an Industrial Automation Environment FIG. 16 illustrates a system 1600 that regulates resolution as a function of zooming in or out of a display area, or panning across a display area. Conventional display systems in industrial control environments strive to achieve system resource efficiencies by employing sparse images (e.g., a minimalistic approach to image size) so as to maximize utilization of system resources (e.g., processing resources, bandwidth, data throughput, re-fresh rate, etc.) as well as facilitate system speed or responsiveness. Notwithstanding the aforementioned market forces that are driving systems to employ light-weight/sparse images, the subject matter described herein provides for providing high-resolution images while judiciously utilizing system resources.

Sparse images relating to an industrial automation environment are presented, and the images are pixel-mapped to high-resolution counterparts thereof. Conventionally, as a user zooms in (or magnifies) on an area of a sparse image the area becomes blurry, or loss of resolution manifests. However, in accordance with innovations described herein as a user zooms in on an area of an image that is pixel-mapped to a higher-resolution version thereof, data corresponding to the area under focus is streamed to the display area coincident with respect pixels mapped thereto and resolution of the image area can be augmented, preserved, or enhanced. The high-resolution image data is stored at a remote location and as an area on a client device is zoomed in on, data from the remote location is streamed to the client device as a function of the level of zoom, and region being magnified. Accordingly, as a user zooms in on a particular region of the image, instead of the image becoming grainy, or blurry, the image maintains or increases resolution as a result of image data being streamed to the user to supplement the region of interest with more image data.

In FIG. 16, reference component 1602 determines or infers focus of attention of the user, or level and rate of zoom into or out of a display area. Resolution component 1604 receives reference information from the reference component 1602. General image data can for example, be stored on a local data store 1608; however, as a user is changing point of reference within an image or display area, the resolution component can determine amount of additional image data required to supplement the image data currently available in order to augment, preserve, or increase resolution of the area of interest. Additional image data (as well as other data, e.g., advertisements, supporting documentation, . . . ) can be provided by host data store 1610 that stores high resolution versions of the image data. Visualization component supplements the existing image data with additional image data to create a rich view that dynamically preserves resolution of an image as a user zooms in on an area of interest.

Figure 17:
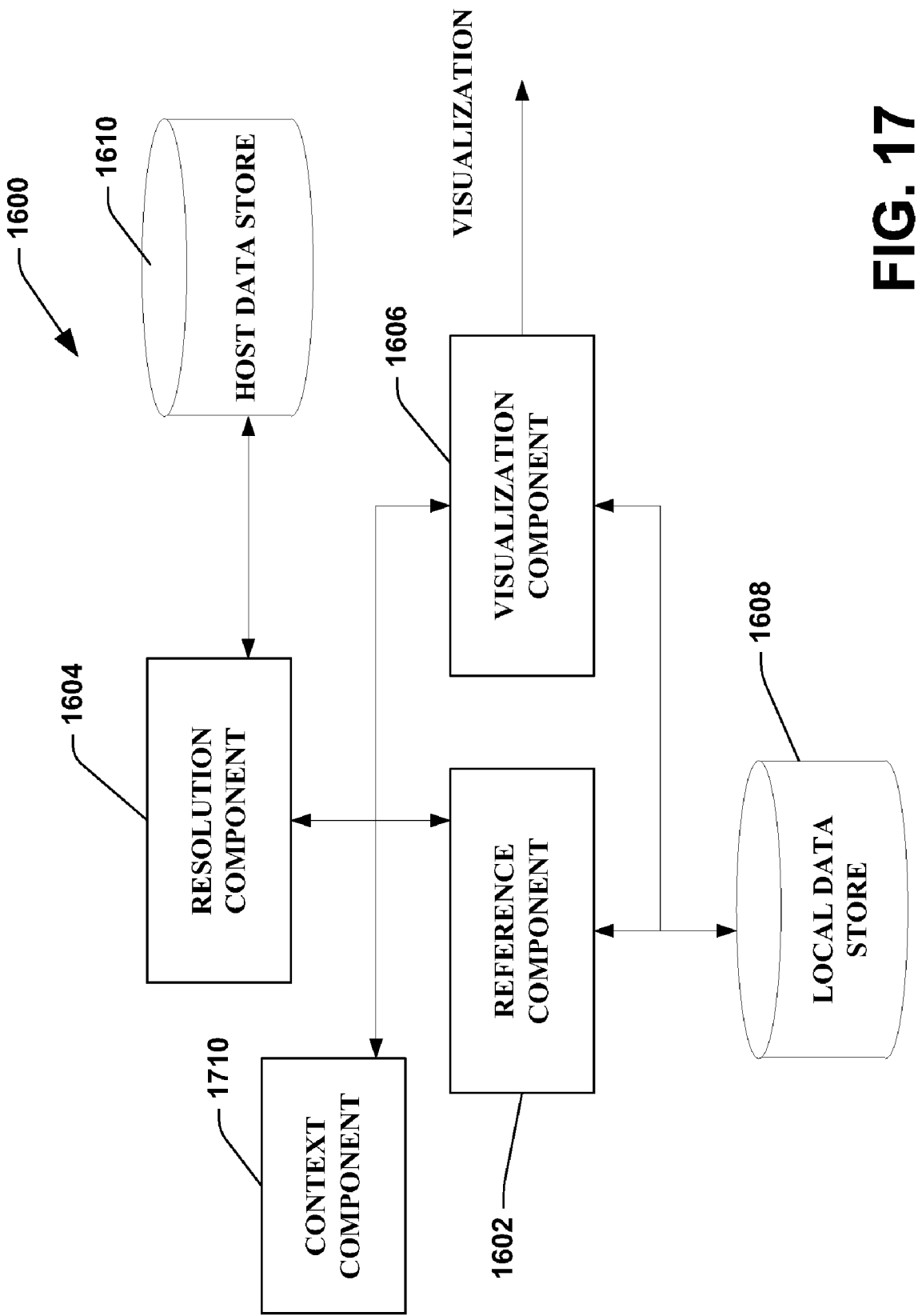
FIG. 17 illustrates an embodiment of a system that includes a context component.

FIG. 17 illustrates an embodiment of system 1600 that includes a context component 1710. The context component 1710 facilitates determining or inferring user state, goals, intent, etc. Knowledge of such user context facilitates the resolution component 1604 to identify subsets of additional data to request that will enhance user visualization experience. For example, if a use is viewing a pump, and it is determined that the pump is leaking and the user's goal is to fix the pump as the user zooms in on an area associated with the leak, the resolution component can request image data associated with areas of the pump that might be associated with the leak and down-weight image data that would not facilitate diagnosing or understanding the problem.

Figure 18:
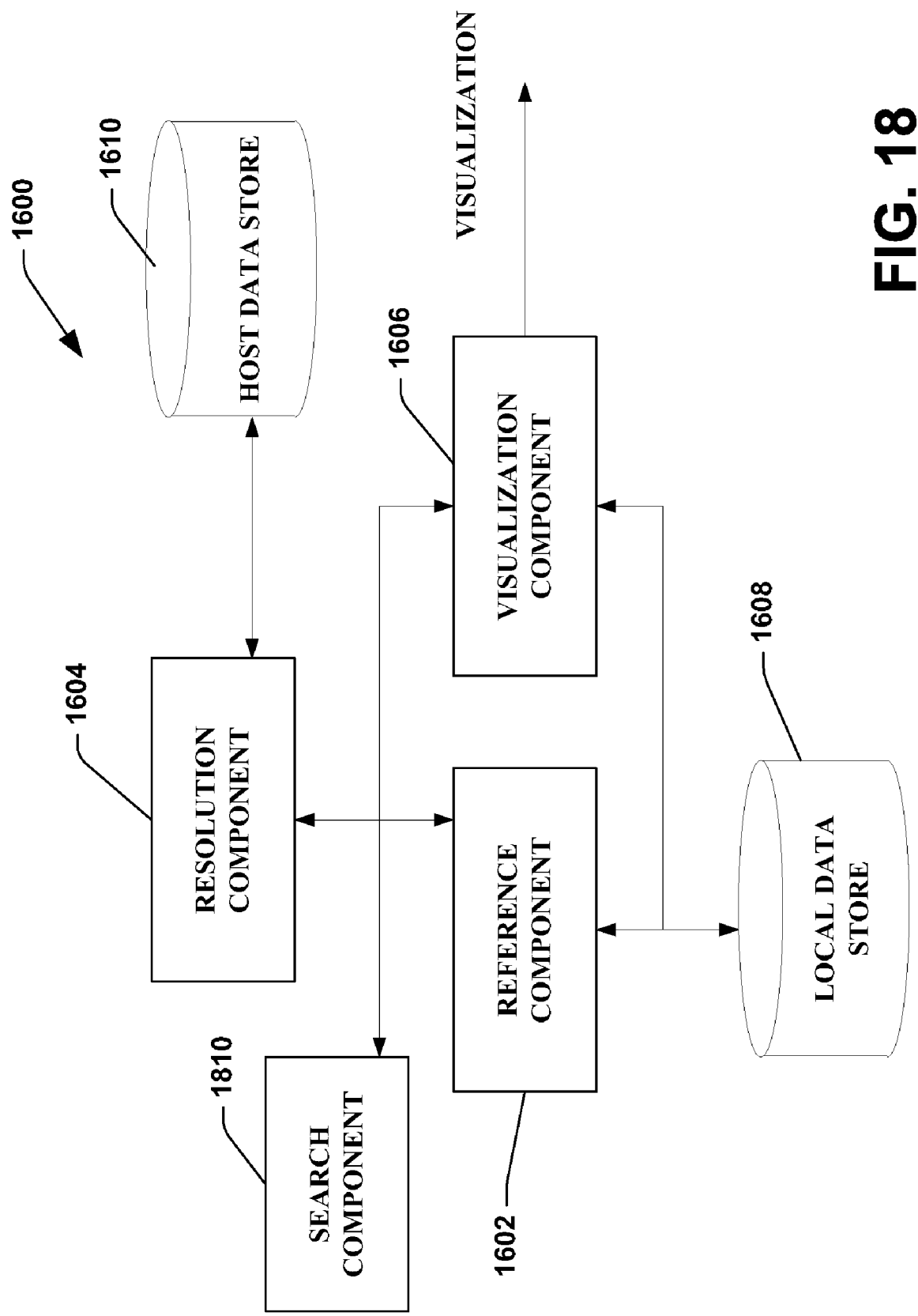
FIG. 18 depicts an embodiment of system that includes a search component.

FIG. 18 depicts an embodiment of system 1600 that includes a search component. A user can type in a query for an image (e.g., motor number 7685) and image of the requested item will be found. In addition to a sparse image representation being found, supplemental data can be identified a priori that may be useful for streaming to the user. For example, if a user entered a focused query such as <motor number 7685 gaskets> the initial search results can include a sparse representation of the motor as well as regions with gaskets highlighted. Image data for the motor gaskets could already be pre-identified and optionally pre-cached so that as a user zooms in on a particular gasket area a fast response time is provided with respect to serving up image data regarding the gasket.

Figure 19:
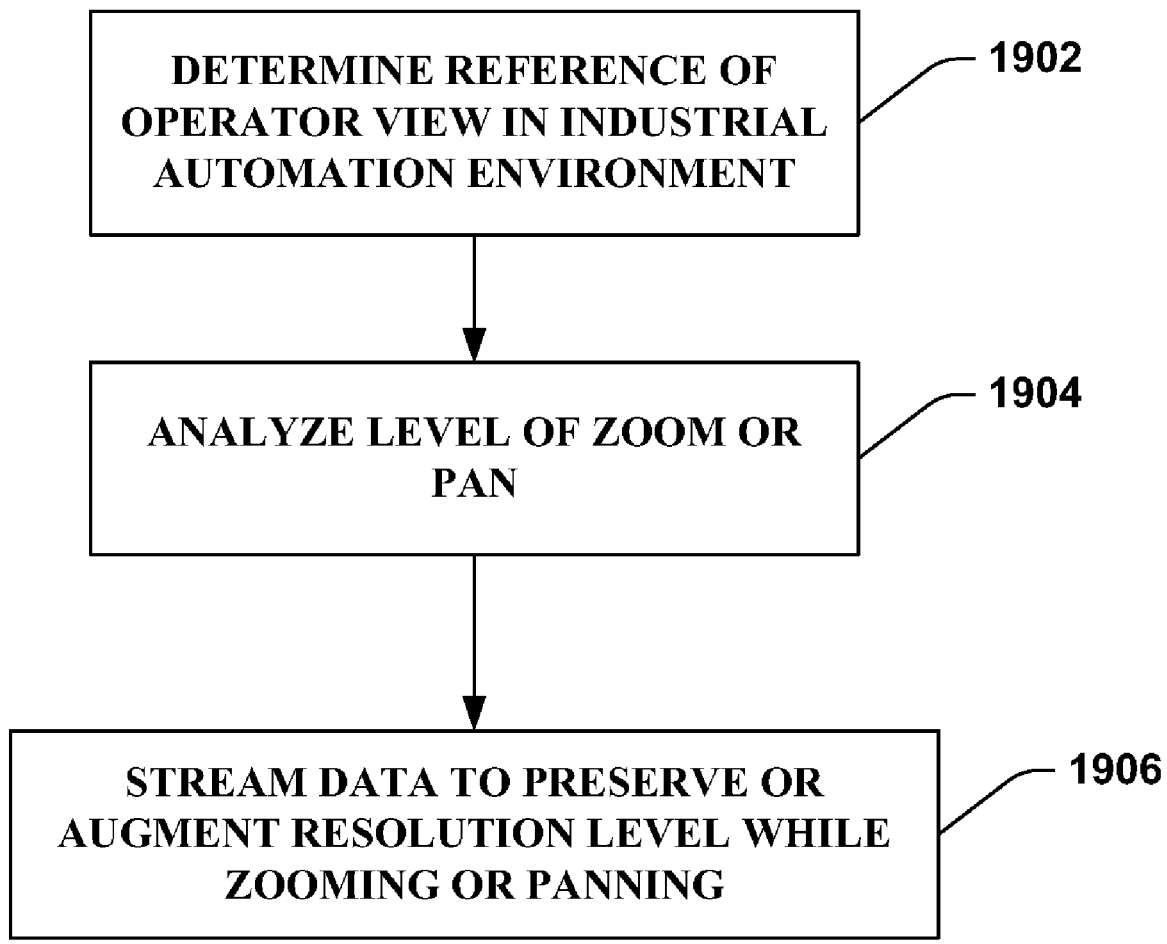
FIG. 19 is a flow diagram describing a high-level methodology in connection an embodiment.

FIG. 19 is a flow diagram describing a high-level methodology in connection an embodiment. At 1902, determination or inference is made regarding reference of operator view of image data in an industrial automation environment. An initially viewed image is identified, coordinates with respect to level of zoom, area being viewed, pixel mapping to respective coordinates of view are determined. As a user changes focus of attention (e.g., zooms in, zooms, pans . . . ), level of zoom and pan are analyzed at 1904, and at 1906 data is streamed to the user as a function of zoom or pan level that enhancing a visualization experience. For example, additional image data can be streamed to augment, preserve, or increase resolution of an area of interest. Likewise, tertiary information can be made available (e.g., as a user zooms in on a gasket, documents related to the gasket or links to associated information can be made available). Thus, image data is not only pixel-mapped to corresponding image data bit it can also be contextually mapped to information or sources of information relevant to the image data.

Figure 20:
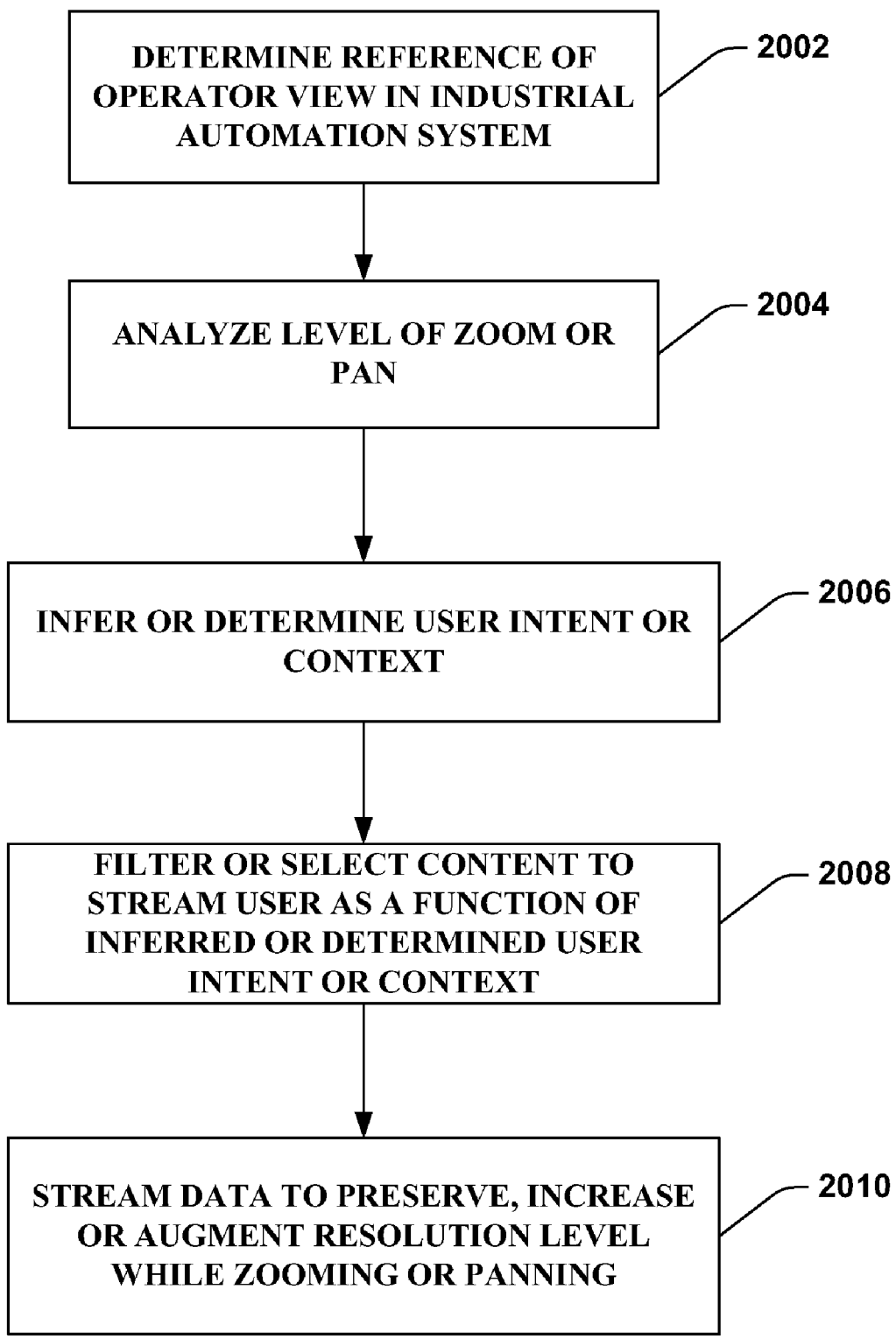
FIG. 20 is a flow diagram describing a high-level methodology in connection with another embodiment.

FIG. 20 is a flow diagram describing a high-level methodology in connection with another embodiment. At 2002, determination or inference is made regarding reference of operator view of image data in an industrial automation environment. An initially viewed image is identified, coordinates with respect to level of zoom, area being viewed, pixel mapping to respective coordinates of view are determined. As a user changes focus of attention (e.g., zooms in, zooms, pans ...), level of zoom and pan are analyzed at 2004, and at 2006 a determination or inference is made regarding user state, context, intent, goals, etc. As a function of the context analysis, additional relevant data is filtered or selected at 2008. At 2010, the selected and filtered additional data is streamed to the user to augment, preserve, or increase resolution level.

Figure 21:
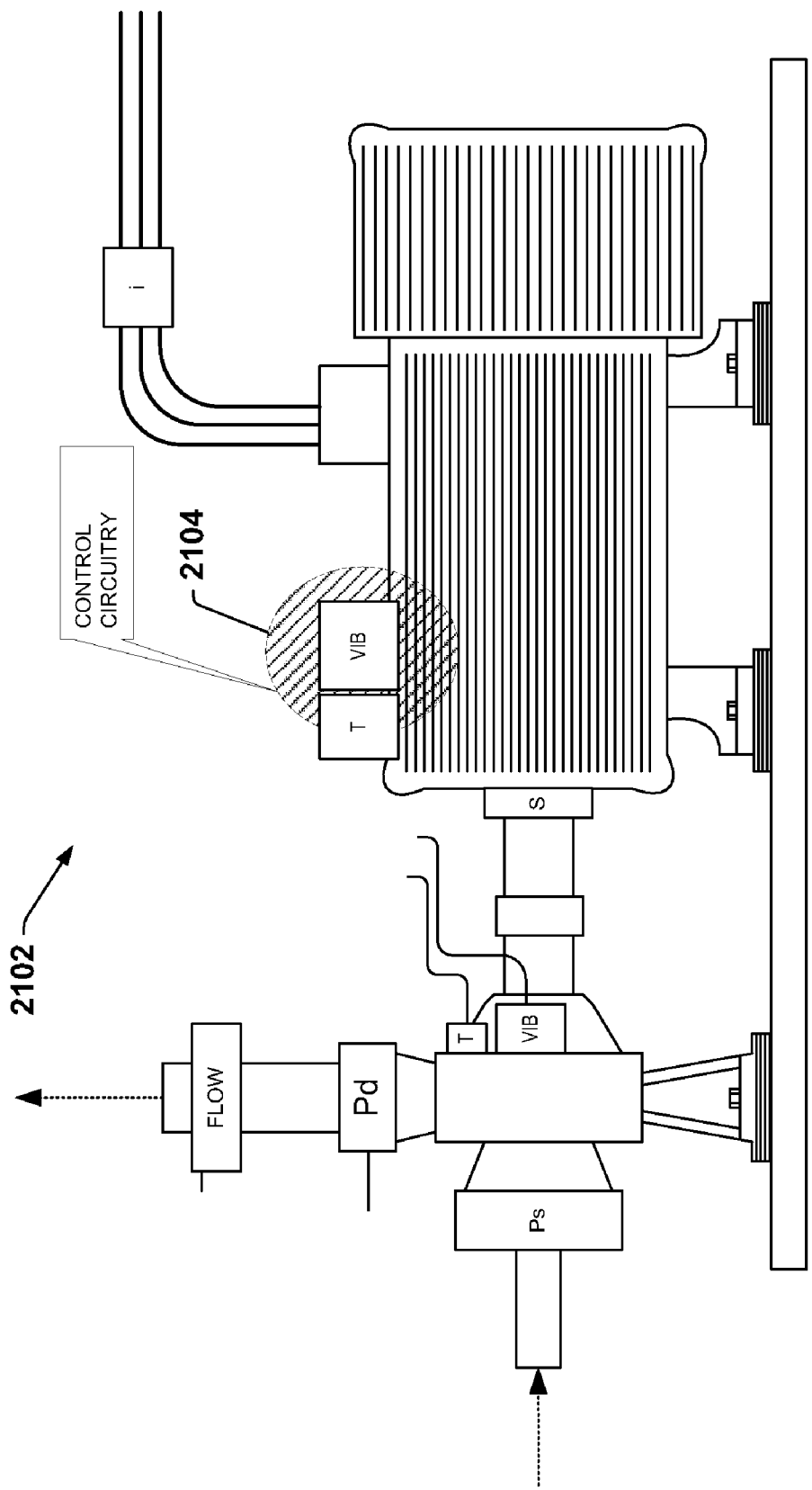
FIGS. 21 and 22 illustrate an example of aforementioned resolution features in accordance with embodiments.
Figure 22:
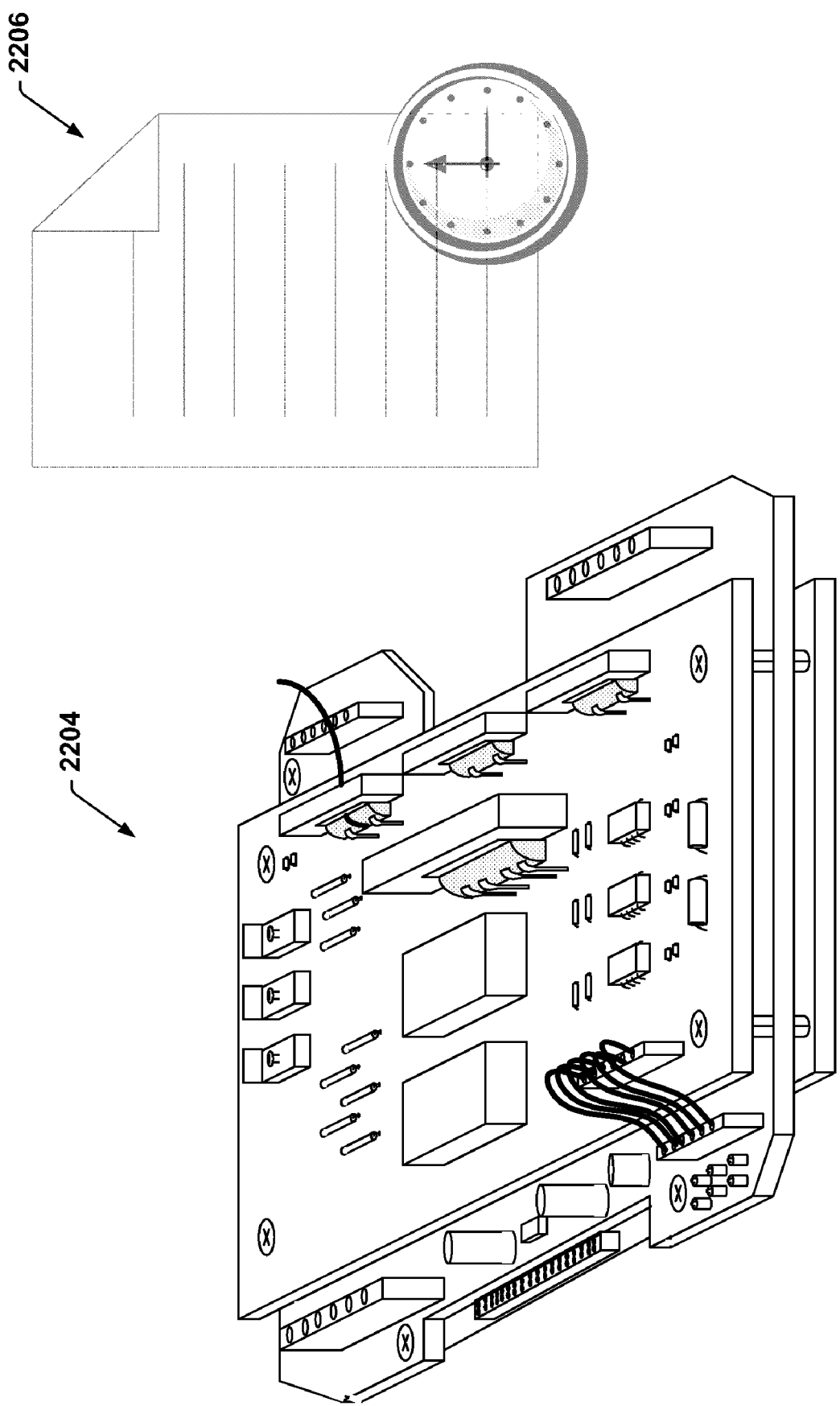

FIGS. 21 and 22 illustrate an example of the aforementioned resolution features. A query is made for a motor having some control problems within a factory. An image of the motor 2102 is made available to the user. The image is a sparse representation of the motor that is pixel mapped to additional image and other data stored remote from a local computer that is rendering the motor image. The motor is having control problems, and a user is interested in viewing aspects of control equipment associated with the motor. The user is directed to an area 2104 where control circuitry resides. The area can be highlighted as well as called out as "control circuitry" to facilitate the user to quickly converge on an image area of interest. As the user starts zooming in on area 2104, data corresponding to the area of interest is streamed to the user as a function of zoom. Since the circuitry is enclosed within a housing, and it was determined or inferred that the user desires to view the control circuits, image data corresponding to the control circuitry within the housing is streamed to the user.

FIG. 22 illustrates a high resolution image of the control circuitry 2204 of the motor within the housing. Thus, the resolution component 1604 not only can request information corresponding to actual image data being viewed but also other types of data (e.g., corresponding to an X-ray type of image that provides for viewing images of items behind walls or solid surface). Additionally, other information 2206 (e.g., documents, data logs, design sheets, trouble-shooting guides, URLs, etc). can be made available to the use to enhance the visualization experience as well as achieve goals (e.g., fixing the control problem associated with the motor, and getting back on line).

Figure 23:
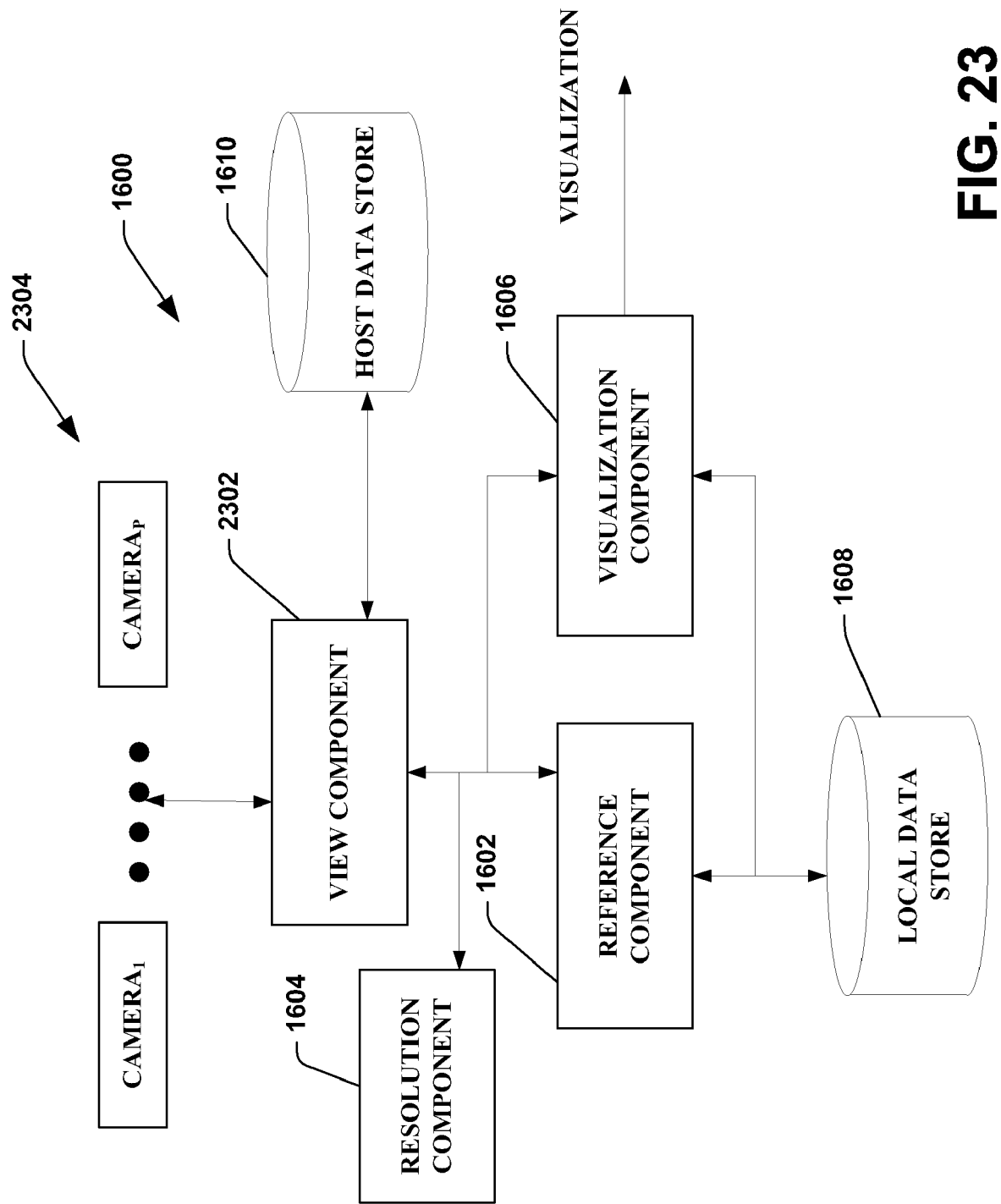
FIG. 23 illustrates an embodiment of a system that includes a view component and a set of cameras.

Dynamically Generating Real-time Video Visualizations in Industrial Automation Environment as a Function of Context and State Information It is to be appreciated that static image data can be utilized as well as real-time image data. For example, in FIG. 23, an embodiment of system 1600 is shown that includes a view component 2302 and a set of cameras 2304. The view component 2302 provides for viewing an object (e.g., machine, process line, worker, conveyor, workstation, pump, motor control center, drives, field device ... and the like) from a plurality of viewing angles (e.g., via one or more of the cameras 2304). Real-time images can be served to a user, and the user can navigate about the object from numerous angles. Resolution component 1604 can facilitate regulating level of resolution as a user zooms in or out of an image area.

Figure 24:
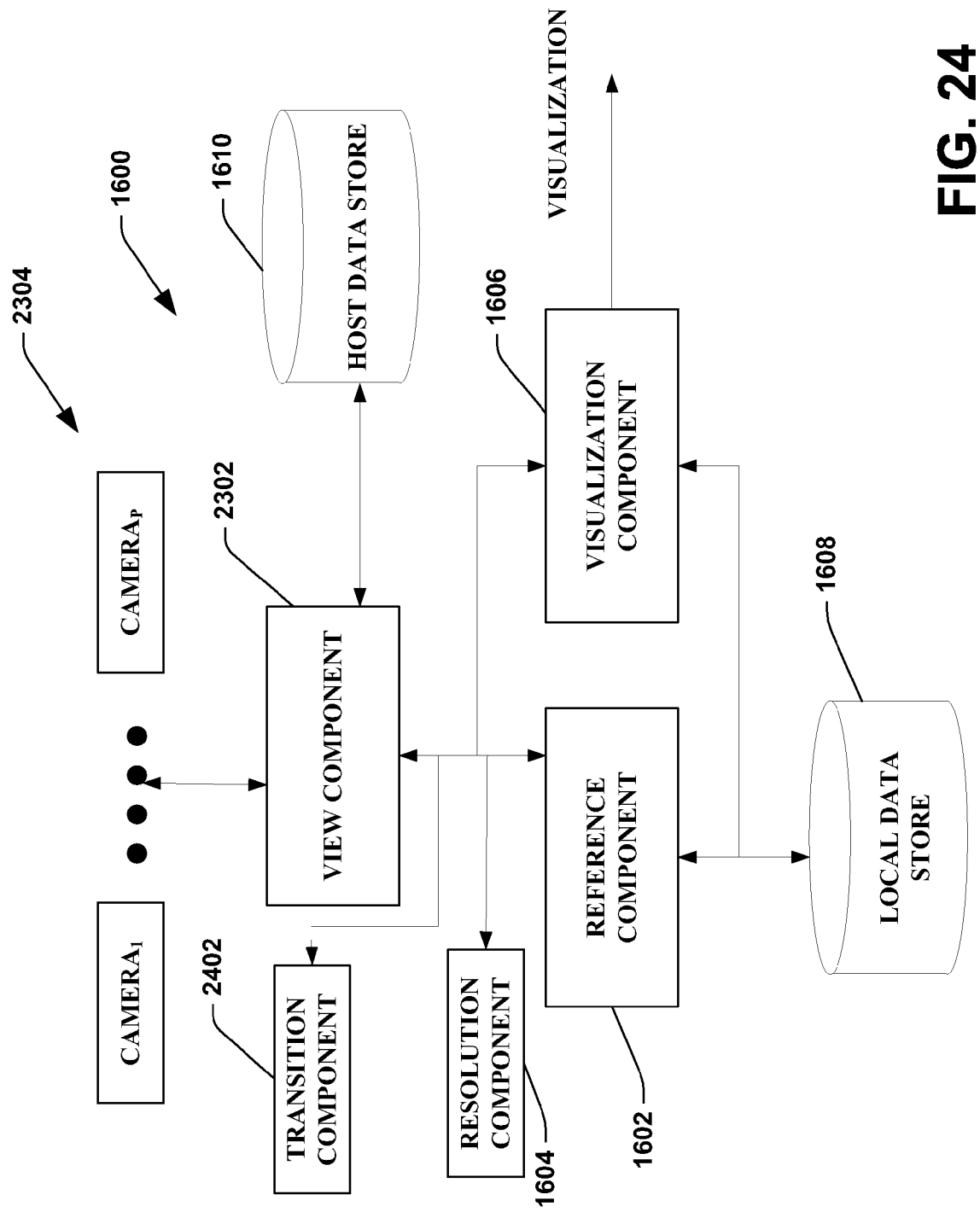
FIG. 24 illustrates another embodiment of system that includes a transition component.

FIG. 24 illustrates another embodiment of system 1600 that includes a transition component 2402. The transition component 2402 provides for seamlessly transition from one camera view to another. For example, when it is determined that as a user is panning across an object and another camera should be switched to in order to continue viewing the object, transition component 2402 can pre-fetch image data from the other camera and stitch it to the image data of the prior camera and vice versa during switching of cameras as a primary image sources so that there is a seamless transition from one camera to another such that the user is unaware that a different camera is now being used. In other words, use of the transition component 2402 and cameras 2304 provides for rotating about the object along numerous axes and planes in a manner that results in a continuous and smooth view of the image such as for example when an individual walks around an object and continues viewing the object during traverse thereof.

Figure 25:
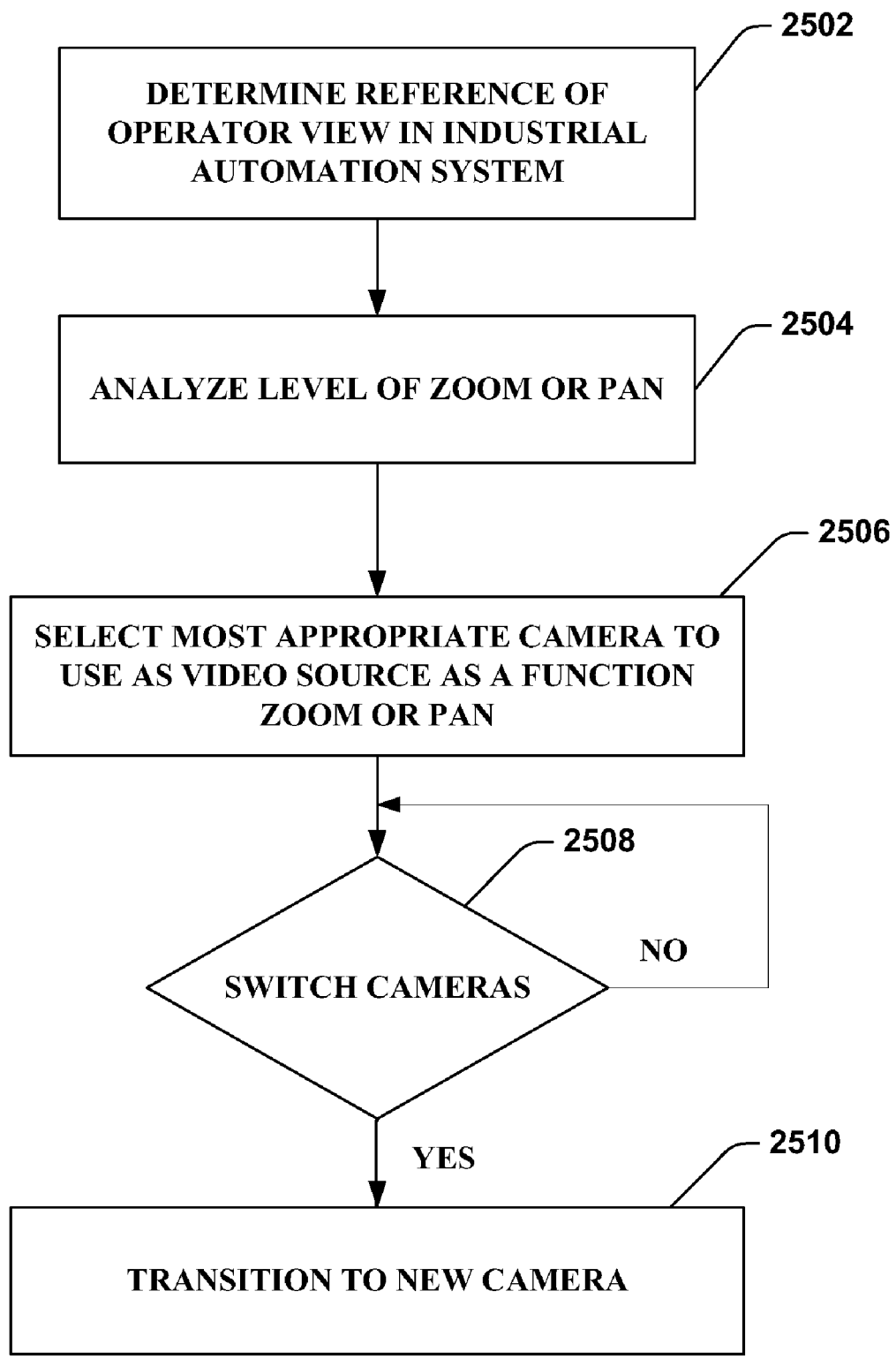
FIG. 25 illustrates a methodology in accordance with panning across an object using real-time image data.

FIG. 25 illustrates a methodology in accordance with panning across an object using real-time image data. At 2502 operator viewing reference is determined, or desired view is determined or inferred. At 2504, level of zooming and panning is analyzed. As a function of the analysis, at 2506 a most appropriate camera to use as a video source is selected. At 2508, a determination is made if cameras should be switched in view of change in operator state, intended or desired view, panning, zooming, etc. If no, the process continues to employ the same camera. If yes, at 2510 a new camera is selected to use as a video source, and image data is stitched together from both cameras to facilitate transitioning to the new camera.

Figure 26:
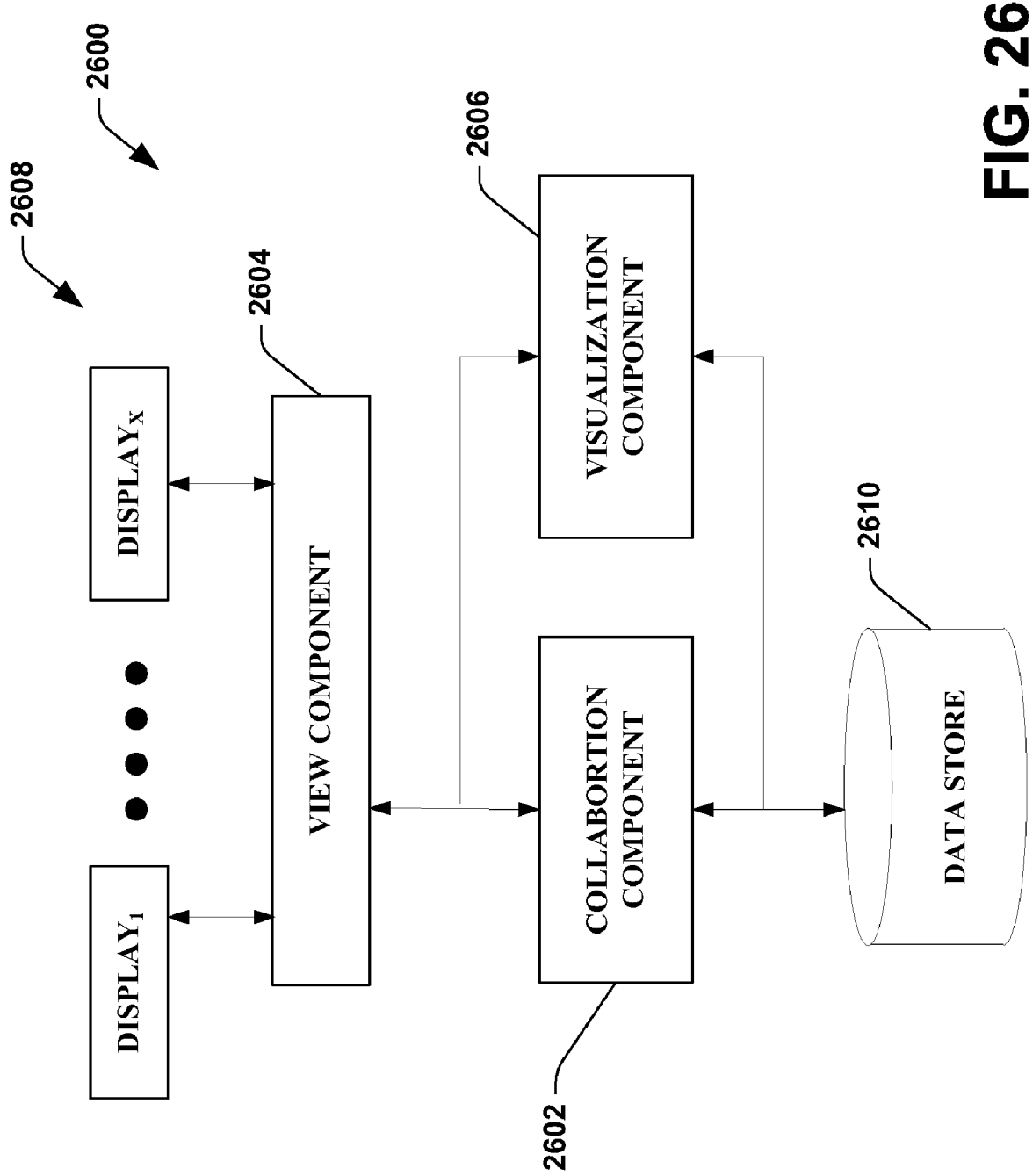
FIG. 26 illustrates an embodiment that facilitates real-time visual collaboration in an industrial automation environment.

Collaborative Environment for Sharing Visualizations of Industrial Automation Data FIG. 26 illustrates a system 2600 that facilitates real-time visual collaboration in an industrial automation environment. In an industrial automation environment, numerous devices have displays and associated configurations. The respective displays are typically associated with data sources and respective display drivers or video cards. The autonomous and vertical design structure of such system designs creates a need to be proximate to devices and displays of interest in order to maximize a visualization experience. System 2600 mitigates disadvantages associated with conventional display architectures by providing a rich collaborative environment where multiple displays can be shared and connected so as to provide a visualization environment that promotes sharing of image data as well as a workspace environment that enables multiple individuals located in remote locations from each other to see and work on same items in a collaborative workspace.

Collaboration component 2602 receives instructions or requests to initiate a collaboration with another user, machine, or display. The collaboration component provides for joining multiple users, machines or displays to create a common view or workspace via view component 2604 and visualization component 2606. For example, if a device have a display (that is one of X displays 2608, X being an integer) and a plurality of users desire to view the display concurrently as well as interact therewith the following occurs. Collaboration component 2602 identifies the users that desire to collaborate in connection with the display. The view component 2604 selects the display of interest and serves as a proxy for the display. The display data is multiplexed by the view component so that M number of the users (M being an integer) can see the display as part of a visualization generated by visualization component 2606. Data store 2610 can store data, code, lists, mapping info., addresses, etc. in connection with facilitating establishing a collaborative session.

In another example, multiple displays can be dynamically accessed and viewed as part of a shared working environment. User 1 (having display 1) can share his display with user 10 (having displays 10 and 11), and vice versa. View component 2604 allows for users to seamlessly designate displays of interest and provide for concurrent access to such displays. The user's display can serve as a thin client that displays information projected on displays of interest. Multiple display views can be shown as a mash-up or through independent portal views.

Figure 27:
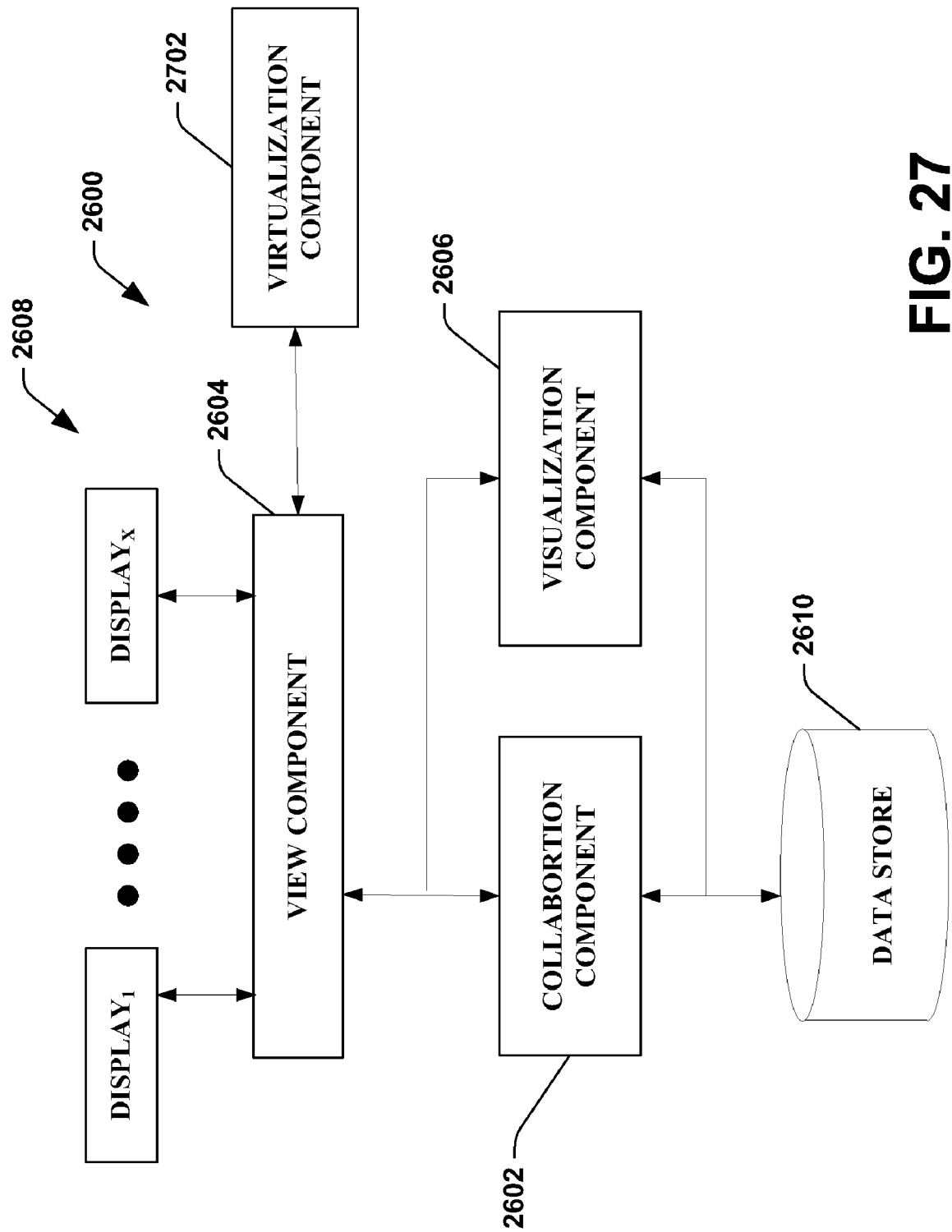
FIG. 27 illustrates an embodiment of a system that includes a virtualization component.

FIG. 27 illustrates an embodiment of system 2600 that includes a virtualization component 2702. It can be appreciated that multiple people writing to a common real-time display can be problematic and lead to input conflicts and other problems. Virtualization component 2702 provides for creating a virtualized workspace coincident with the collaborative efforts. For example, if multiple users are trouble-shooting a device from disparate locations and viewing/interfacing with a common display for the device, the virtualization component can create a virtualized workspace corresponding to the device that provides for chatting, virtualized inputs and is a conflict arises via inputs they are not manifested into a real-time input. A virtualized workspace can implement a lag prior to manifesting entries into real-world events and thus facilitate mitigating conflicts. Moreover, the virtualized workspace can provide enhanced functionality for collaborating (e.g., chat space, notes taking, logging info., teleconferencing, video-conferencing, web-conferencing, etc.).

The virtualization component 2702 can also create avatars of individuals as well as devices to facilitate collaborating in a virtual environment. For example, if user 1 desired to engage user 15 or user 20 in connection with a trouble-shooting problem, he could view a virtual representation of current status of user 15 and user 20. If user 15's avatar was in a meeting, but user 20's avatar appeared available, user 1 could send a message to user 20's avatar and engage user 20 in connection with a collaborative trouble-shooting effort.

Figure 28:
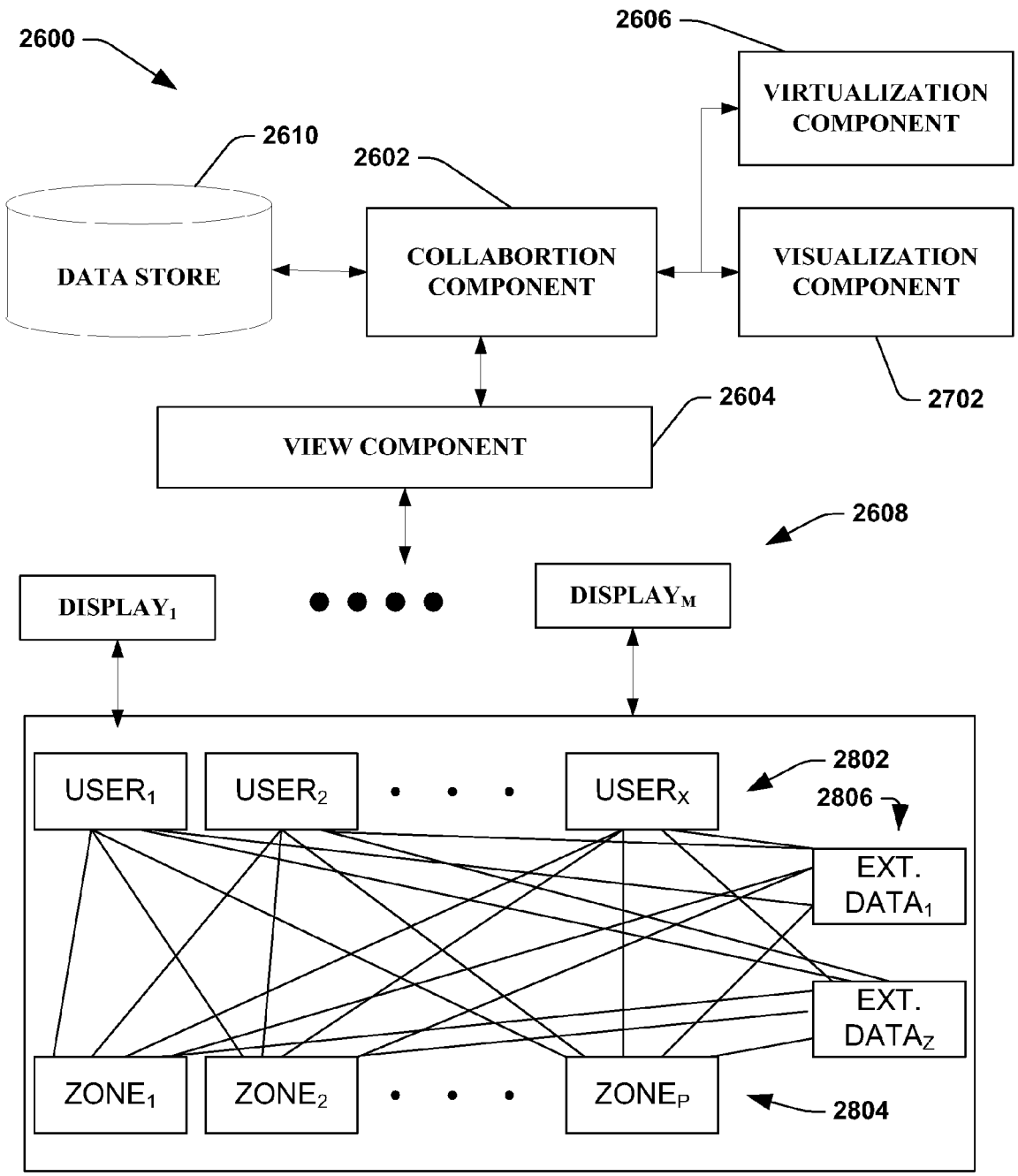
FIG. 28 illustrates an embodiment of system where X number of multiple users (X being an integer) can collaborate with one another via respective displays, and visually share information regarding a plurality of zones as well as extrinsic data.

FIG. 28 illustrates an embodiment of system 2600 where X number of multiple users (X being an integer) can collaborate with one another via respective displays 2608, and visually share information regarding a plurality of zones 2804 as well as extrinsic data 2806. Respective users can hand over control to other users, show other users what is being displayed on their displays, work together in a virtual workspace and make respective zone information available to one another. System 2600 creates a rich mesh-network that allows for information to be seamlessly shared. However, it is to be appreciated that security policies and protocols can be implemented that prevent unauthorized individuals from accessing certain information. Information can be filtered, blocked, parsed, etc. as a function of user roles, needs, permissions, or authentication, for example.

Figure 29:
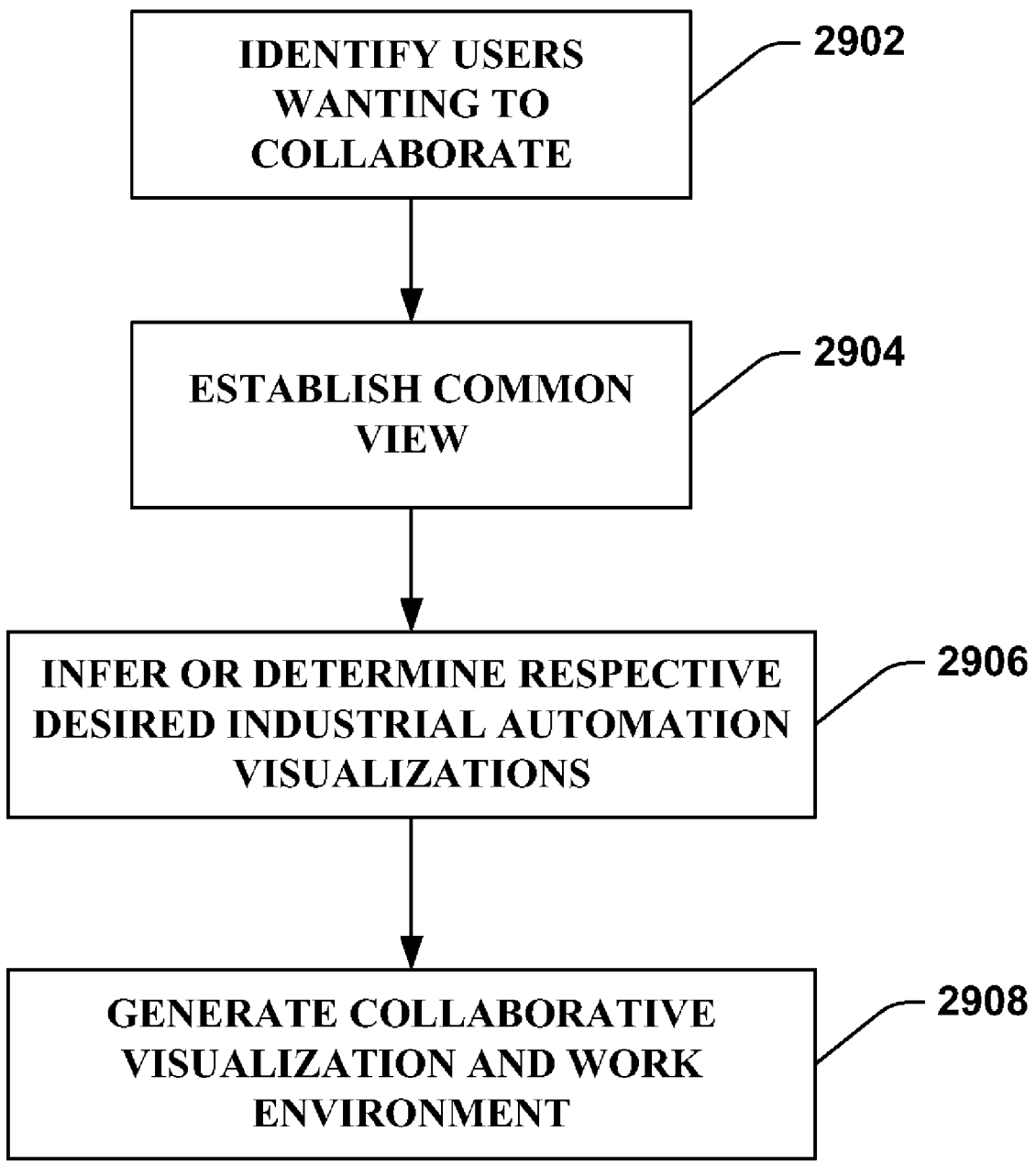
FIG. 29 illustrates a high-level methodology in connection with collaboration of users and equipment.

FIG. 29 illustrates a high-level methodology in connection with collaboration of users and equipment. At 2902, users or machines desiring, requested, or needed to collaborate are identified. The identification can be a function of user opt in, requests, events, etc. Moreover, information of interest to one or more user can be identified without prompting or requesting such interest information from the user(s). The inference can be based on identity, role, location, and/or on text in a production facility by matching the user's location, context, and/or role with the location and/or status of device/equipment/system being monitored. User identification can be performed utilizing a plurality of identification techniques and the disclosed aspects are not limited to any one known technique. Based on the user identification, user information is retrieved, and can include contextual information and/or historical information. Real-time data regarding relevant devices and/or equipment can also be obtained.

At 2904, a common view for the collaborating entities is established. A determination can be made regarding whether a user interest matches the device and/or equipment information obtained. For example, based on a user's context and/or historical information a determination or inference can be made that the user would be interested in information regarding device/equipment in a particular area of an industrial setting. If the determination or inference is that the user would most likely be interested in the information the information is presented to the user(s) via the common view. It should be understood that more than one user can receive substantially the identical information or different information at substantially the same time. It is to be understood that this act can be recursive such that any number of devices/equipment can be polled for information. Moreover, it is to be appreciated that automated and/or dynamic polling of device/equipment can be employed in connection with alternate aspects. For example, a system can be configured to automatically poll and/or report device/equipment information dynamically in accordance with inferring a user interest in such information.

At 2906, desired or appropriate industrial automation visualizations are determined or inferred, and at 2908, a collaborative visualization, or work environment is generated for viewing data or working with data of interest.

Figure 30:
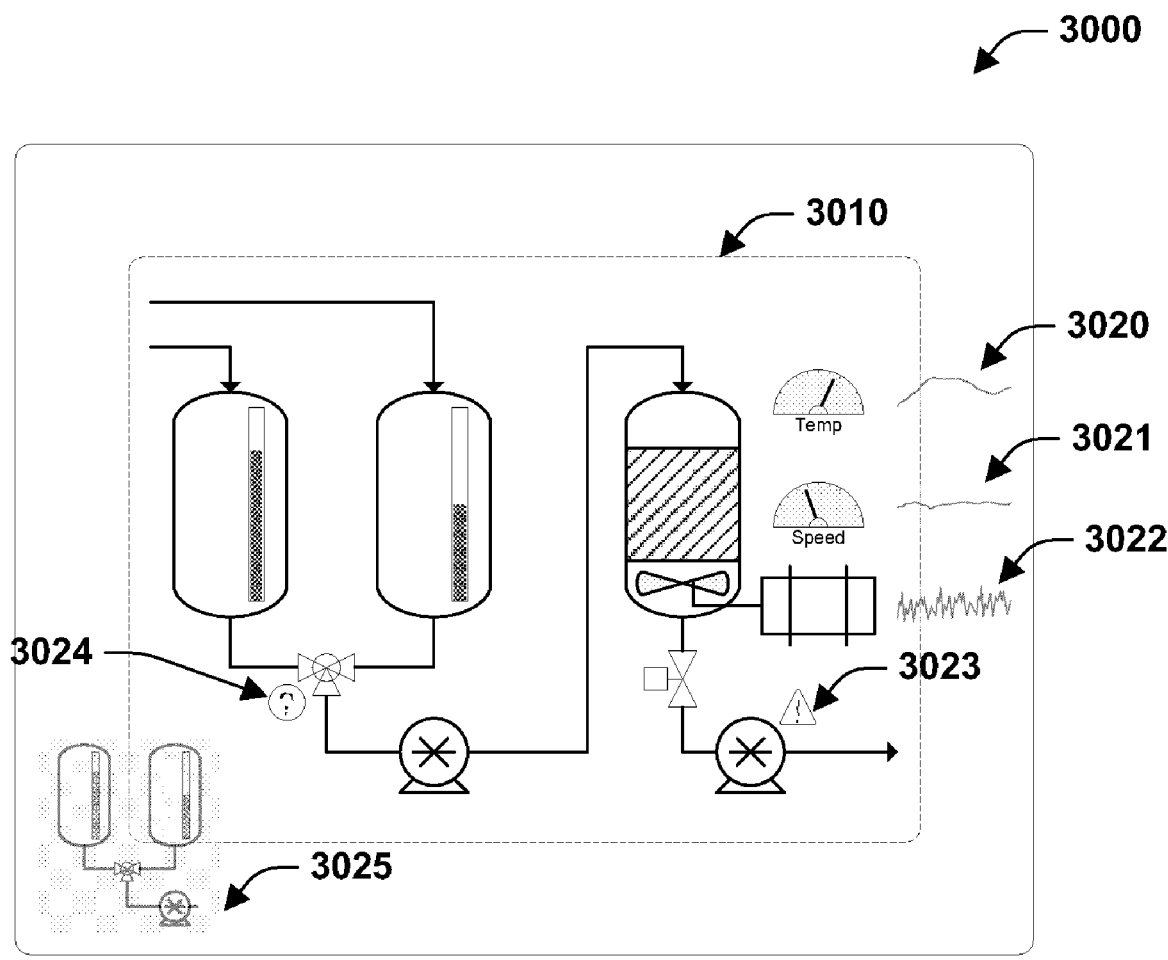
FIGS. 30-31 illustrate an exemplary display that a visualization component embodiment can render.

Turning to FIG. 30, an exemplary display 3000 is depicted that visualization component 106 of FIG. 1 can render. It should be appreciated that display 3000 is provided solely to facilitate clarity and understanding with respect to various aspects of the subject disclosure and is therefore not meant to limit the subject invention in any manner. Display 3000 includes a base presentation 3010 comprising two tanks connected to a first valve and a first pump as well as a mixer, motor, a second value and a second pump. Base presentation 3010 also includes two gages associated with the motor identifying motor temperature and speed. As shown, the base presentation 3010 does not occupy they entire display rather it is centered in the middle providing a border of free space. In addition to base presentation 3010, various items 3020-3025 are also displayed that provide related or situation specific information. Items 3020 and 3021 are graphs of historical information and item 3022 provides information regarding vibration analysis with respect a motor. Item 3023 indicates attention is required with respect to the associated pump and item 3024 provides an indication that help information is available upon selection of the item, for instance. Item 3025 is shrunken representation of details regarding the base presentation 3010. Items 3020, 3021, 3022, and 3025 are superimposed on the display and are positioned along the periphery of the base presentation in accordance with an aspect of the invention. This positioning is beneficial at least because it does not obscure information provided by the base presentation 3010. By contrast, items 3023 and 3024 are superimposed entirely over base presentation 3010, but are small enough not to cover any objects provided thereby.

Figure 31:
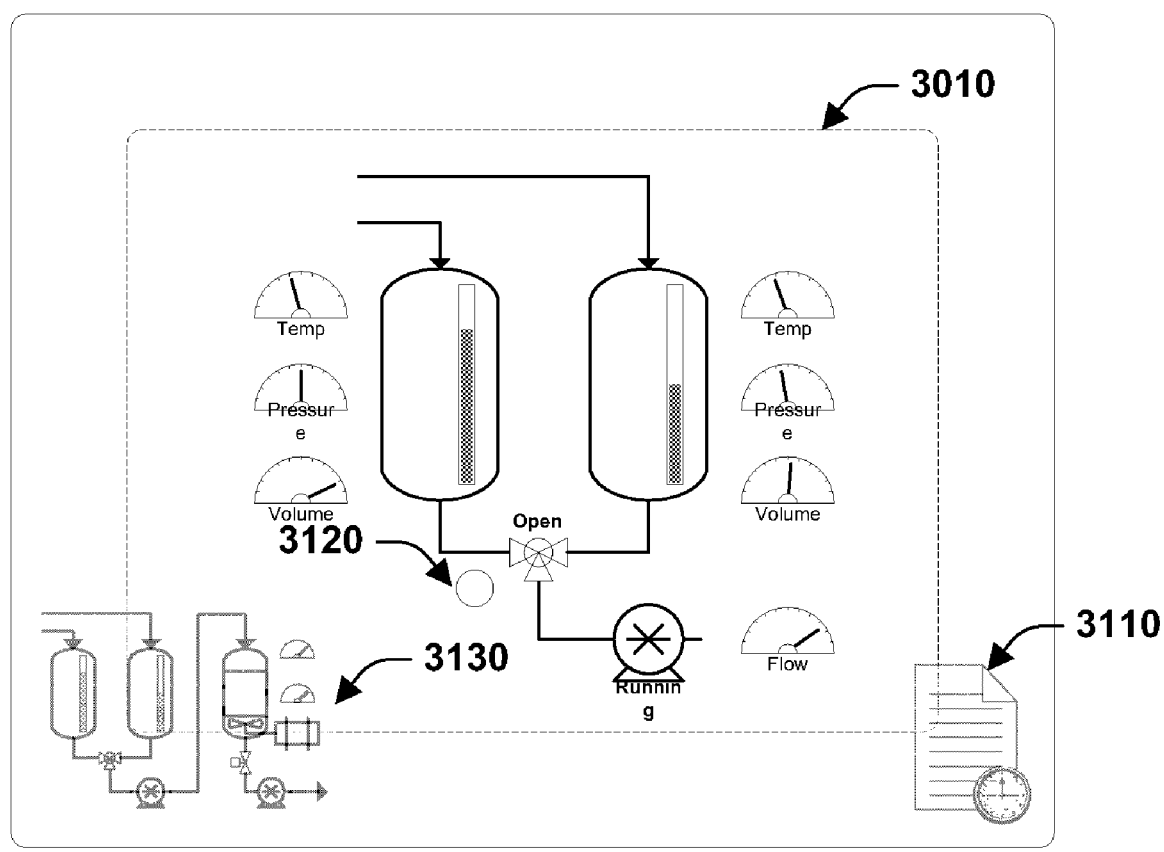

A user can interact with any of the display objects which may cause the display to change. For instance, if a user selects or otherwise identifies item 3025 the display 3100 of FIG. 31 could result. As illustrated by FIG. 31, the interface system updates the base presentation 3110 to show the selected information and automatically superimposes new, situation-specific information that is related to the updated display 3100. In particular, items 3110, 3120 and 3130 are displayed. Item 3110 provides information regarding a shift production report and item 3120 identifies that help is available for display upon selection, for example. Item 3130 is a shrunken version of the previous base presentation 3010 of FIG. 30. The user can return to the previous base presentation 3010 by selecting superimposed item 3130.

Figure 32:
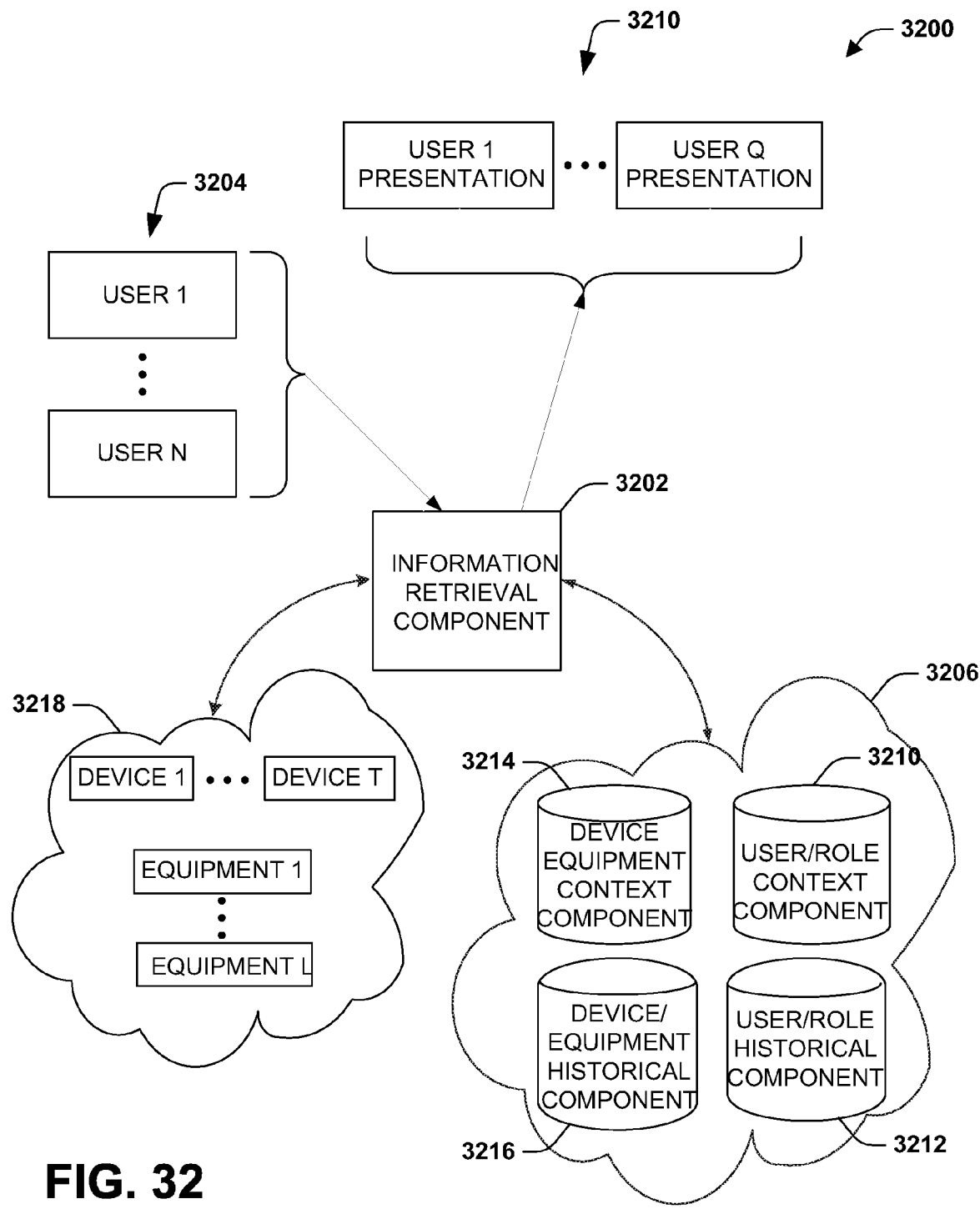
FIG. 32 depicts an embodiment for dynamically presenting information of interest to one or more users in an industrial automation environment.

Referring now to FIG. 32, an example system 3200 is illustrated for dynamically presenting information of interest to one or more users in an industrial automation environment. The system 3200 includes an information retrieval component 3202 that is configured to obtain information regarding user(s) of the system 3200, historical and real-time information relating to the user(s), device(s) and/or equipment(s). The information retrieval component 3202 can be further configured to make a determination or inference whether information should be presented to the user(s).

One or more users, illustrated at 3204 as User 1 through User Q, where Q is an integer equal to or greater than one, can physically and/or virtually (e.g., remotely) interact with and/or navigate through system 3200. As the user(s) 3204 contacts the system 3200, the information retrieval component 3202 obtains, receives, requests, and so forth information regarding each user 3204. A means for identifying each user 3204 can be employed, such as a unique user name and/or password, for example. In other aspects, system 3200 can use alternative identifications means, such as biometric authentication that utilizes physical characteristic unique to individuals. It is to be appreciated that a plurality of identification schemes can be utilized with system 3200 and all such alterations and modifications are intended to fall within the scope of the detailed description and appended claims.

Utilizing the user identification, information retrieval component 3202 can determine and/or track the context of each user 3204. This information can be retrieved from one or more database or other storage/retrieval means that can include a user/role context data component 3210 and/or a user/role historical data component 3212. The context of each user can be, for example, the role, position, responsibilities, authorized programs, areas or regions of interest, activities, etc. as it relates to the particular user.

The information retrieval component 3202 can further be configured to access historical data 3206 from a device equipment context component 3214 and/or a device/equipment historical component 3216 that include data relating to device(s) and/or equipment. For example, information regarding the devices and/or equipment that are included in the automation control system can include a plurality of information that is maintained and/or stored. Examples of maintained information include logical and/or physical locations, operating status, other types of information that are of interest to different users and/or user roles. For example, an operator of the automation control system may have a direct area of interest than a tester and/or maintenance user because of the disparate role of each user and how/why each user interacts with system 3200. The information retrieval component 3202 is further configured to update the historical data 3206.

The information retrieval component 3202 can also be configured to interact with real-time data 3218 regarding the device(s) and/or equipment associated with system 3200. One or more device, labeled Device 1 through Device T, and/or one or more equipment, labeled Equipment 1 through Equipment L, where L is an integer can be monitored for status information. For example, real time data can include the operating status of the device/equipment (e.g., off, on, run, . . . ), the current stage or process of each device/equipment (e.g., operating, line of code being implemented, . . . ).

The information retrieval component 3202 can make a determination whether a user 3204 would be interested in information relating to a particular device/equipment and is able to create mappings and/or linkages between the two sets of information (historical 3206 and real time 3218) and identify or infer information that may be relevant to users' current locations and activities. For example, if there is an alarm on a device and/or piece of equipment, based on the user context, the user may be presented information relating to such alarm condition. If the user context and/or historical information indicate that the user 3202 is not interested in the particular device and/or equipment, the information retrieval component 3204 will not present such information to the user. This determination can be made based on the user role, context, historical, and other information obtained as well as the device/equipment context, historical, current, and other information. If a determination is made that one or more user 3204 would be interested in such information, the information is presented to the one or more user interested in the data, as shown at 3210.

By way of example and not limitation, if an operator is working in the bottling area of a brewery, system 3200 can automatically present that operator with information about the current operational status of the devices and/or equipment located in the area in which the operator is located. Similarly, if a maintenance engineer is currently working in the same area, the system 3200 can present that user with information about the maintenance status of the devices and/or equipment located in that area at substantially the same time. In addition or alternatively, an electrician working in the same area might be presented with information about different devices and equipment, specifically, those related to the electrical systems in that area of the facility, at substantially the same time as the operator and maintenance engineer are presented information.

Figure 33:
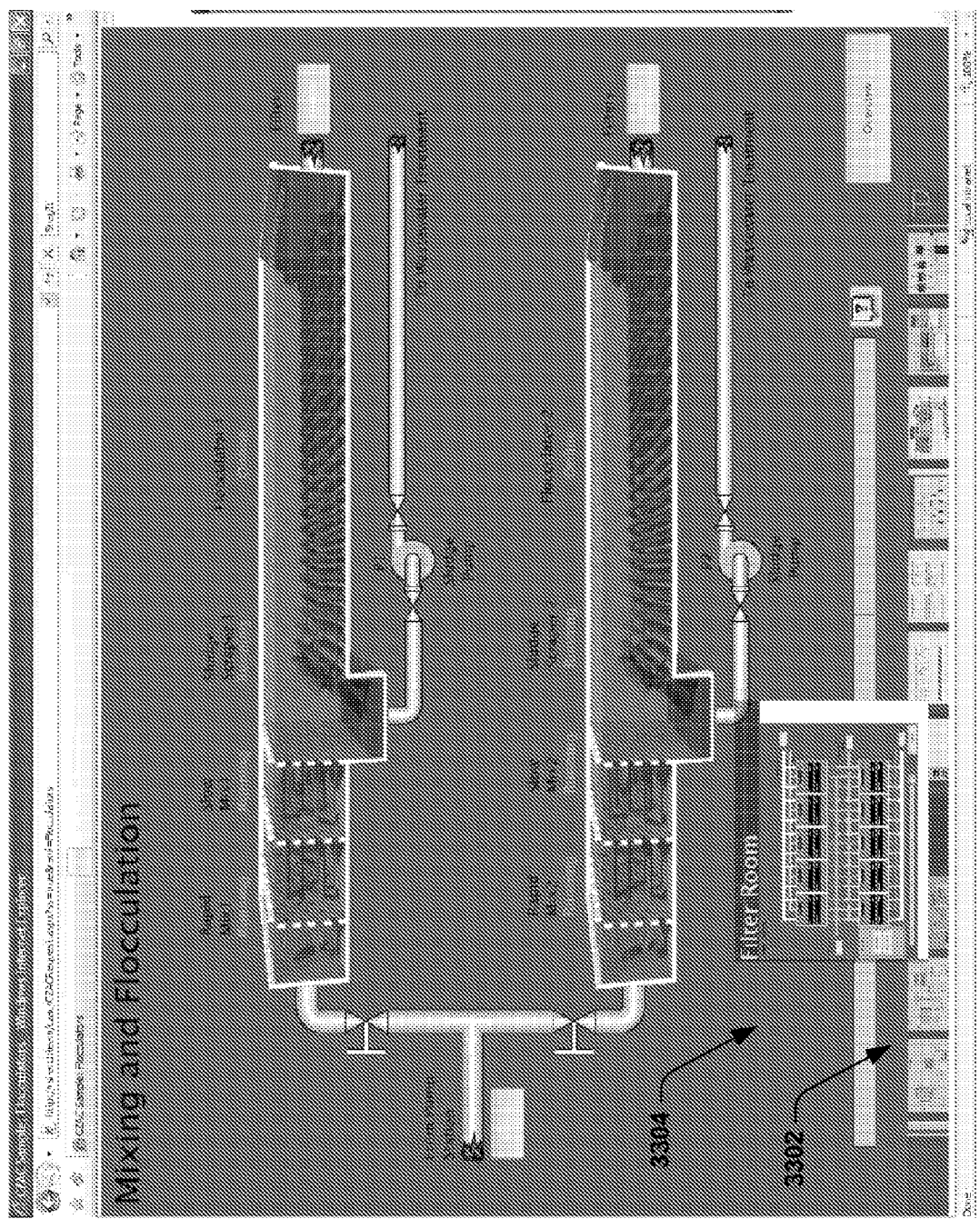
FIGS. 33 and 34 illustrate visualizations in accordance with aspects described herein.
Figure 34:
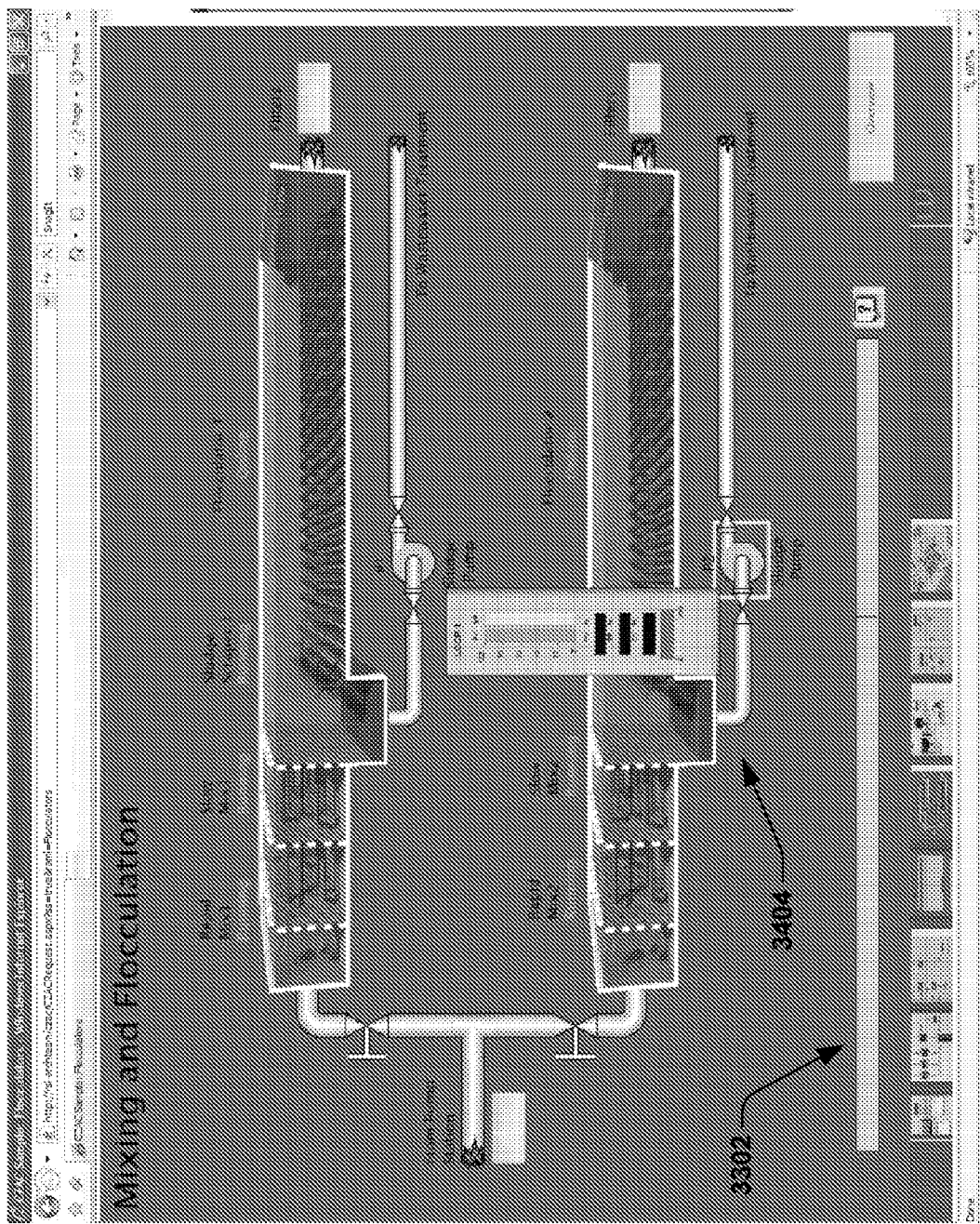

FIGS. 33 and 34 illustrate visualizations in accordance with aspects described herein. A plurality of visualization 3302 views is presented at a bottom of a visualization screen. As a user selects, or hovers over a particular view a display object 3304 corresponding to that view is displayed in greater detail and optionally with real-time data. For example, in the figures a mixing and flocculation visualization application is displayed. A user selected a particular thumbnail view corresponding to filter room activity, and display object 3304 is provided to present details regarding filter room activity as it applies to the mixing and flocculation application. In FIG. 34, a different thumbnail view is selected and a display object 3404 corresponding to Loop 1 of the mixing and flocculation application is presented.

It is to be appreciated that the subject visualization scheme enables a user to quickly select different visualizations (via the thumbnail views 3302) and corresponding functionality associated with an application. Thus, multi-dimensional visualizations can be viewed so as to provide a user with a vast amount of information in relatively short time (e.g., several seconds or minutes).

Figure 35:
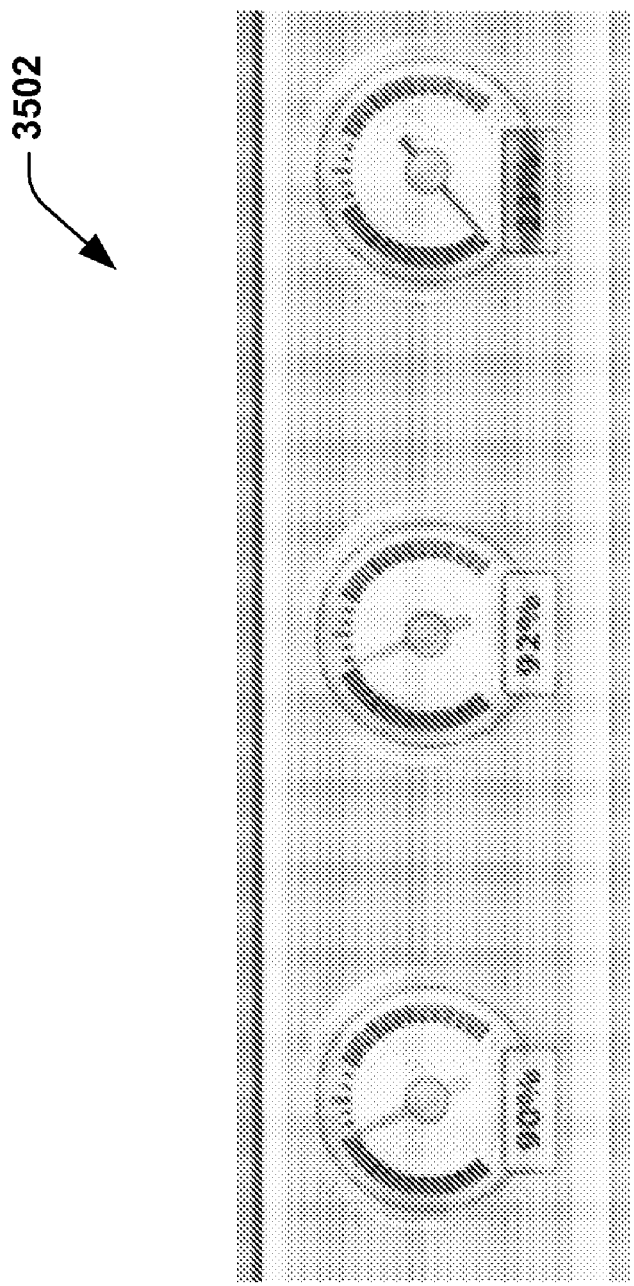
FIG. 35 illustrates a semi-transparent dash board that can be overlaid on other display objects to provide information to a user in a glanceable manner.
Figure 36:
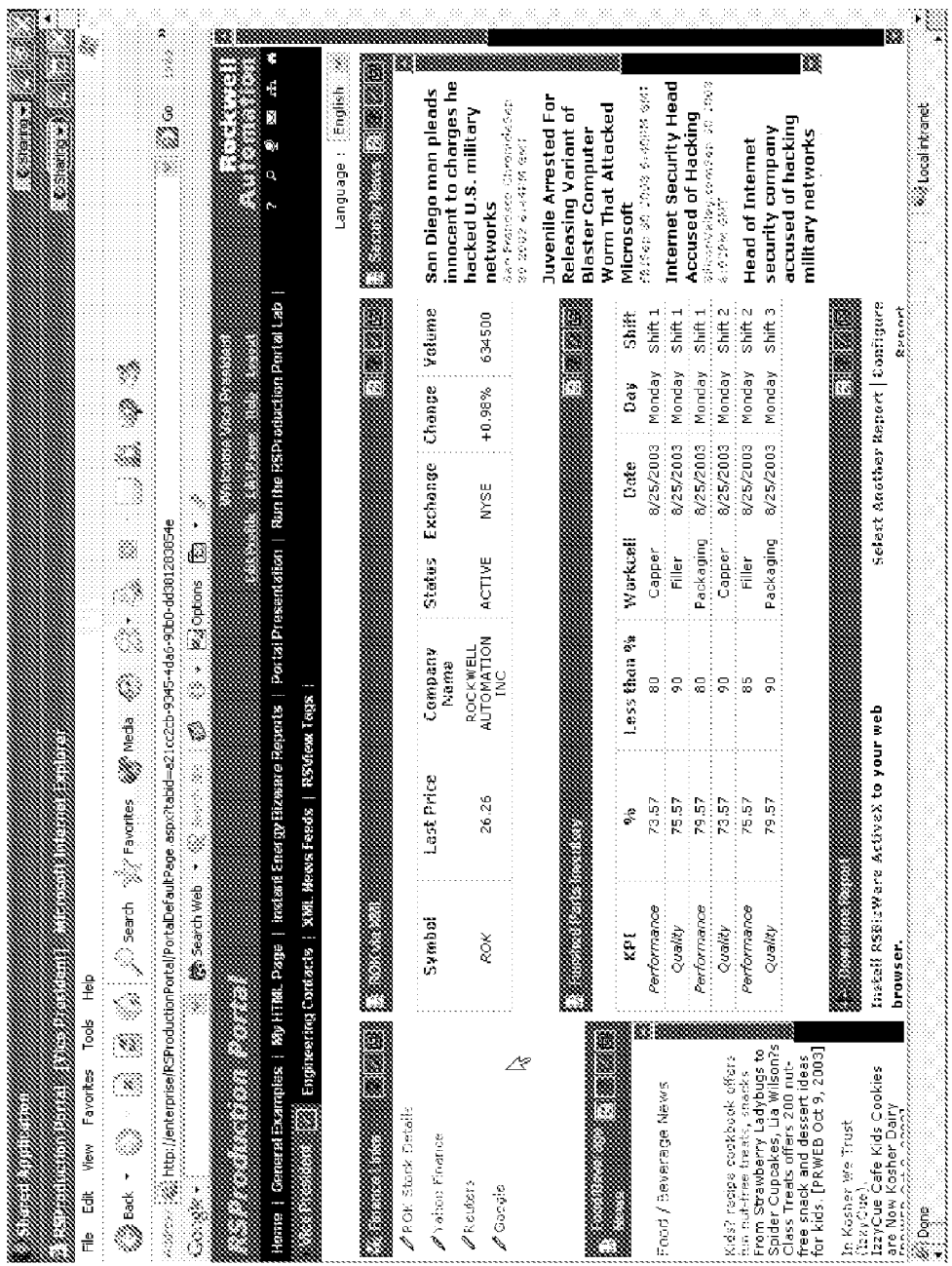
FIG. 36 illustrates an example interface that provides key performance indicator (KPI) information.
Figure 37:
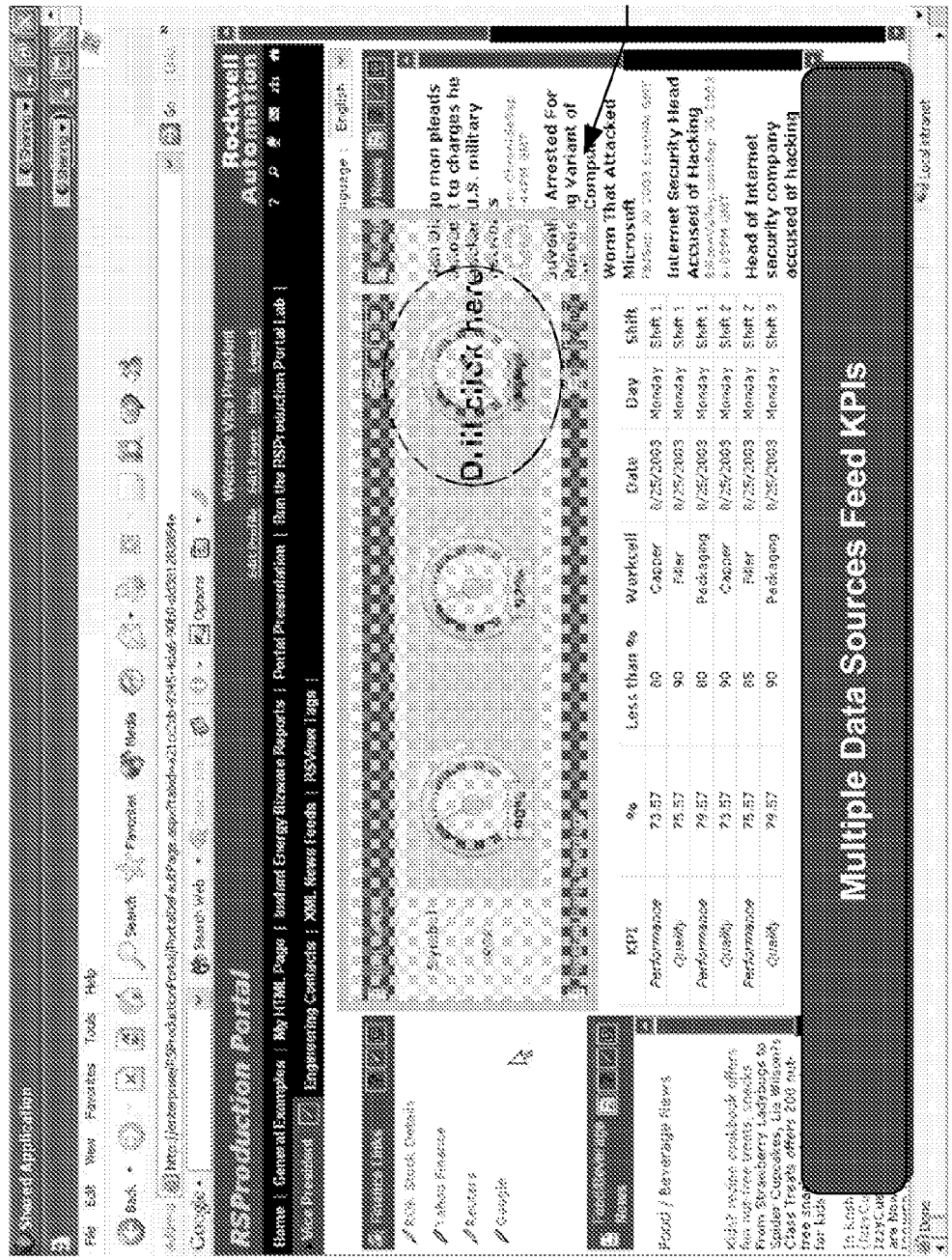
FIGS. 37-42 illustrate example interfaces in accordance with embodiments described herein.
Figure 38:
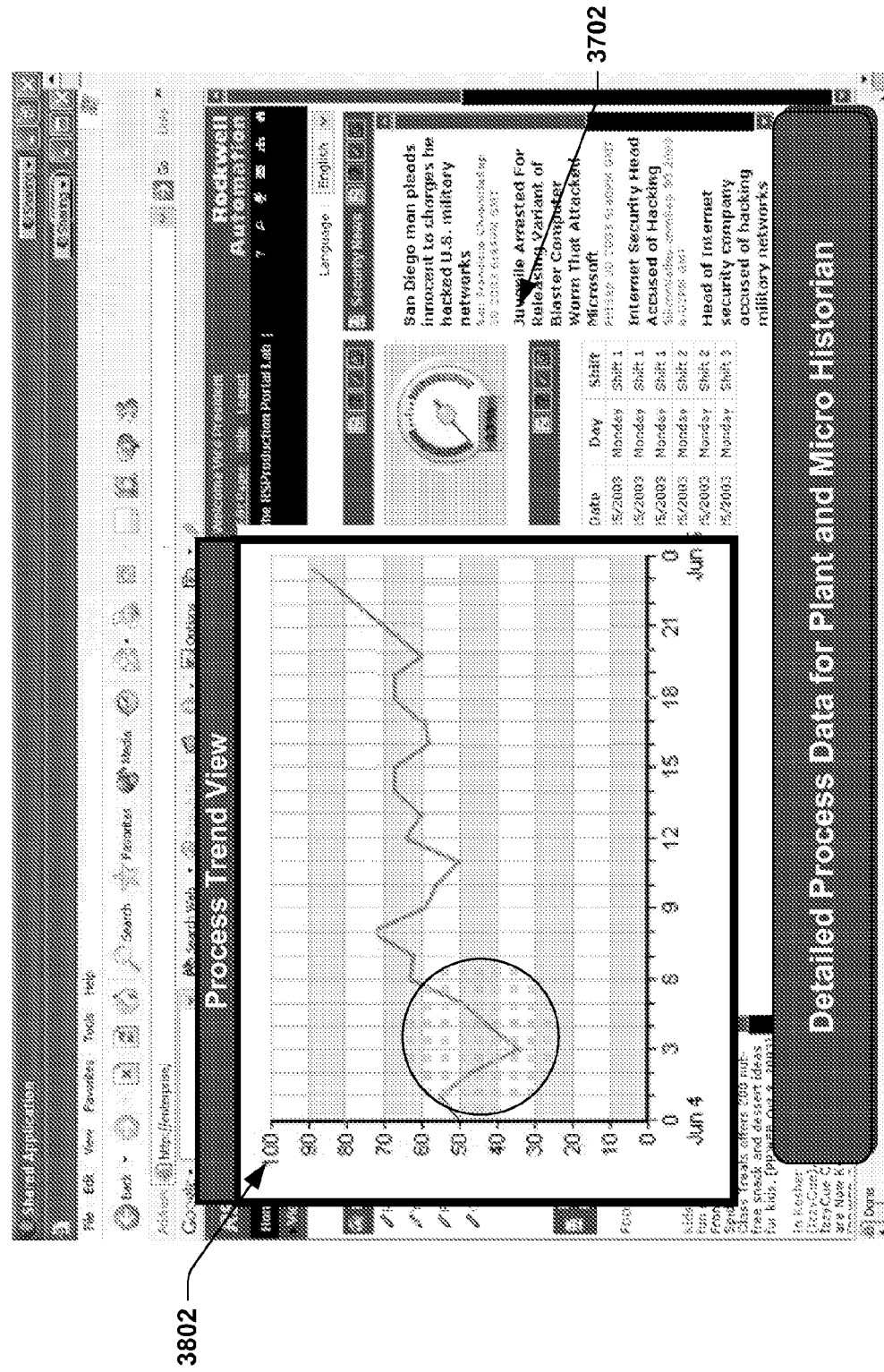
Figure 39:
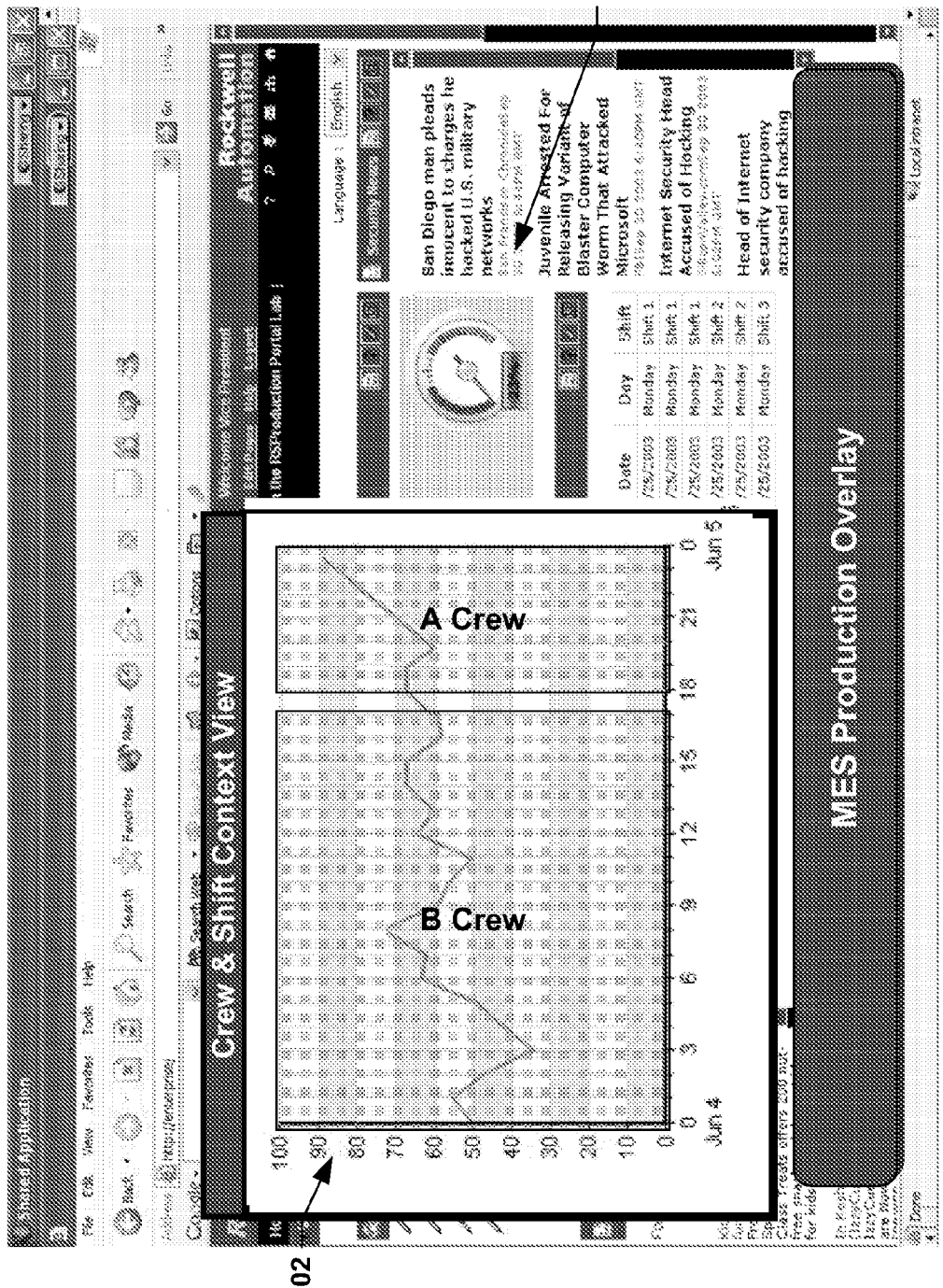
Figure 40:
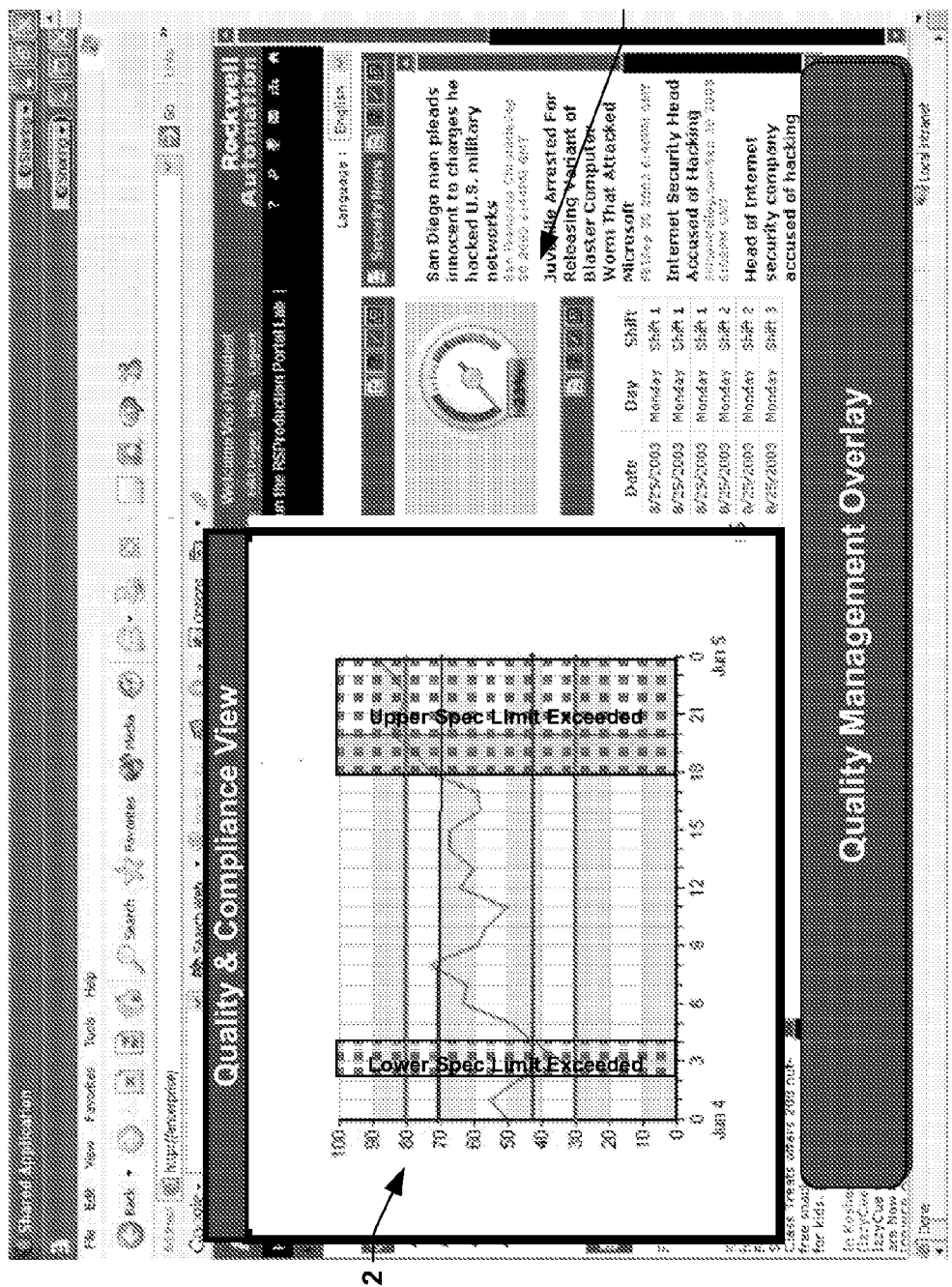
Figure 41:
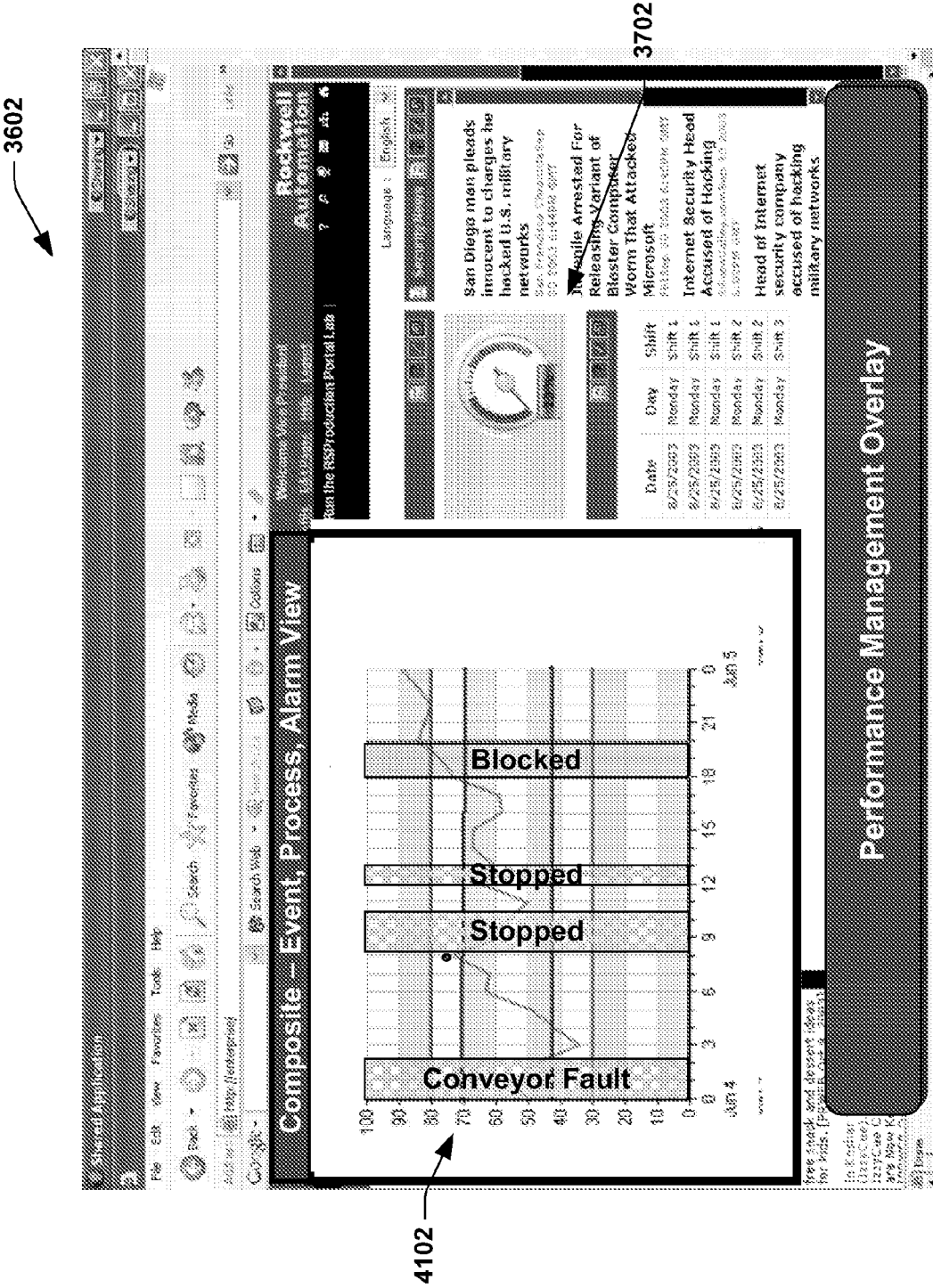

FIGS. 35-41 illustrate example interfaces in accordance with various aspects described herein. In FIG. 35, a semi-transparent dash board 3502 is shown can be overlaid on other display objects to provide information to a user in a glanceable manner. For example, the dash board 3502 is shown as a series of gauges that can correspond to a set of key performance indicators (KPIs). Use of colors as well as numbers and a dial enable a user to quickly glean information regarding status or performance of items, processes, devices, production, etc. FIG. 36 illustrates an example interface that provides KPI information—a subset of this information can be presented via the dash board 3502. FIG. 37 illustrates interface 3602 with a dash-board overlay 3702. The dash board 3702 provides for not only viewing KPI information but also quickly accessing additional information (e.g., drilling down into a subset of data). FIG. 38 illustrates an interface 3802 that is generated as a result of drilling down from the dash board 3702. Interface 3802 provides a view of process trend data. FIG. 39 illustrates an alternative view of a crew schedule 3902 that can be retrieved as a result of drilling down via dashboard 3702. Likewise, FIG. 40 illustrates a quality and compliance overlay that can be presented. Production events, alarm events, quality events, process trends, specification limits, or other information can be presented in a view 4102 as shown in FIG. 41.

As can be appreciated the overlays can utilize multiple data sources, contextual and content switches, and integrate data associated therewith in a rich overlay view that enables a user to quickly consume a vast amount of information. Cognitive load of users can be factored in connection with most appropriate overlay to present. Moreover, user rights, roles, state, goals, intentions can be employed as factors in connection with generating overlay views to assist a user with accessing and understanding complex data in a manner that facilitates achieving end goals given factors considered. Thus, a utility-based analysis can be employed where the cost associated with generating and presenting an overlay or subset thereof is weighed against the associated benefit. In addition, historical data, user preferences, MLR systems can be employed to facilitate automatically presenting overlays that are deemed or inferred to be most appropriate given a set of evidence.

Visualization of Workflow in an Industrial Automation Environment

Figure 42:
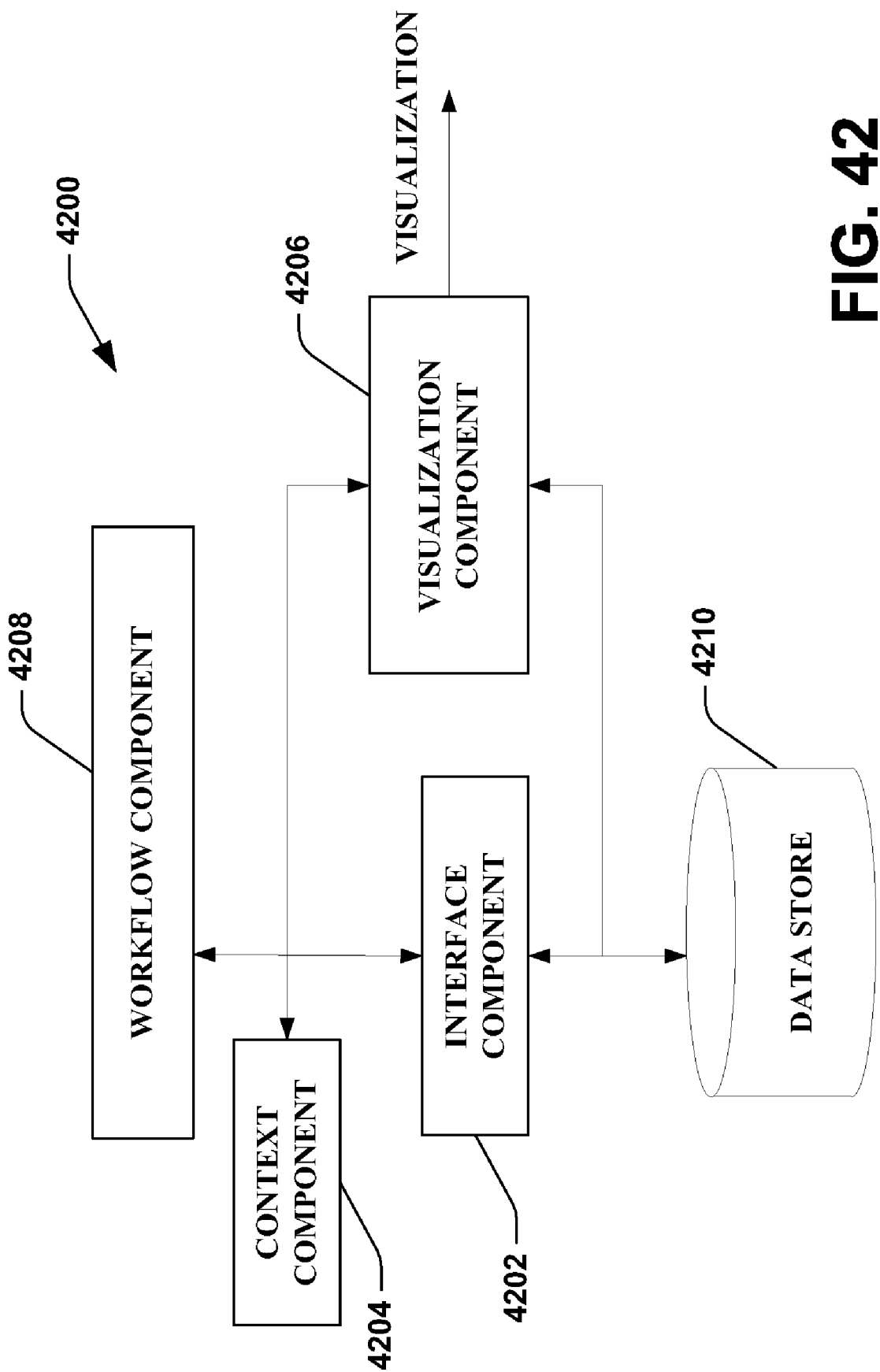

FIG. 42 illustrates a system 4200 that facilitates generating a rich visualization of an industrial automation environment coupled with real-time or static workflow information. As noted supra, generating visualizations in an industrial automation environment is very different from doing so in a general purpose computing environment. For example, down-time and latency tolerance levels between such environments are vastly different. Individuals tolerate at a fair frequency lock-ups, delayed images, etc. in a general purpose computing environment; however, even several seconds of down-time in an industrial automation environment can lead to substantial loss in revenue as well as create hazardous conditions within a factory. Consequently, market forces have dictated that HMI systems within an industrial automation environment remain light-weight, fast, not computationally expensive, and thus robust. Counter to conventional wisdom in the industrial automation domain, innovations described herein provide for highly complex and sophisticated HMI systems that mitigate down-time, are robust, and facilitate maximizing an operator experience within an industrial automation environment.

It is contemplated that visualization system 4200 can form at least part of a human machine interface (HMI), but is not limited thereto. For example, the visualization system 4200 can be employed to facilitate viewing and interaction with data related to automation control systems, devices, and/or associated equipment (collectively referred to herein as an automation device(s)) forming part of a production environment. Moreover, associated workflow information can be presented concurrently to provide a user with a deep understanding of how production state and business state interdepend. Visualization system 4200 includes interface component 4202, context component 4204, visualization component 4206, workflow component 4208, and data store 4210.

The interface component 4202 receives input concerning displayed objects and information. Interaction component 4202 can receive input from a user, where user input can correspond to object identification, selection and/or interaction therewith. Various identification mechanisms can be employed. For example, user input can be based on positioning and/or clicking of a mouse, stylus, or trackball, and/or depression of keys on a keyboard or keypad with respect to displayed information. Furthermore, the display device may be by a touch screen device such that identification can be made based on touching a graphical object. Other input devices are also contemplated including but not limited to gesture detection mechanisms (e.g., pointing, gazing . . . ) and voice recognition.

In addition to object or information selection, input can correspond to entry or modification of data. Such input can affect the display and/or automation devices. For instance, a user could alter the display format, color or the like. Additionally or alternatively, a user could modify automation device parameters. By way of example and not limitation, a conveyor motor speed could be increased, decreased or halted. It should be noted that input need not come solely from a user, it can also be provided by automation devices. For example, warnings, alarms, and maintenance schedule information, among other things, can be provided with respect to displayed devices.

Other applications and devices (e.g., enterprise resource planning (ERP) systems, financial applications, inventory applications, diagnostic or prognostic applications. . .) can also provide information to the interface component 4202.

Context component 4204 can detect, infer or determine context information regarding an entity or application. Such information can include but is not limited to an entity's identity, role, location (logical or physical), current activity, similar or previous interactions with automation devices, context data pertaining to automation devices including control systems, devices and associated equipment. Device context data can include but is not limited to logical/physical locations and operating status (e.g., on/off, healthy/faulty . . . ). The context component 4204 can provide the determined, inferred, detected or otherwise acquired context data to visualization component 4206, which can employ such data in connection with deciding on which base presentations and or items to display as well as respective format and position.

By way of example, as an entity employs visualization system 4200 (physically or virtually), the system 4200 can determine and track their identity, their roles and responsibilities, their areas or regions of interest/responsibility and their activities. Similarly, the system can maintain information about devices/equipment that make up the automation control system, information such as logical/physical locations, operating status and the types of information that are of interest to different persons/roles. The system is then able to create mappings/linkages between these two sets of information and thus identify information germane to a user's current location and activities, among other things.

The interface component 4202 is also communicatively coupled to visualization component 4206, which can generate, receive, retrieve or otherwise obtain a graphical representation of a production environment including one or more objects representing, inter alia, devices, information pertaining to devices (e.g., gages, thermometers . . . ) and the presentation itself. In accordance with one aspect, a base presentation provided by visualization component 4206 can form all or part of a complete rendered display. In addition to the base presentation, one or more items can form part of the visualization.

An item is a graphical element or object that is superimposed on at least part of the base presentation or outside the boundaries of the base presentation. The item can provide information of interest and can correspond to an icon, a thumbnail, a dialog box, a tool tip, and a widget, among other things. The items can be transparent, translucent, or opaque be of various sizes, color, brightness, and so forth as well as be animated for example fading in and out. Icons items can be utilized to communicate the type of information being presented. Thumbnails can be employed to present an overview of information or essential content. Thumbnails as well as other items can be a miniature but legible representation of information being presented and can be static or dynamically updating. Effects such as fade in and out can be used to add or remove superimposed information without overly distracting a user's attention. In addition, items can gradually become larger/smaller, brighter/dimmer, more/less opaque or change color or position to attract more or less of a user's attention, thereby indicating increasing or decreasing importance of the information provided thereby. The positions of the items can also be used to convey one or more of locations of equipment relative to a user's current location or view, the position or index of a current task within a sequence of tasks, the ability to navigate forward or back to a previously visited presentation or view and the like. The user can also execute some measure of control over the use/meaning of these various presentation techniques, for example via interface component 4202.

If desired, a user can choose, via a variety of selection methods or mechanisms (e.g., clicking, hovering, pointing . . . ), to direct their attention to one or more items. In this case the selected information, or item providing such information, can become prominent within the presentation, allowing the user to view and interact with it in full detail. In some cases, the information may change from static to active/dynamically updating upon selection. When the focus of the presentation changes in such a manner, different information may become more/less interesting or may no longer be of interest at all. Thus, both the base presentation and the set of one or more items providing interesting information can be updated when a user selects a new view.

Data store 4210 can be any suitable data storage device (e.g., random access memory, read only memory, hard disk, flash memory, optical memory), relational database, media, system, or combination thereof. The data store 4210 can store information, programs, AI systems and the like in connection with the visualization system 4200 carrying out functionalities described herein. For example, expert systems, expert rules, trained classifiers, entity profiles, neural networks, look-up tables, etc. can be stored in data store 4210.

Workflow component 4208 binds workflow information to industrial automation as presented infra. Visualization component 4206 thus presents views of an industrial automation environment as well as workflow information counterparts.

Figure 43:
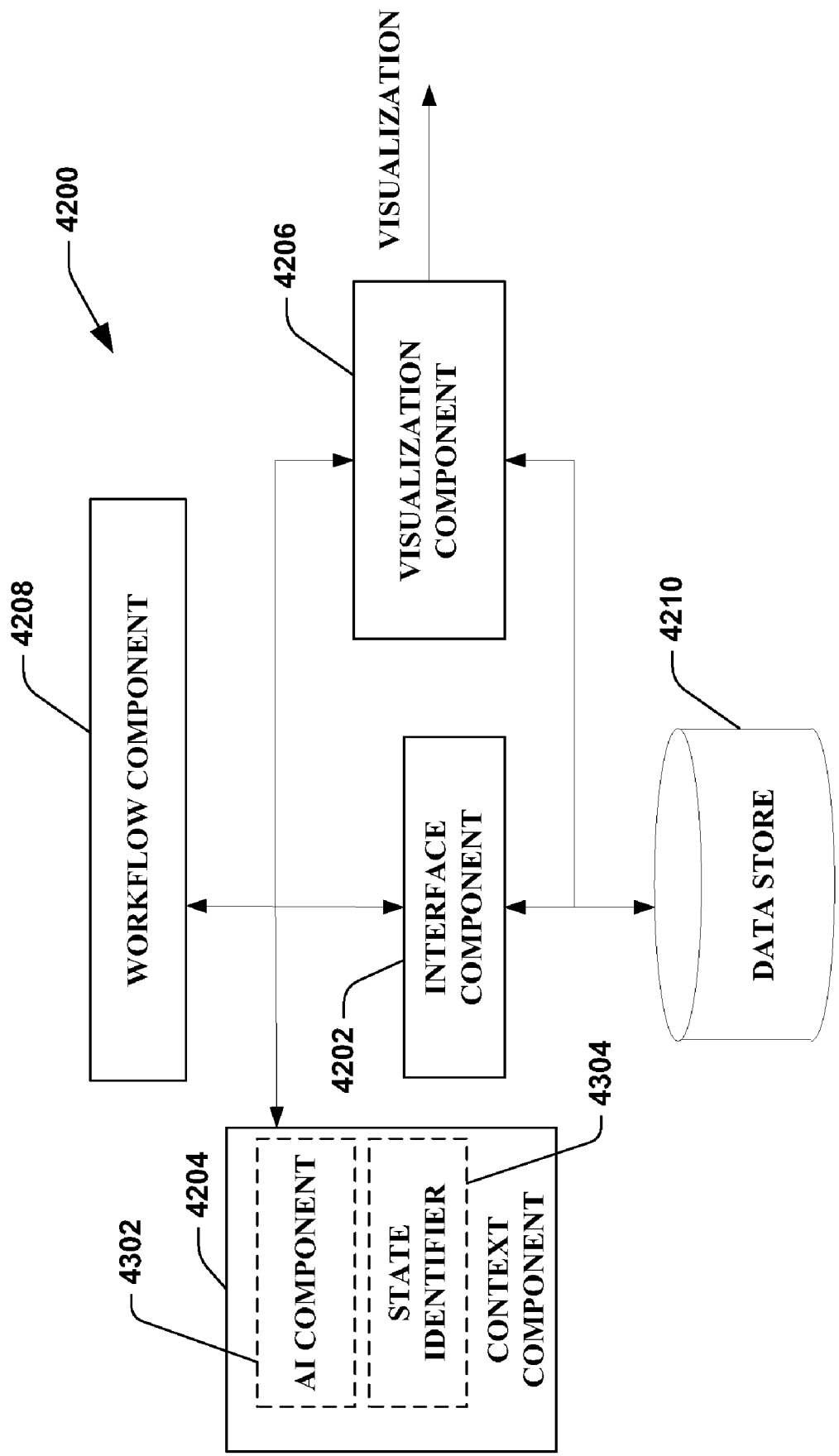
FIG. 43 illustrates one particular embodiment of a visualization system.

FIG. 43 illustrates one particular embodiment of visualization system 4200. Context component 4204 includes an AI component 4302 and a state identification component (state identifier) 4304. The AI component 4302 can employ principles of artificial intelligence to facilitate automatically performing various aspects (e.g., transitioning communications session, analyzing resources, extrinsic information, user state, and preferences, risk assessment, entity preferences, optimized decision making, . . . ) as described herein. AI component 4302 can optionally include an inference component that can further enhance automated aspects of the AI component utilizing in part inference based schemes to facilitate inferring intended actions to be performed at a given time and state. The AI-based aspects of the invention can be effected via any suitable machine-learning based technique and/or statistical-based techniques and/or probabilistic-based techniques. For example, the use of expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. are contemplated and are intended to fall within the scope of the hereto appended claims.

State identifier 4304 can identify or determine available resources (e.g., service providers, hardware, software, devices, systems, networks, etc.). State information (e.g., work performed, tasks, goals, priorities, context, communications, requirements of communications, location, current used resources, available resources, preferences, anticipated upcoming change in entity state, resources, change in environment, etc.) is determined or inferred. Given the determined or inferred state and identified available resources, a determination is made regarding whether or not to transition a visualization session from the current set of resources to another set of resources. This determination can include a utility-based analysis that factors cost of making a transition (e.g., loss of fidelity, loss of information, user annoyance, interrupting a session, disrupting work-flow, increasing down-time, creating a hazard, contributing to confusion, entity has not fully processed current set of information and requires more time, etc.) against the potential benefit (e.g., better quality of service, user satisfaction, saving money, making available enhanced functionalities associated with a new set of resources, optimization of work-flow, . . . ). This determination can also include a cost-benefit analysis. The cost can be measured by such factors as the power consumption, computational or bandwidth costs, lost revenues or product, under-utilized resources, operator frustration . . . . The benefit can be measured by such factors as the quality of the service, the data rate, the latency, etc. The decision can be made based on a probabilistic-based analysis where the transition is initiated if a confidence level is high, and not initiated if the confidence level if low. As discussed above, AI-based techniques (including machine-learning systems) can be employed in connection with such determination or inference. Alternatively, a more simple rule-based process can be employed where if certain conditions are satisfied the transition will occur, and if not the transition will not be initiated. The transition making determination can be automated, semi-automated, or manual.

Figure 44:
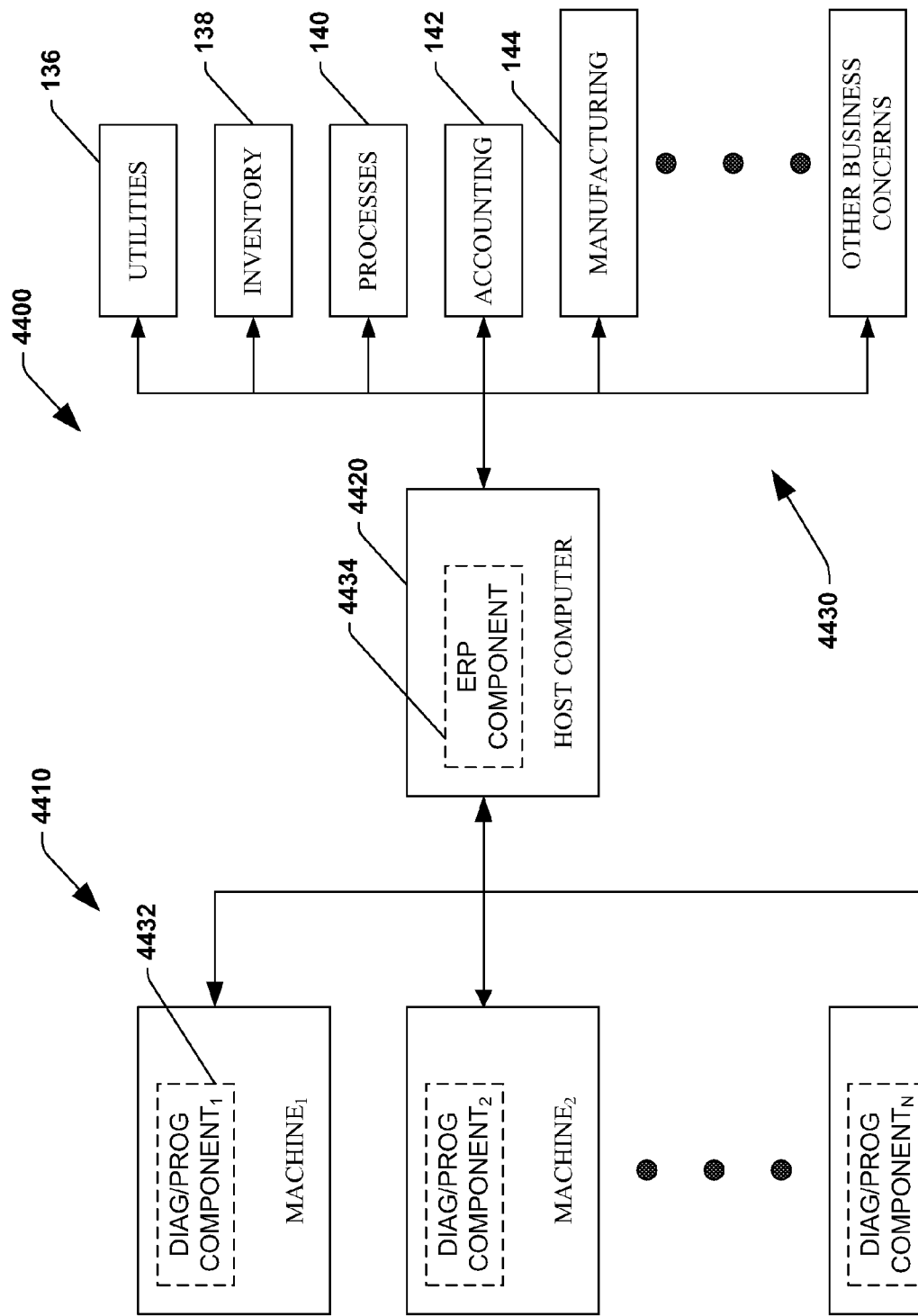
FIG. 44 is a high-level diagram illustrating one particular visualization system in connection with an embodiment.

FIG. 44 is a high-level diagram illustrating one particular system 4400 in connection with an embodiment. It is to be appreciated that system 4400 can provide interface component 4202 enterprise resource planning (ERP) information in connection with generating an ERP or workflow visualization in accordance with an industrial automation system. The system 4400 includes a plurality of machines 4410 (MACHINE$_1$ through MACHINE$_R$ (R being an integer) at least a subset of which are operatively coupled in a manner so as to share data between each other as well as with a host computer 4420 and a plurality of business components 4430. The machines 4410 include a respective diagnostic/prognostic component 4432 that provides for collecting and/or generating data relating to historical, current and predicted operating state(s) of the machines. It is to be appreciated that the plurality of machines can share information and cooperate; and is it to be appreciated that the machines do not have to be the same. Furthermore, some of the machines 4410 may comprise sub-systems or lower-level components that can have separate sensors, lifetime estimates, etc. For example a compressor may consist of a motor, pump, pressure chamber, and valves. The motor component may include smart bearings with embedded sensors to predict bearing lifetime.

The predicted operating state(s) of the machine may be determined based on expected demand or workload or a probabilistic estimate of future workload or demand. Similarly, expected environment (e.g. temperature, pressure, vibration, . . . ) information and possible expected damage information may be considered in establishing the predicted future state of the system. Undesirable future states of the system may be avoided or deferred through a suitable change in the control while achieving required operating objectives and optimizing established operational and business objectives. Moreover, it is to be appreciated that data relating to subsets of the machines can be aggregated so as to provide for data relating to clusters of machines—the cluster data can provide for additional insight into overall system performance and optimization. The clusters may represent sub-systems or logical groupings of machines or functions. This grouping may be optimized as a collection of process entities. Clusters may be dynamically changed based on changing operating requirements, machinery conditions, or business objectives. The host computer 4420 includes an enterprise resource planning (ERP) component 4434 that facilitates analyzing the machine data as well as data relating to the business concern components 4430 (utilities component 136, inventor component 138, processes component 140, accounting component 142, manufacturing component 144 . . . ). The data is analyzed and the host computer 120 executes various optimization programs to identify configurations of the various components so as to converge more closely to a desired business objective. For example, assume a current business objective is to operate in a just in time (JIT) manner and reduce costs as well as satisfy customer demand. If the inventory component 138 indicates that finished goods inventory levels are above a desired level, the ERP component 134 might determine based on data from the utility component 136 and machine components 110 that it is more optimal given the current business objective to run the machines at 60% rather than 90% which would result in machinery prognostics indicating we may extend the next scheduled maintenance down time for another 4 months reducing the maintenance labor and repair parts costs. This will also result in reducing excess inventory over a prescribed period of time as well as result in an overall savings associated with less power consumption as well as increasing life expectancy of the machines as a result of operating the machines as a reduced working rate.

It is to be appreciated that optimization criteria for machinery operation can be incorporated into up-front equipment selection and configuration activities—this can provide additional degrees of freedom for operational control and enhanced opportunities for real-time optimization.

Maintenance, repair, and overhaul (MRO) activities are generally performed separate from control activities. Interaction and collaboration between these functions are typically limited to the areas of operations scheduling and to a lesser extent in equipment procurement—both are concerned with maximizing production throughput of the process machinery. Information from MRO systems and from machinery control and production systems is related and can provide useful information to enhance the production throughput of process equipment. The subject invention leverages off opportunities realized by closely coupling machinery health (e.g. diagnostics) and anticipated health (e.g. prognostics) information with real-time automatic control. In particular, the closed-loop performance of a system under feedback control provides an indication of the responsiveness, and indirectly, the health of the process equipment and process operation. More importantly, it is possible to change how the system is controlled, within certain limits, to alter the rate of machinery degradation or stress. Using real-time diagnostic and prognostic information the subject invention can be employed in connection with altering future state(s) of the machinery. Given a current operating state for both the machinery and the process the subject invention can drive the machine(s) 110 to achieve a prescribed operating state at a certain time in the future. This future operating state can be specified to be an improved state than would occur if one did not alter the control based on machinery health information. Furthermore, the future state achieved could be optimal in some manner such as machinery operating cost, machinery lifetime, or mean time before failure for example. The prescribed operating state of a particular machine may be sub-optimal however, as part of the overall system 100, the system-wide operating state may be optimal with regard to energy cost, revenue generation, or asset utilization.

For example, with reference to Table I below:

TABLE I

| Power Source/Control Technique | Direct Line Power - Flow Control with Throttle Valve | Drive Power - Flow Control via Motor Speed |
|---|---|---|
| Full Flow - Power Flow: 75 gpm (flow not restricted) | 1.07 kW | 1.13 kW |
| Reduced Flow - Power Flow: 45 gpm (restricted flow) | .881 kW | .413 kW |

The above data exhibits energy utilization from a motor-pump system under conditions of full flow and reduced flow. The flow rate conditions shown are achieved using a variable speed drive to control motor speed and therefore flow rate (column 1) and with a motor running directly from the power line with a throttling valve used to control flow rate (column 2). The estimated energy savings with Drive Power at reduced flow is 0.468 kW—a 53% energy savings in connection with Drive Power. Pumping applications which require operation at various prescribed head Pressures, liquid levels, flow rates, or torque/speed values may be effectively controlled with a variable speed motor drive. The benefits of using a variable speed motor controller for pump applications are well established, particularly for pumps that do not operate at full rated flow all the time. In fact, the variable speed drive used for testing in connection with the data of Table I has a user-selectable factory setting optimized for fan and pump applications although these optimized settings were not employed for the energy savings reported herein. The scope of benefits beyond energy savings include improved machinery reliability, reduced component wear, and the potential elimination of various pipe-mounted components such as diverters and valves and inherent machinery protection such from over-current or under-current operation. Pumps which typically operate at or near full synchronous speed and at constant speed will not realize the energy savings as we have demonstrated in Table I. Process conditions that require pump operation at different flow rates or pressures (or are permitted to vary operation within process constraints) are candidates to realize substantial energy savings as we have shown. If maximum throughput is only needed infrequently, it may be beneficial to specify the hydraulic system and associated control to optimize performance over the complete span of operating modes based on the time spent in each mode. It will be necessary in this case to specify the duration of time the hydraulic system is operating at various rating levels coupled with the throughput and operating cost at each level.

Although machine control is discussed herein primarily with respect to motor speed, the invention is not to be construed to have control limited to such. Rather, there are other control changes that can be made such as for example changing controller gains, changing carrier frequency in the case of a VFD motor controller, setting current limits on acceleration, etc. The control can be broad in scope and encompass many simultaneous parameter changes beyond just speed. Moreover, the use of models can be a significant component of control and configuration optimization. A space of possible operating conditions for selection that optimizes a given process or business performance may be determined by employing a simulation model for example. Modeling techniques can also serve as a basis for prognostics—thus, a simulation model can encompass process machinery, throughput, energy costs, and business and other economic conditions.

With respect to asset management, it is to be appreciated that the system 4400 may determine for example that purchasing several smaller machines as compared to a single large machine may be more optimal given a particular set of business objectives.

It is also to be appreciated that the various machines 4410 or business components 4430 or a subset thereof can be located remotely from one another. The various machines 4410 and/or components 4430 can communicate via wireless or wired networks (e.g., Internet). Moreover, the subject invention can be abstracted to include a plant or series of plants with wireless or wired networked equipment that are linked via long distance communications lines or satellites to remote diagnostic centers and to remote e-commerce, distribution, and shipping locations for dynamic logistics integrated with plant floor prognostics and control. Thus, optimization and/or asset management in connection with the subject invention can be conducted at an enterprise level wherein various business entities as a whole can be subcomponents of a larger entity. The subject invention affords for implementation across numerous levels of hierarchies (e.g., individual machine, cluster of machines, process, overall business unit, overall division, parent company, consortiums . . . ).

Figure 45:
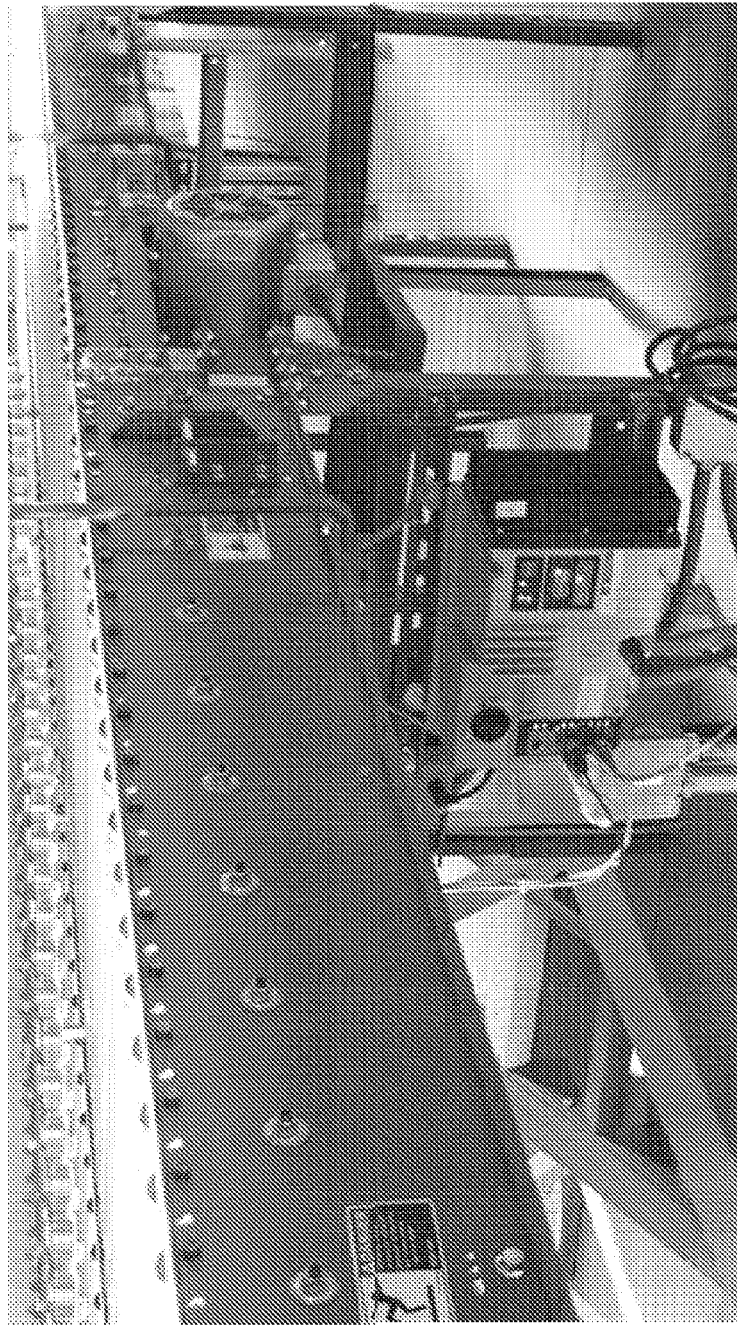
FIGS. 45-52 illustrate various visualizations in accordance with embodiments described herein.
Figure 46:
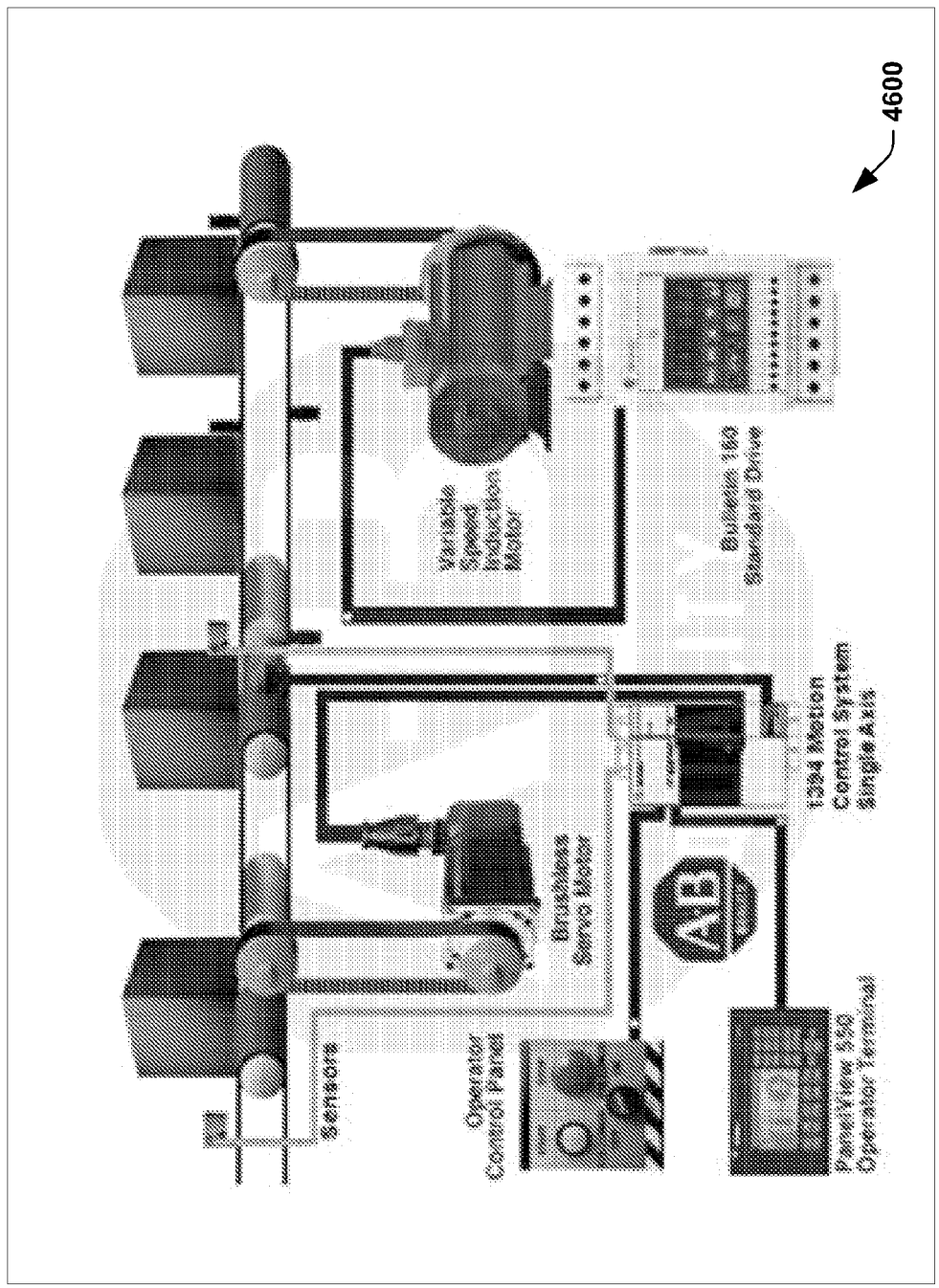
Figure 47:
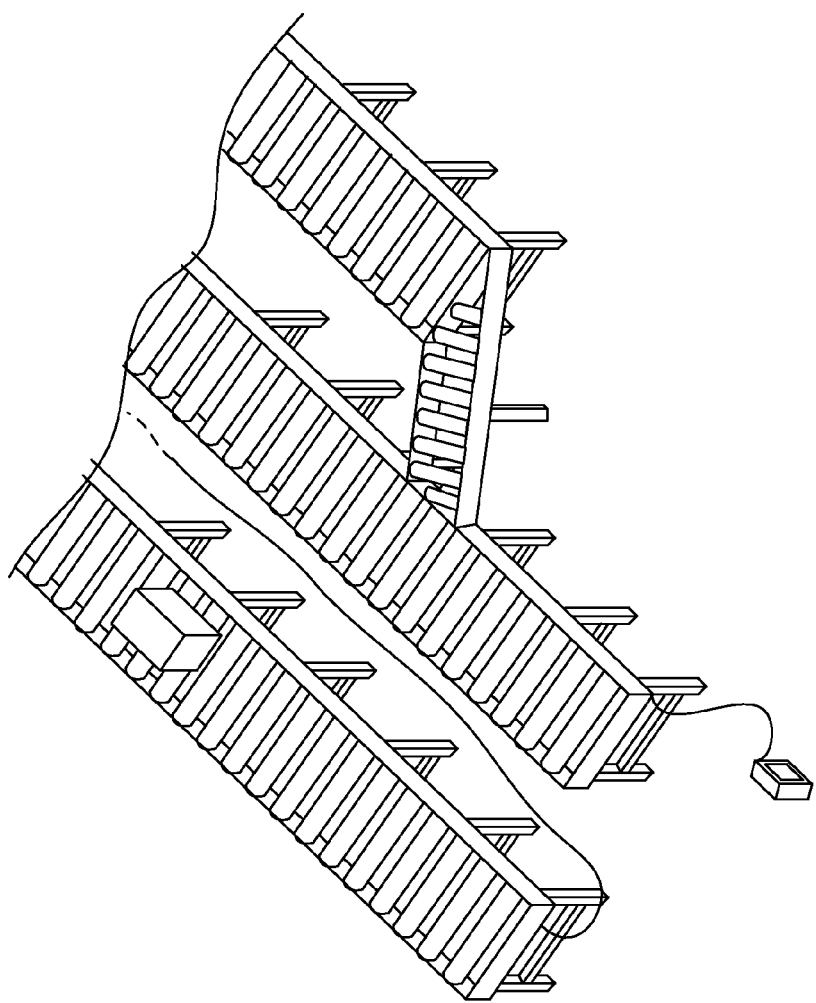
Figure 48:
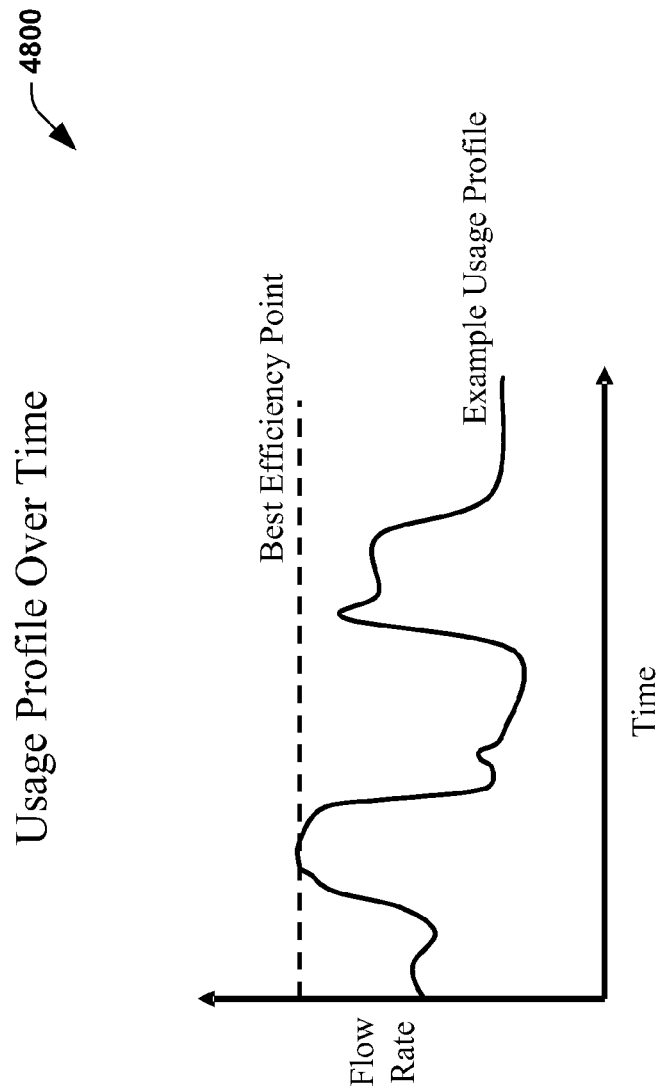
Figure 49:
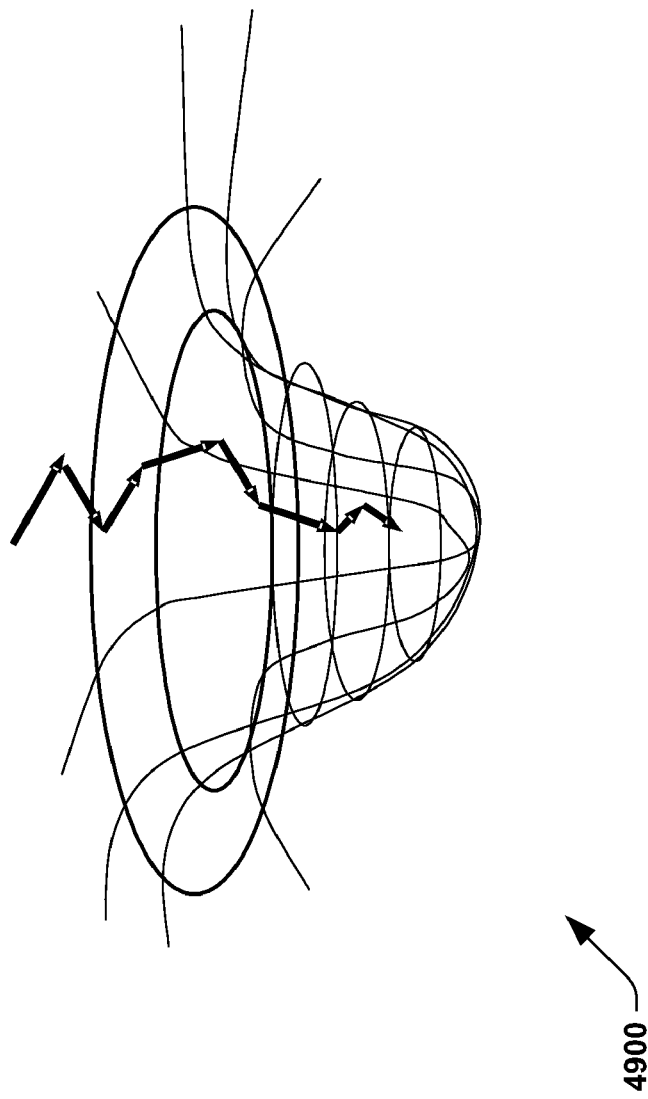
Figure 50:
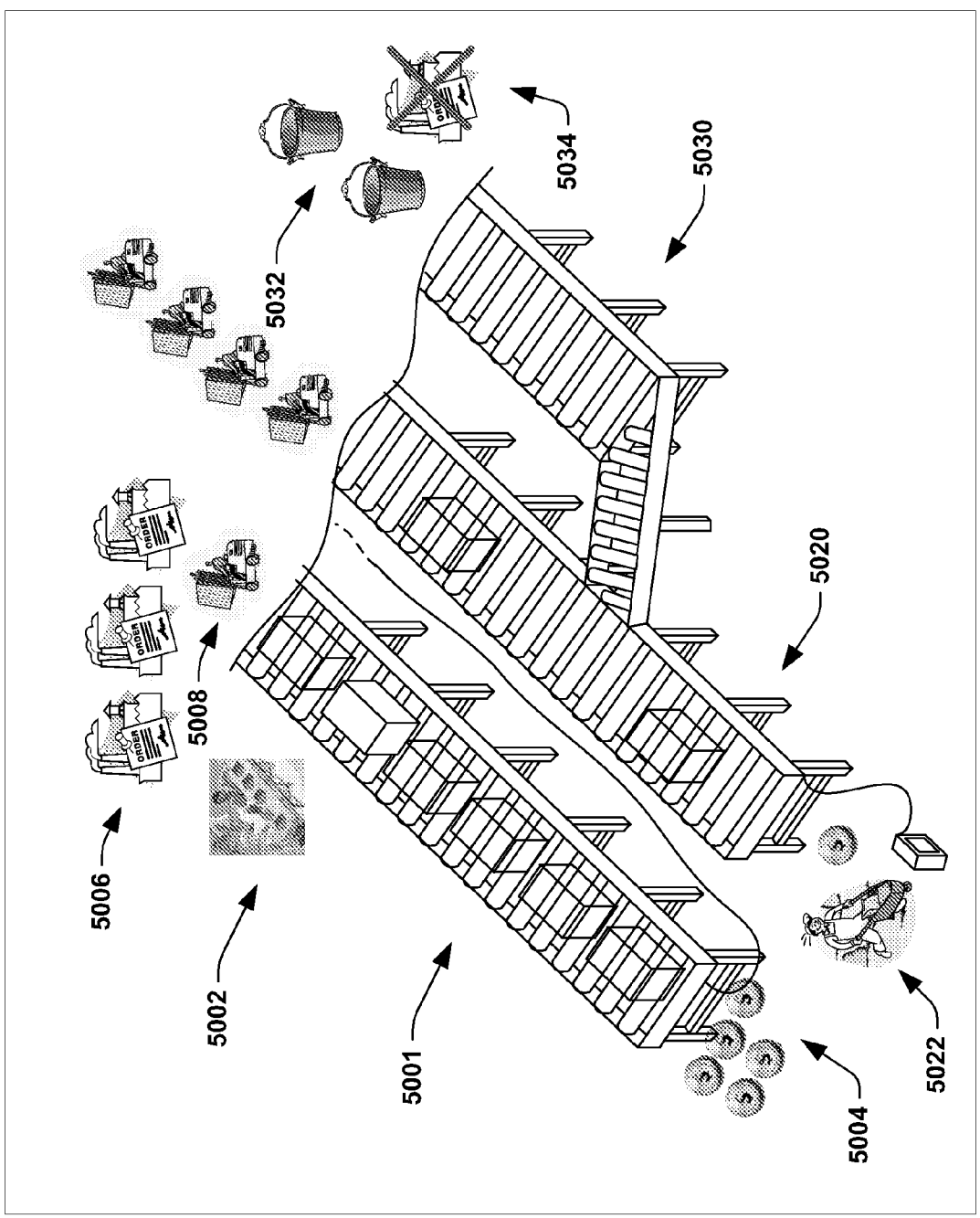
Figure 51:
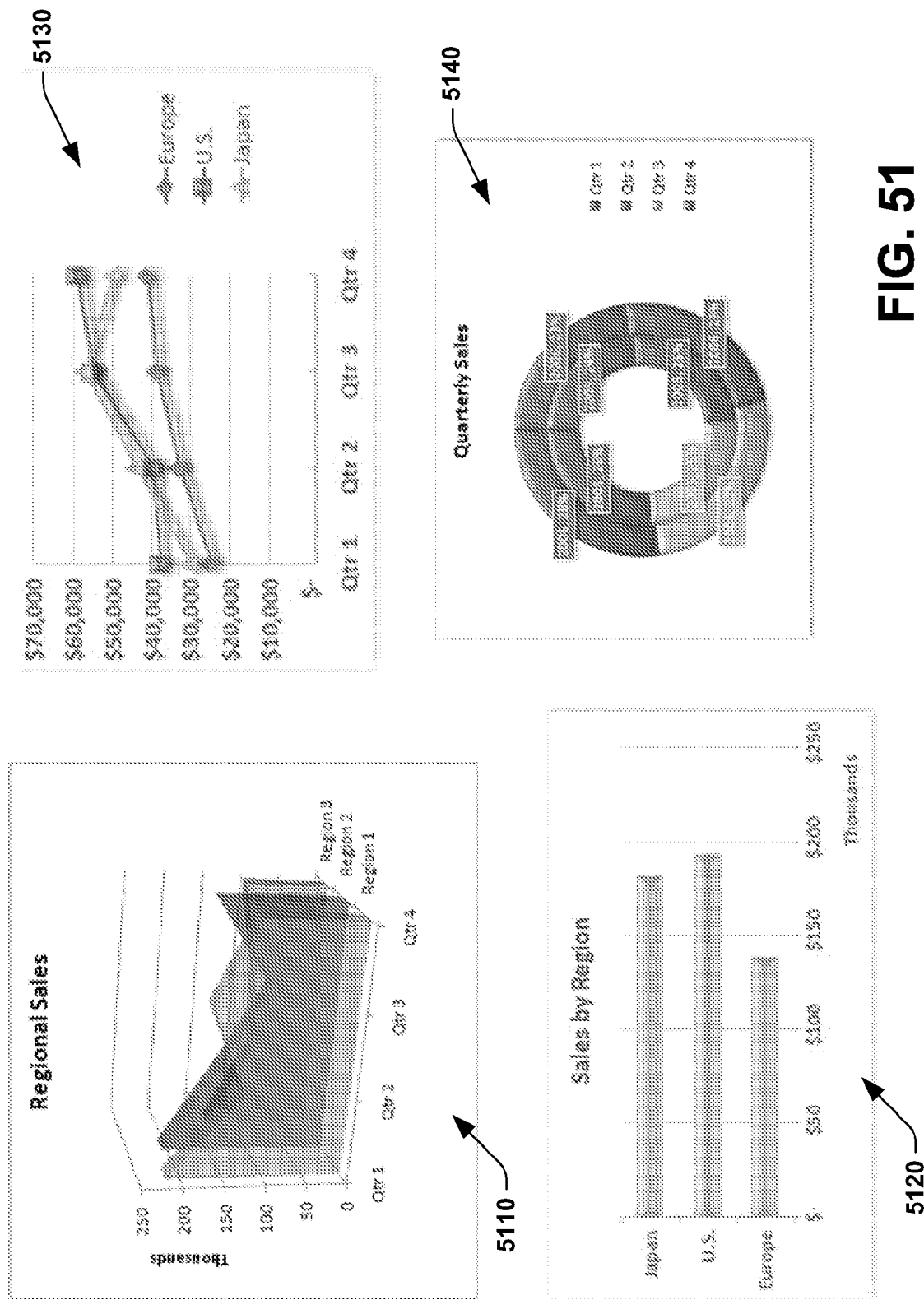

FIGS. 45-53 illustrate example visualizations in connection with aspects described herein. FIG. 45 illustrates a real-time video visualization of a conveyor line 4500. FIG. 46 illustrates an animated simulation 4600 of the conveyor line 4500. FIG. 47 illustrates a representation of conveyor line 4500. FIG. 48 illustrates a usage profile graph 4800 corresponding to utilization/workflow associated with the conveyor line 4500. FIG. 49 illustrates an example cost function response surface graph corresponding to utilization/workflow of the conveyor lines 4500. FIG. 50 illustrates a visualization 5000 that conveys conveyor operating information (e.g., rate, performance, . . . ) as well as workflow information. For example, conveyor line A 5001 is performing at a steady rate evidenced by the number of packages moving on the line. Moreover, workflow and profitability information is conveyed by the visualization as well. Icon 5002 indicates worker performance and workflow is at a steady level. Dollar signs (as well as number thereof) 5004 indicate that Line A is generating a desired level of revenue. Order objects 5006 convey that there are orders to be filled, and inventor icon 5008 indicates that there is sufficient inventory and not an overstocking.

On the other hand, it can be discerned from the visualization that Conveyor line B 5020 is performing at a lower rate than conveyor line A 5001 by the reduced number of packages passing along the conveyor. In addition, there are a number of inventory icons associated with this line indicating an overstocking; and there are no order icons associated with this line. There is only one dollar icon associated with this line, and so it can be readily appreciated that the line is making some profit but is by no means as profitable as line A 5001. Likewise, worker productivity icon 5022 indicates that the workers are not as efficient as indicated by icon 5002 for line A.

Line c 5030 shows low productivity since no packages are moving on the line, and empty bucket icons 5032 indicate no inventor. Icon 5034 also indicates no or cancelled orders, and there are no dollar icons associated with this line. Thus, it is clear that the line is not being utilized effectively, and is not generating revenue.

Figure 52:
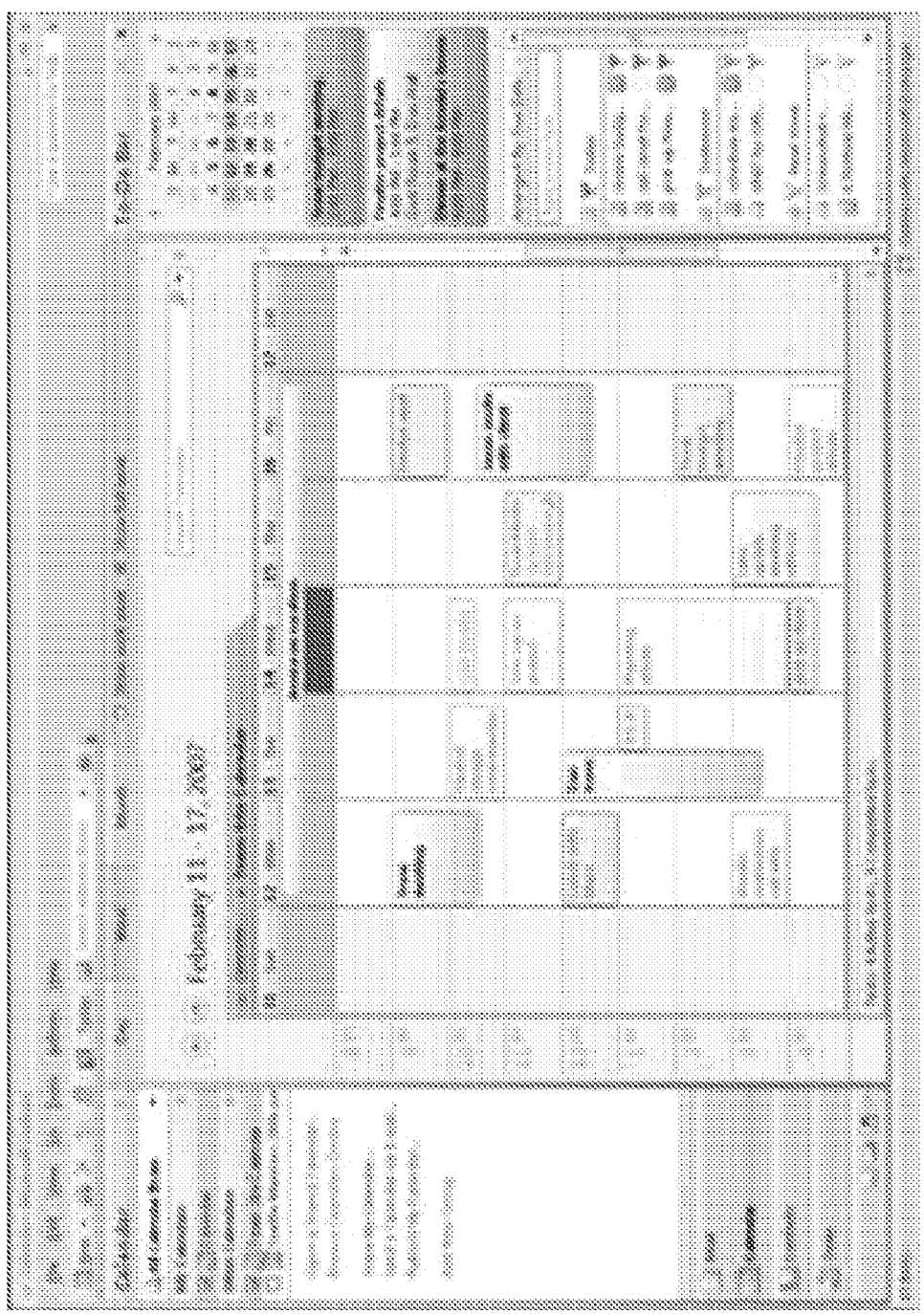

The visualization 5000 provides for quickly understanding in a glanceable manner status, workflow, productivity, performance, revenue generation, inventory, back-orders, etc. It is to be appreciated that the foregoing is but one of many visualization schemes that can be presented to convey workflow information coincident with industrial automation system performance information. For example, in FIG. 51, the 3 conveyor lines can be represented by a regional sales chart 5110, or via views 5120, 5130, 5140 and the like. It is to be appreciated that such visualization information can be emailed to users as well as integrated with calendars or tasks 5210 as shown in FIG. 52.

Figure 53:
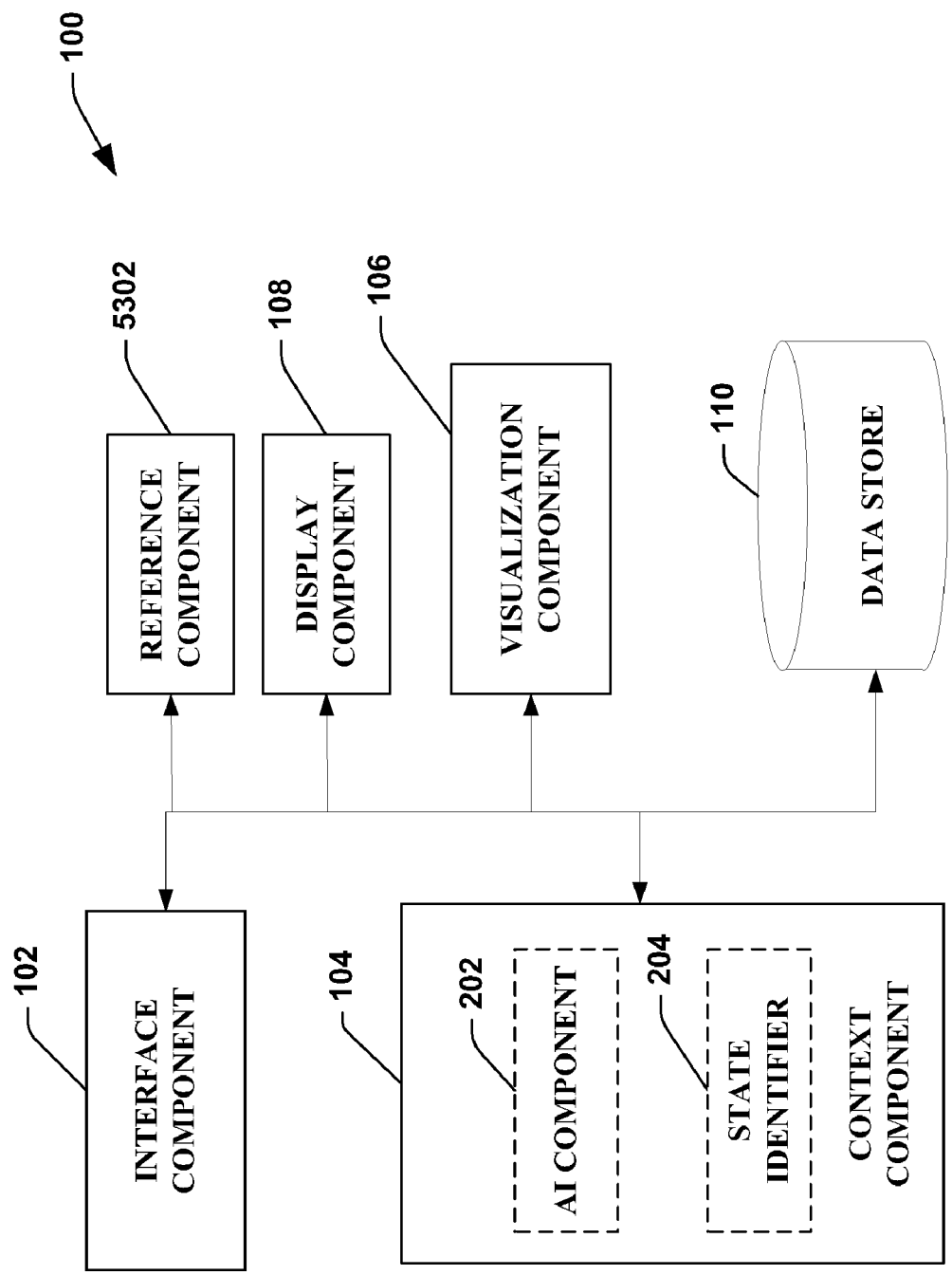
FIG. 53 illustrates an embodiment of system that includes a reference component.

Distance-Wise Presentation of Industrial Automation Data as a Function of Relevance to User FIG. 53 illustrates an embodiment of system 100 (FIG. 1) that includes a reference component 5302. For sake of brevity, discussion already presented for components already mentioned will be omitted. Reference component 5302 in connection with context component 104 provides determining information most relevant for a user given a set of evidence (e.g., user state, user context, device state, device context, system state, system context, user goals, user intent, priorities, level of urgency, revenue, deadlines, . . . ). To facilitate optimizing display of information, the system employs distance-wise placement of objects within a display space.

In particular a graphical user interface is provided via display component 108 and visualization component 106 that provides for organizing and accessing information or content (also referred to as an "object") in a distance-wise framework that optimizes presentation of display objects as a function of user intent, state, context, or goals. A user can view or organize objects, edit or otherwise work on a selected object by, for example, representing, graphically, objects or content which can be added, moved, or deleted from a simulated three-dimensional environment on the user's display. Thus, display objects of higher relevance will appear closer to the user than objects of lower relevance. In addition to employing distance, resolution of objects can also be exploited such that objects of greater relevance will be displayed at a higher resolution than objects of lower relevance.

Spatial memory is utilized, for example, by simulating a plane located and oriented in three-dimensional space, or other three-dimensional landscape on which display are manipulated. The plane or landscape can include visual landmarks for enhancing a user's spatial memory. As the object thumbnails are moved about the landscape, the present invention may employ perspective views (perceived image scaling with distance), partial image occlusion, shadows, and/or spatialized audio to reinforce the simulated three-dimensional plane or landscape. Other audio cues may be used to indicate proximal relationships between object thumbnails, such as when an object thumbnail being "moved" is close to a pre-existing cluster of object thumbnails. An ancillary advantage of using a simulated three-dimensional landscape is that more objects can be represented, at one time, on a single display screen.

Figure 54:
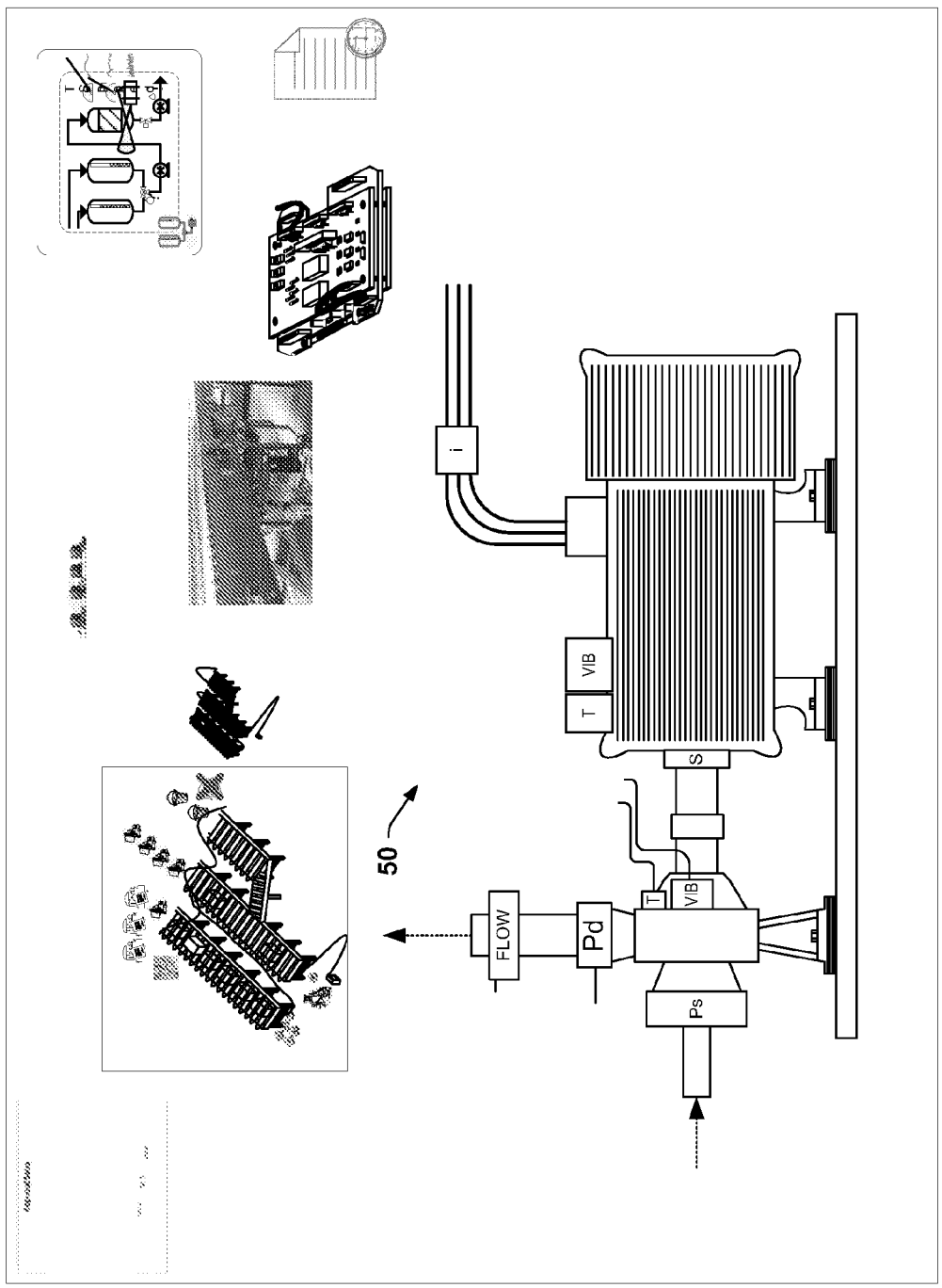
FIGS. 54-58 illustrate various visualizations in accordance with embodiments described herein.

FIG. 54 illustrates an example of how system 100 presents information in a distance-wise (or size-wise) manner to facilitate working on tasks. A motor is malfunction, and so a number of display objects are presented. The motor display object 50 is presented up front and closer to the user because system 100 deemed this display most relevant of all display objects given current set of evidence. As can be seen the other display objects are smaller in appearance or appear further away from the user. Respective objects are situated in the display space as a function of determined or inferred relevance given a set of evidence within an industrial automation setting.

Figure 55:
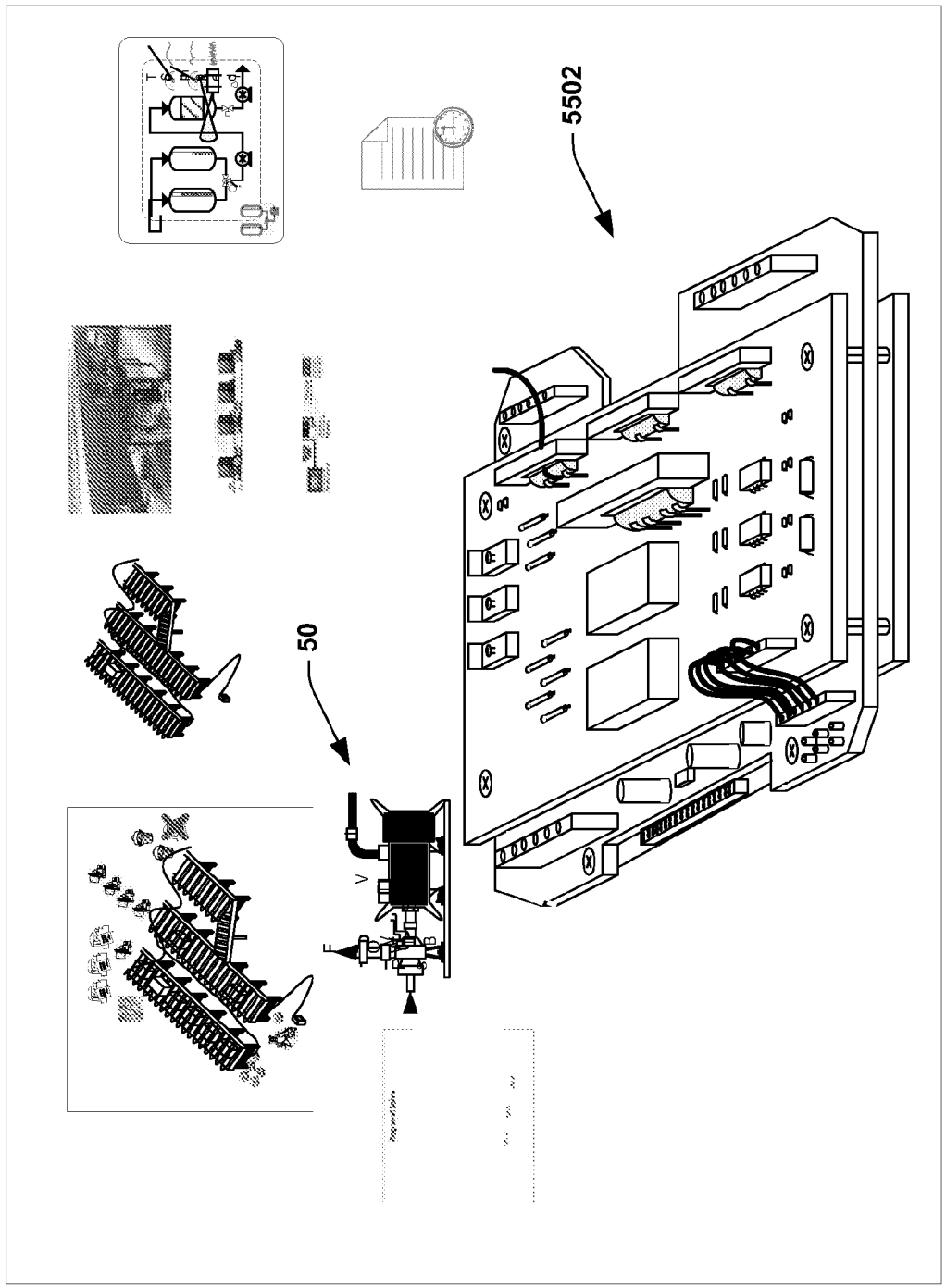
Figure 56:
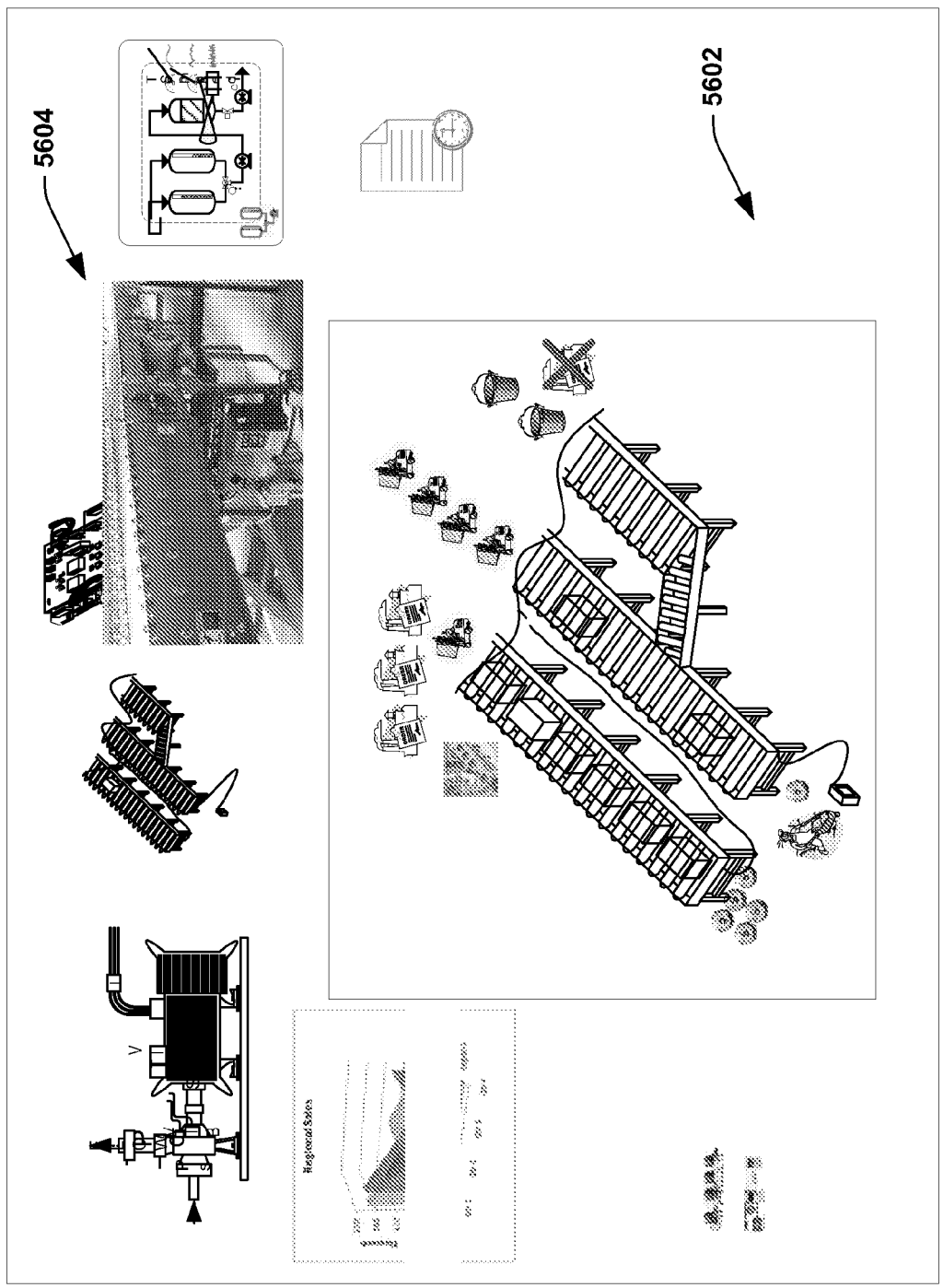
Figure 57:
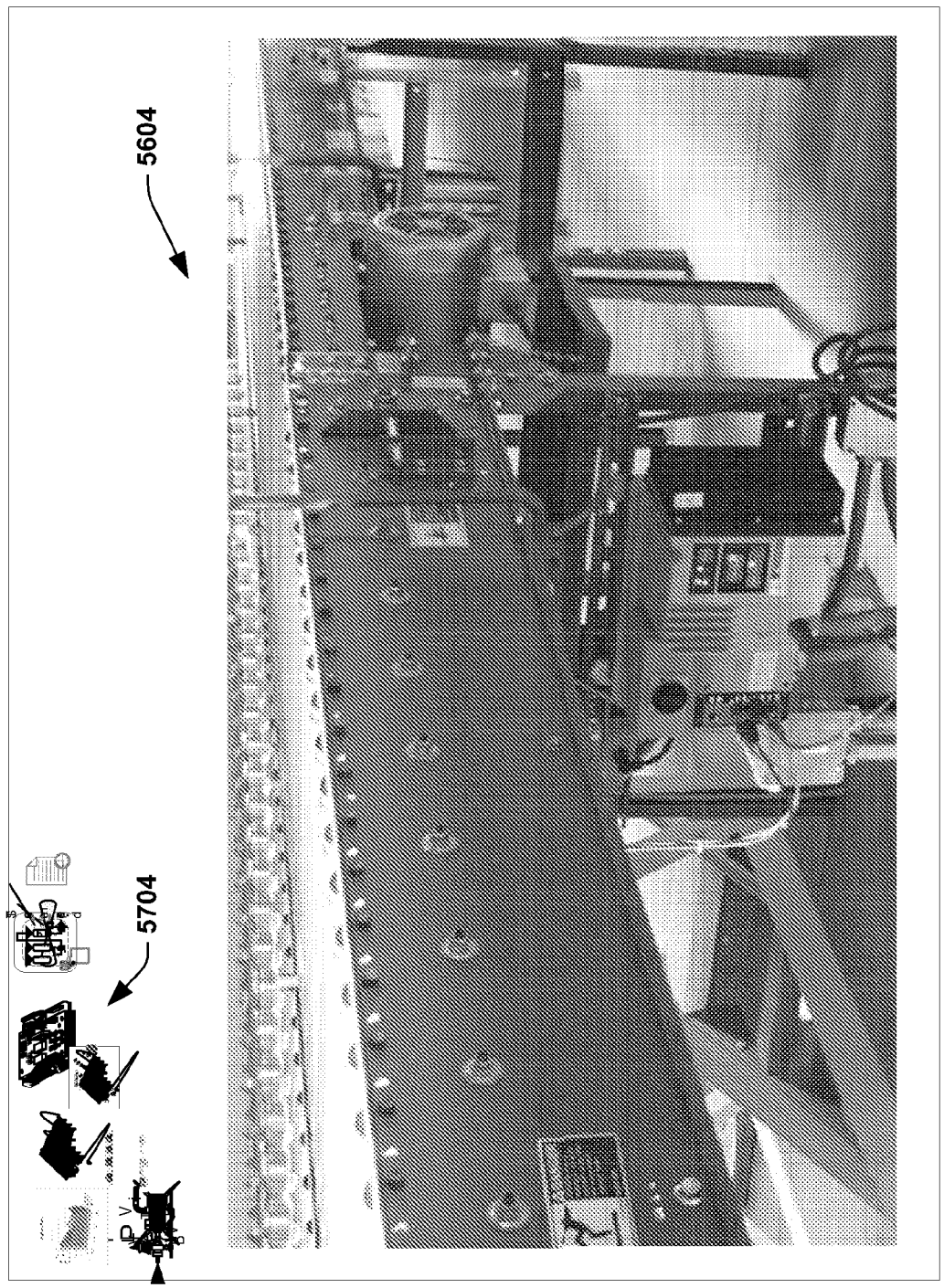
Figure 58:
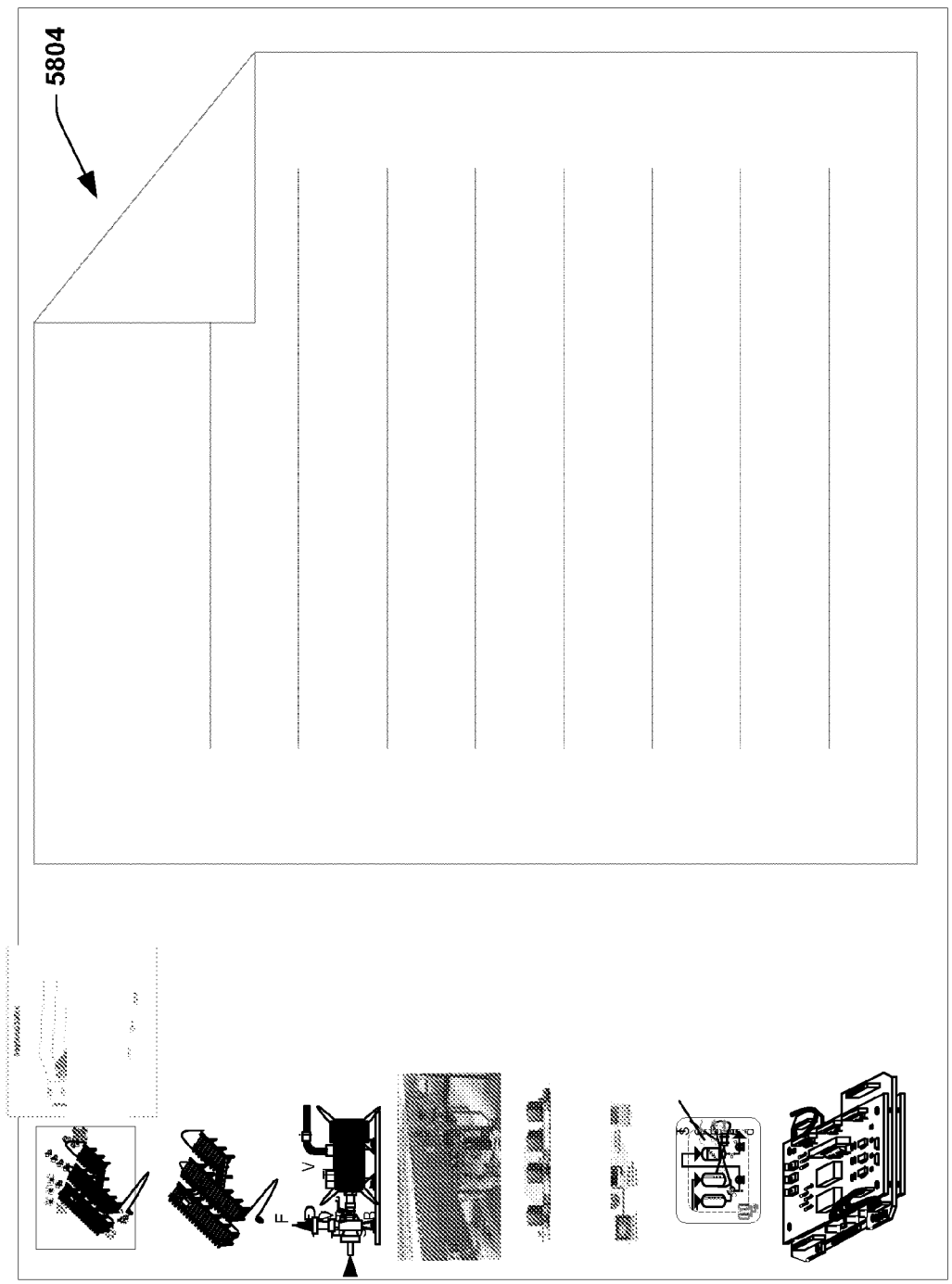

The set of evidence changes as the user is analyzing the motor display object 50 data, and as shown in FIG. 55 the control board 5502 is weighted heavier in terms of relevance and thus is now displayed closer to the user and the motor display object 50 is positioned further away from the user in display space. Turning to FIG. 56, the evidence changes further and the user is concerned that production will slow down. Accordingly, a workflow display object 5602 showing a visualization of a conveyor line impacted by the downed motor is presented. Moreover, real-time video display object 5604, showing the conveyor line in real-time, is increased in size and brought closer to the user in display space as well. FIG. 57 shows the real-time video display object 5604 presented close to the user and all other display objects 5704 presented smaller and in the distance. FIG. 58 illustrates yet another example visualization as a result of further change in evidence that now weights documentation regarding troubleshooting the problem heavier than other items. Thus, display object 5804 which represents trouble-shooting documentation is presented.

Figure 59:
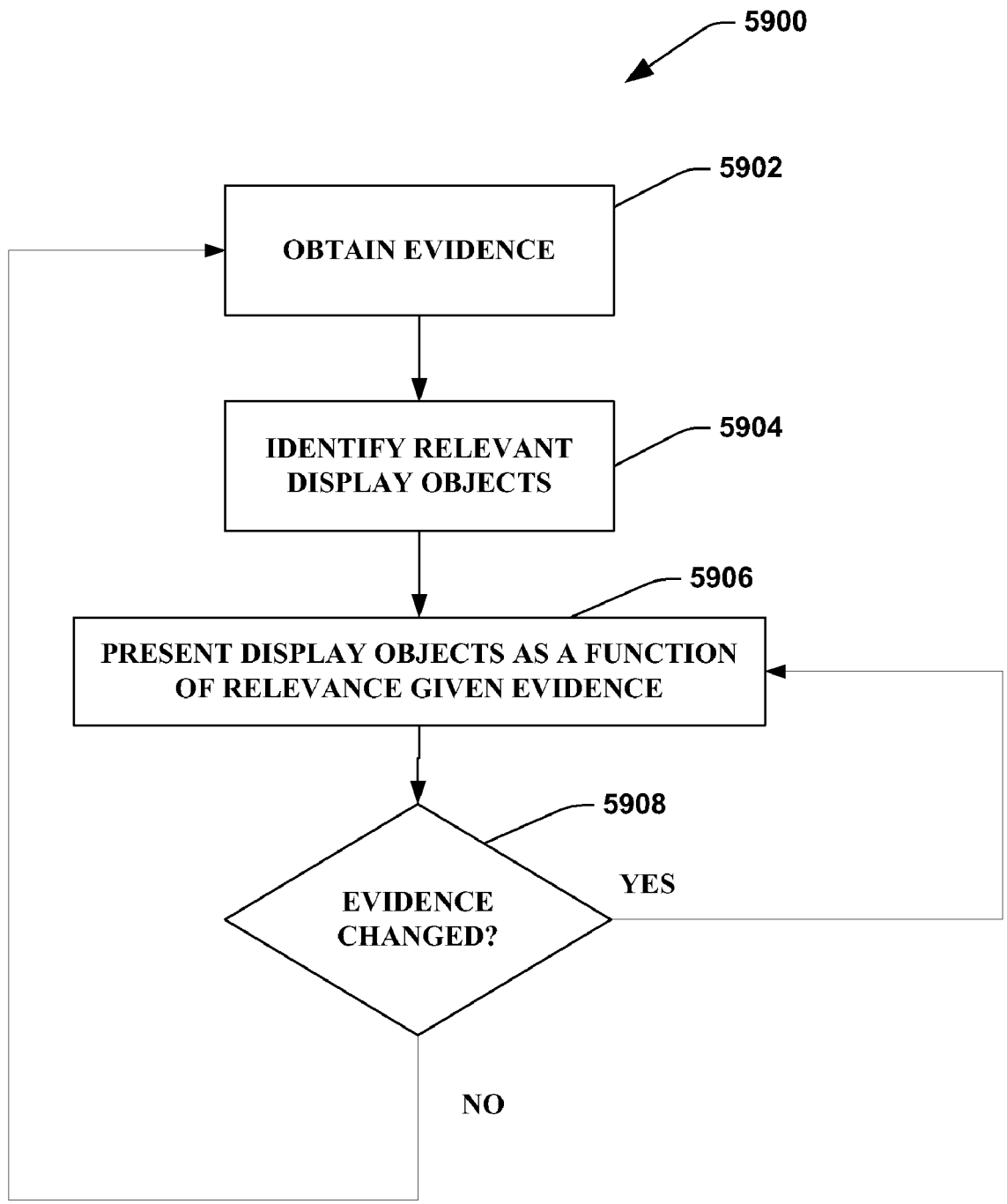
FIG. 59 illustrates a high-level methodology in accordance with aspects described herein.

FIG. 59 illustrates a high-level methodology 5900 in accordance with aspects described herein. At 5902, evidence (e.g., user state, user context, device state, device context, system state, system context, user goals, user intent, priorities, level of urgency, revenue, deadlines, . . .) is obtained. At 5904, display objects that are relevant given the set of evidence are identified. At 5906, a subset of the identified display objects is presented as a function of relevance given the evidence. For example, the greater the relevance of the display object given the evidence, relative to other display objects, the closer the display object is presented to the user in 2-D or 3-D display space. Moreover, resolution can be varied as a function of relevance. At 5908, it is determined if the set of evidence has changed. If yes, the process proceeds to 5906 where presentation of the display objects may be changed as a function of relevance given change in evidence. If the evidence has not changed, the process returns to 5902.

Surface-based Computing in an Industrial Automation Environment

Figure 60:
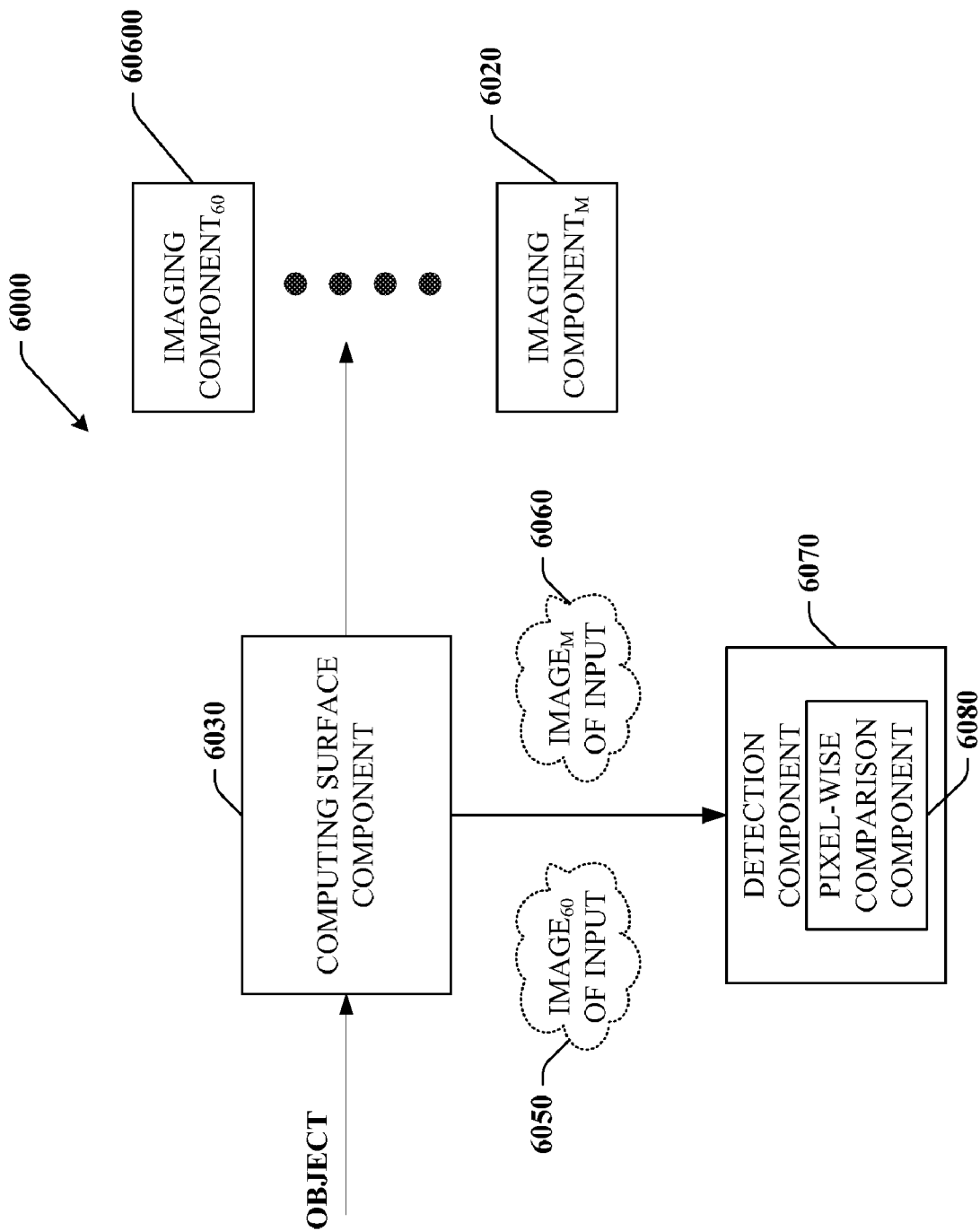
FIG. 60 illustrates a surface based computing system for an industrial automation environment.

FIG. 60 illustrates a surface based computing system 6000 for an industrial automation environment. The system 6000 can compute images of objects touching a surface of a plane or display space. More specifically, the system can facilitate determining which objects in view of a plane exist at a given depth from the plane or display space. For example, this can be accomplished in part by employing a configuration comprising at least two cameras and a vertical or horizontally located sensing plane or display surface located in front of the cameras. The cameras can be directed toward the plane or display screen/surface.

In one aspect, a user can provide input with respect to the plane by touching or otherwise contacting the plane or placing an object on the plane. Input given within a close proximity of the plane can also be "entered" for image processing as well. The cameras can be triggered to capture images or snapshots of the input (input images) to ultimately determine and generate a touch image updated in real-time. The touch image can include objects in contact with the plane and can exclude any background scenery. In particular, each camera can acquire an input image of the plane whereby object in that plane may be included in the image.

To obtain a touch image from input images, image processing techniques can be utilized to combine input images. In particular, camera can provide an input image comprising one or more objects in a scene. In addition, input images can be rectified such that the four corners of the plane region coincide with the four corners of the image. Image differencing procedures can be employed to highlight contours or edges of objects. For example, edge detection can be applied to rectified images to yield corresponding edge images. Thereafter, two edge images can be multiplied pixel-wise, for instance. The resulting image can reveal where edge contours of the two input images overlap. Such overlapping contours can indicate or identify objects that are in contact with the plane.

Accordingly, a user can place an object (e.g., device, equipment part, nut, bolt, washer, tool, component, . . . ) on an image surface and computing surface component 6030 can identify the object. Once the object is identified, information (e.g., type, age, history, warranty, documentation, order info., maintenance info., etc.) can be retrieved and made available to the user.

System 6000 includes at least two imaging components 110, 120 (e.g., IMAGING COMPONENT$_1$ and IMAGING COMPONENT$_M$, where M is an integer greater than 1) positioned behind a non-diffuse sensing plane 6030 (or screen surface that includes a computing surface component). The imaging components (6010, 6020) can be mounted or otherwise positioned such that each can see all four corners of the computing surface plane or screen 6030.

The user can provide input with respect to the system 6000 by placing one or more objects in contact with or within a proximal distance to the plane 6030. Each imaging component can then capture an input image (e.g., first 6050 and second 6060 input images, respectively). Following, a detection component 6070 can process the images to detect and/or determine the shape and/or contour of the objects in each of the input images to ultimately compute a touch image (output image). In particular, the detection component 6070 can comprise a pixel-wise comparison component 6080 that compares pixels between at least two images to determine which pixels are located in the same positions in each image. Matching or overlapping pixels can remain while non-overlapping pixels can be essentially removed. A "final" touch image can be generated having only the matching or overlapping pixels included therein.

In addition, the detection component can include a variety of sub-components (not shown) to facilitate computing the output image. In particular, sub-components pertaining to lens distortion correction, image rectification, and object shape identification can be employed to generate an output image. Because some objects placed near the plane surface can be captured by the imaging components as well as those objects in contact with the surface, depth measurements may be considered when computing the output or touch image. Depth information can be computed by relating binocular disparity to the depth of the object in world coordinates. Binocular disparity refers to the change in image position an object undergoes when viewed at one position compared to another. That is, the displacement of the object from one view to the other is related to the depth of the object.

In computer vision, there is a long history of exploiting binocular disparity to compute the depth of every point in a scene. Such depths from stereo algorithms are typically computationally intensive, can be difficult to make robust, and can constrain the physical arrangement of the cameras. Often such general stereo algorithms are applied in scenarios that in the end do not require general depth maps. In the present invention, the interest rests more in the related problem of determining what is located on a particular plane in three dimensions (the display surface) rather than the depth of everything in the scene.

Figure 61:
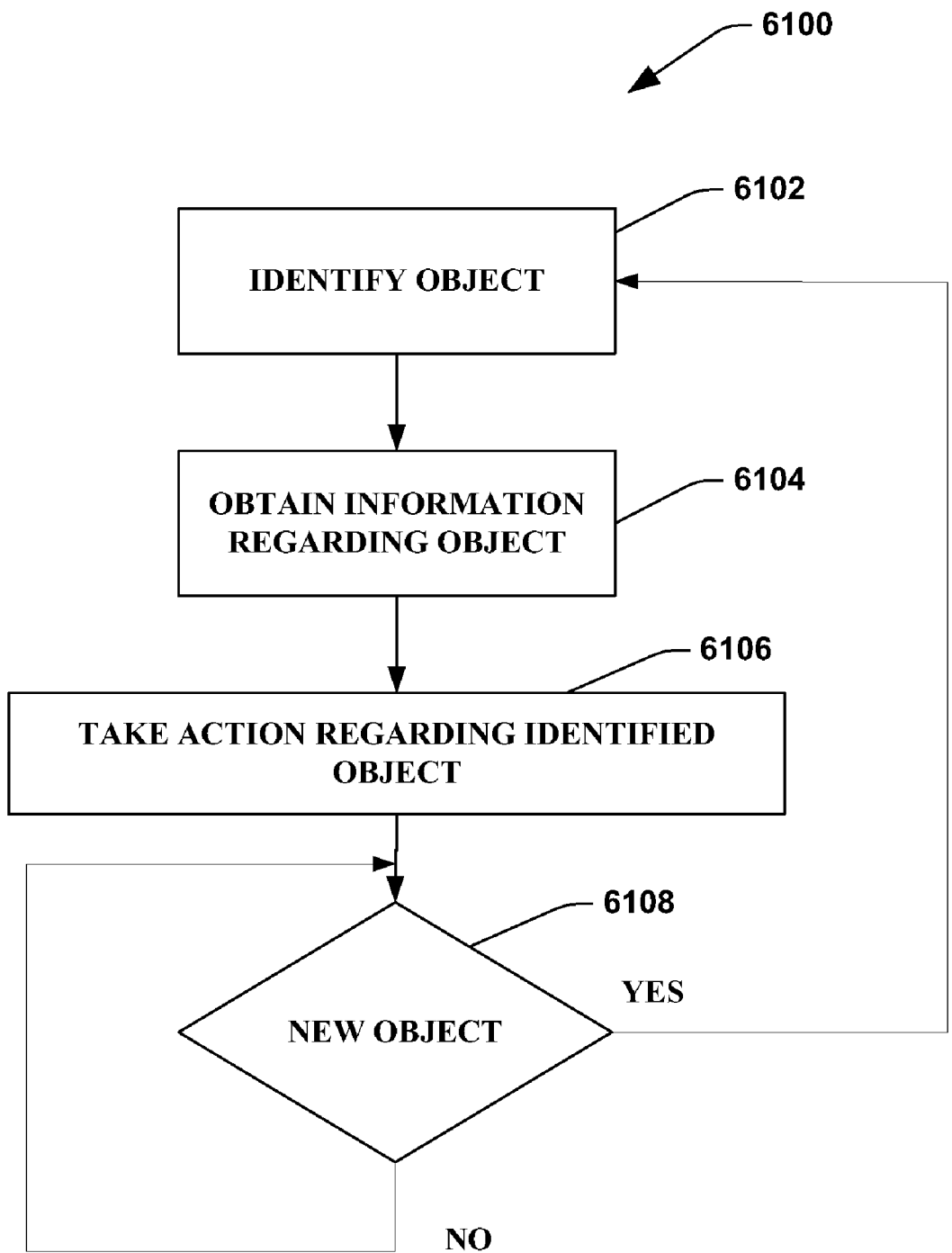
FIG. 61 illustrates a high-level methodology in accordance with aspects described herein.

Turning to FIG. 61, a variety of applications can be employed to exploit surface-based computing in an industrial automation environment. A high-level methodology 6100 is described. At 6102 an object is placed on a computing surface, and the object is identified (and optionally analyzed) by a surface based computing application. For example, is a device is faulty, a user can place the device on the computing surface 6030, and the device can be identified or analyzed. Once the device is identified or analyzed, at 6104 information regarding the object is obtained. At 6106, action can be taken regarding the identified object. For example, if the identified device was damaged, repair information, warranty information, spare parts information, new parts ordering information, etc. can be obtained and corresponding action taken (e.g., submit a warranty claim, request service, order a new part . . . ).

Figure 62:
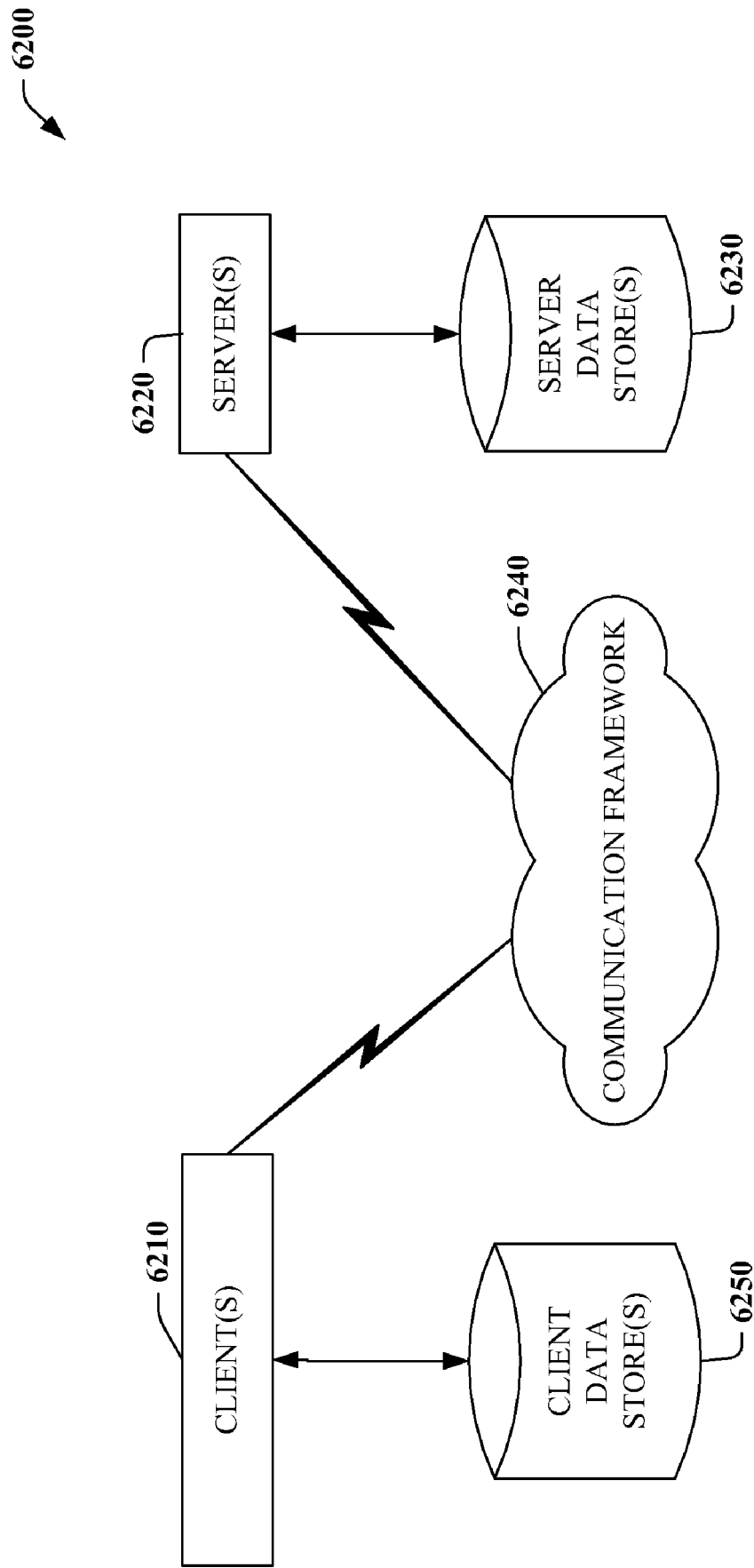
FIGS. 62 and 63 illustrate example computing environments.
Figure 63:
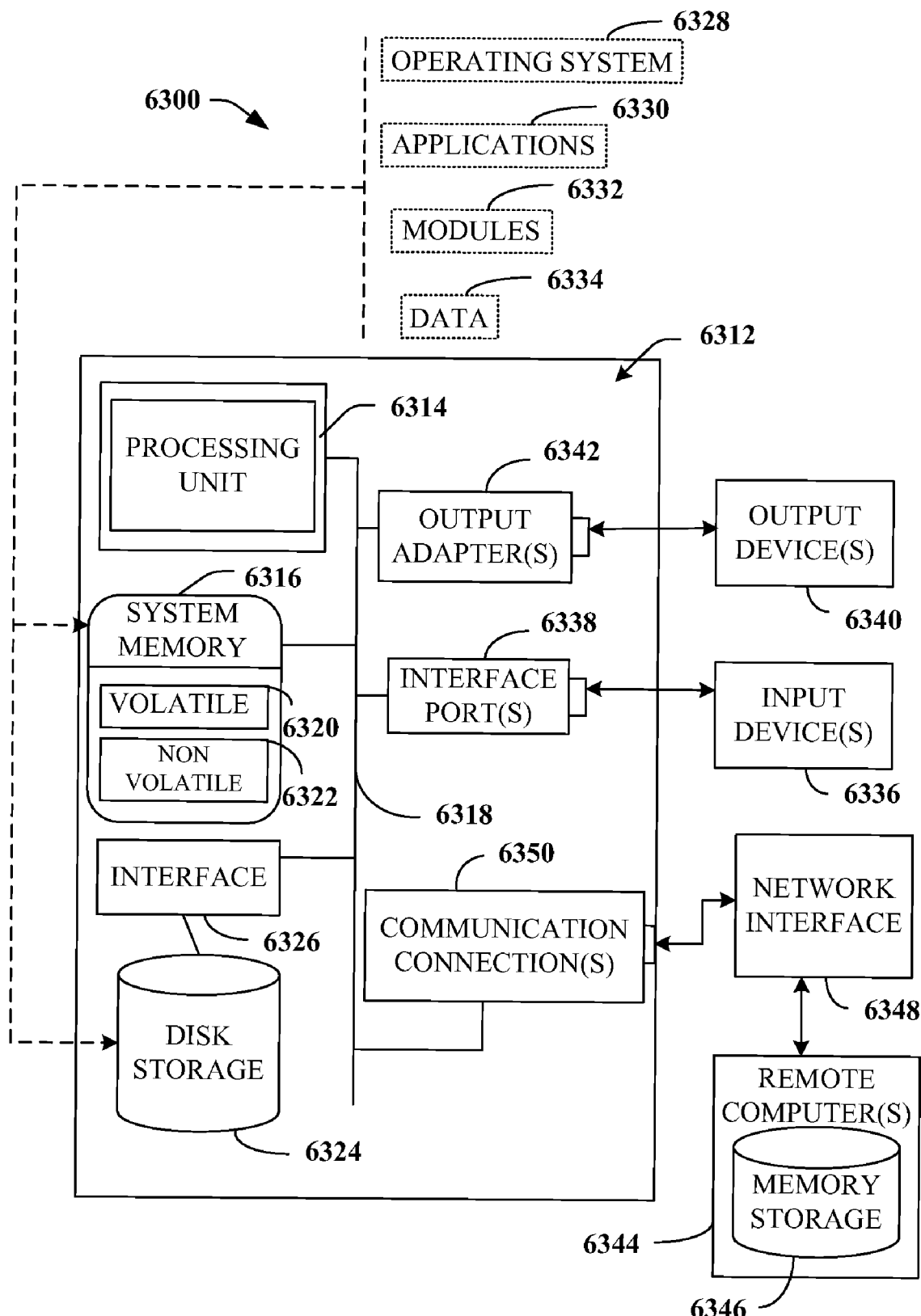

In order to provide additional context for implementation, FIGS. 62 and 63 and the following discussion is intended to provide a brief, general description of a suitable computing environment within which disclosed and described components and methods can be implemented. While various specific implementations have been described above in the general context of computer-executable instructions of a computer program that runs on a local computer and/or remote computer, those skilled in the art will recognize that other implementations are also possible either alone or in combination with other program modules. Generally, program modules include routines, programs, components, data structures, etc. that perform particular tasks and/or implement particular abstract data types.

Moreover, those skilled in the art will appreciate that the above-described components and methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. Certain illustrated aspects of the disclosed and described components and methods may also be practiced in distributed computing environments where certain tasks are performed by remote processing devices that are linked through a communications network or other data connection. However, some, if not all, of these aspects may be practiced on stand-alone computers. In a distributed computing environment, program modules may be located in local and/or remote memory storage devices.

FIG. 62 is a schematic block diagram of a sample-computing environment 6200 with which the subject invention can interact. The system 6200 includes one or more client(s) 6210. The client(s) 6210 can be hardware and/or software (e.g., threads, processes, computing devices). The system 6200 also includes one or more server(s) 6220. The server(s) 6220 can be hardware and/or software (e.g., threads, processes, computing devices). The servers 6220 can house threads or processes to perform transformations by employing the subject invention, for example.

One possible means of communication between a client 6210 and a server 6220 can be in the form of a data packet adapted to be transmitted between two or more computer processes. The system 6200 includes a communication framework 6240 that can be employed to facilitate communications between the client(s) 6210 and the server(s) 6220. The client(s) 6210 are operably connected to one or more client data store(s) 6250 that can be employed to store information local to the client(s) 6210. Similarly, the server(s) 6220 are operably connected to one or more server data store(s) 6230 that can be employed to store information local to the servers 6240.

With reference to FIG. 63, an exemplary environment 6300 for implementing various aspects of the invention includes a computer 6312. The computer 6312 includes a processing unit 6314, a system memory 6316, and a system bus 6318. The system bus 6318 couples system components including, but not limited to, the system memory 6316 to the processing unit 6314. The processing unit 6314 can be any of various available processors. Dual microprocessors and other multiprocessor architectures also can be employed as the processing unit 6314.

The system bus 6318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 6316 includes volatile memory 6320 and nonvolatile memory 6322. The basic input/output system (BIOS), containing the basic routines to transfer information between elements within the computer 6312, such as during start-up, is stored in nonvolatile memory 6322. By way of illustration, and not limitation, nonvolatile memory 6322 can include read only memory (ROM), programmable ROM (PROM), electrically programmable ROM (EPROM), electrically erasable ROM (EEPROM), or flash memory. Volatile memory 6320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 6312 also includes removable/non-removable, volatile/non-volatile computer storage media. For example, FIG. 63 illustrates a disk storage 6324. The disk storage 6324 includes, but is not limited to, devices like a magnetic disk drive, floppy disk drive, tape drive, Jaz drive, Zip drive, LS drive, flash memory card, or memory stick. In addition, disk storage 6324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 6324 to the system bus 6318, a removable or non-removable interface is typically used such as interface 6326.

It is to be appreciated that FIG. 63 describes software that acts as an intermediary between users and the basic computer resources described in the suitable operating environment 6300. Such software includes an operating system 6328. The operating system 6328, which can be stored on the disk storage 6324, acts to control and allocate resources of the computer system 6312. System applications 6330 take advantage of the management of resources by operating system 6328 through program modules 6332 and program data 6334 stored either in system memory 6316 or on disk storage 6324. It is to be appreciated that the subject invention can be implemented with various operating systems or combinations of operating systems.

A user enters commands or information into the computer 6312 through input device(s) 6336. The input devices 6336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 6314 through the system bus 6318 via interface port(s) 6338. Interface port(s) 6338 include, for example, a serial port, a parallel port, a game port, and a universal serial bus (USB). Output device(s) 6340 use some of the same type of ports as input device(s) 6336. Thus, for example, a USB port may be used to provide input to computer 6312, and to output information from computer 6312 to an output device 6340. Output adapter 6342 is provided to illustrate that there are some output devices 6340 like monitors, speakers, and printers, among other output devices 6340, which require special adapters. The output adapters 6342 include, by way of illustration and not limitation, video and sound cards that provide a means of connection between the output device 6340 and the system bus 6318. It should be noted that other devices and/or systems of devices provide both input and output capabilities such as remote computer(s) 6344.

Computer 6312 can operate in a networked environment using logical connections to one or more remote computers, such as remote computer(s) 6344. The remote computer(s) 6344 can be a personal computer, a server, a router, a network PC, a workstation, a microprocessor based appliance, a peer device or other common network node and the like, and typically includes many or all of the elements described relative to computer 6312. For purposes of brevity, only a memory storage device 6346 is illustrated with remote computer(s) 6344. Remote computer(s) 6344 is logically connected to computer 6312 through a network interface 6348 and then physically connected via communication connection 6350. Network interface 6348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 6350 refers to the hardware/software employed to connect the network interface 6348 to the bus 6318. While communication connection 6350 is shown for illustrative clarity inside computer 6312, it can also be external to computer 6312. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A visualization system that generates visual mash-ups for industrial automation, comprising:
   a mash-up component configured to receive and combine a plurality of outputs from a plurality of sources within an industrial automation environment, the plurality of sources comprise at least one of equipment, computers, or devices within the industrial automation environment;
   a binding component configured to bind at least two outputs of the plurality of outputs from at least two of the plurality of sources into at least one display object so that the at least two outputs appear as if from a same source of the plurality of sources; and
   a visualization component configured to generate and display a mash-up of the at least one display object and electronically transmit the mash-up to a third party, wherein the mash-up is configured to auto-configure on a computer of the third party.

2. The system of claim 1, further comprising a data store configured to store information utilized to generate the mash-up, the information comprising at least one of: source addresses, filters, classifiers, preferences, profiles, design layout information, rules, or historical data.

3. The system of claim 1, the binding component further configured to embed functionality from a first source from the plurality of sources in a display object associated with a second source from the plurality of sources.

4. The system of claim 1, the visualization component further configured to selectively set at least one of a size of the at least one display object, at least one interface component, or at least one functionality component.

5. The system of claim 1, the visualization component further configured to configure at least one of the at least one display object, at least one interface component, or at least one functionality component.

6. The system of claim 1, wherein the binding component further configured to bind program variables to data from outside sources.

7. The system of claim 1 further comprising a stitching component configured to combine multiple images or web pages to produce a panorama or a larger image.

8. The system of claim 7, the stitching component further configured to analyze translation and rotation between any two sequencing images.

9. The system of claim 1, further comprising an optimization component configured to arrange items or objects within the mash-up to optimize the mash-up in connection with desired goals or uses.

10. The system of claim 9, the optimization component further configured to at least one of reposition, re-size, re-orient, or display the at least one display object as a function of at least one of determined or inferred at least one of user preferences, needs, priorities, or goals.

11. The system of claim 10, the optimization component includes an artificial intelligence (AI) based machine learning system (MLS) that is explicitly or implicitly trained to take automated actions in accordance with at least one particular event, state, condition, extrinsic information, or on-going actions.

12. The system of claim 1, the visualization component further configured to configure the mash-up as a function of at least one of determined or inferred user preferences, user needs, administrative settings, security settings, user roles, or user state.

13. A computer-implemented method for generating visual mash-ups for industrial automation, comprising:
receiving display objects, the display objects corresponding to at least one of equipment, computers, or devices within an industrial automation environment;
analyzing and binding the display objects;
generating a mash-up of a subset of the display objects;
if a conflict exists between display objects, resolving the conflict and continue generating the mash-up; and
transmitting the mash-up to a third party electronically, wherein the mash-up auto-configures on a computer of the third party.

14. The method of claim 13, further comprising determining attributes of the display objects, the attributes comprising at least one of data rate, resolution requirements, types, formatting, sources, underlying code, or compatibility issues.

15. The method of claim 13, further comprising incorporating new display objects into an existing mash-up.

16. The method of claim 13, further comprising integrating a the mash-up with an existing mash-up.

17. An apparatus, comprising:
a mash-up component configured to receive and combine a plurality of outputs from a plurality of devices within an industrial automation environment;
a binding component configured to bind at least two outputs of the plurality of outputs from at least two of the plurality of devices into at least one display object so that the at least two outputs appear as if from a same device of the plurality of devices; and
a visualization component configured to generate a mash-up of the at least one display object and electronically transmit the mash-up to a human machine interface, wherein the mash-up is configured to auto-configure on a computer of the third party.

18. The apparatus of claim 17, wherein the visualization component is further configured to send the mash-up to the human machine interface via e-mail.

19. The apparatus of claim 17, wherein the plurality of devices comprises at least one of an automation control system, an industrial device or an industrial equipment.

* * * * *